US012758942B2

(12) United States Patent
Pavlish et al.

(10) Patent No.: US 12,758,942 B2
(45) Date of Patent: Oct. 13, 2026

(54) ACTIVATED CARBON COMPOSITE AND METHOD OF REMOVING CONTAMINANT

(71) Applicant: Birchtech Corp., Corsicana, TX (US)

(72) Inventors: John H. Pavlish, The Villages, FL (US); James C. Trettel, Slippery Rock, PA (US)

(73) Assignee: Birchtech Corp., Corsicana, TX (US)

( * ) Notice: Subject to any disclaimer, the term of this patent is extended or adjusted under 35 U.S.C. 154(b) by 0 days.

(21) Appl. No.: 19/383,009

(22) Filed: Nov. 7, 2025

(65) Prior Publication Data

US 2026/0131306 A1 May 14, 2026

Related U.S. Application Data

(60) Provisional application No. 63/717,966, filed on Nov. 8, 2024.

(51) Int. Cl.
*B01J 20/20* (2006.01)
*B01D 53/04* (2006.01)
(Continued)

(52) U.S. Cl.
CPC .............. *B01J 20/20* (2013.01); *B01D 53/04* (2013.01); *B01J 20/3007* (2013.01); *B01J 20/3028* (2013.01); *B01J 20/3042* (2013.01); *B01J 20/3416* (2013.01); *B01J 20/3475* (2013.01); *C01B 32/318* (2017.08); *C01B 32/36* (2017.08); *C01B 32/382* (2017.08);
(Continued)

(58) Field of Classification Search
None
See application file for complete search history.

(56) References Cited

U.S. PATENT DOCUMENTS 12,478,948 B2 11/2025 Distefano et al.
2003/0097933 A1* 5/2003 Choudary ............ B01J 20/3491 95/143
(Continued)

FOREIGN PATENT DOCUMENTS

CN 101890336 B 6/2012
CN 103657736 A 3/2014

OTHER PUBLICATIONS

"International Application Serial No. PCT/US2025/054579, Invitation to Pay Additional Fees mailed Mar. 10, 2026", 8 pgs.
(Continued)

*Primary Examiner* — Richard C Gurtowski
(74) *Attorney, Agent, or Firm* — Schwegman Lundberg & Woessner, P.A.

(57) ABSTRACT

A method of forming an activated carbon composite includes optionally performing a pre-treatment of a primary carbonaceous material, adding an additive composition to the primary carbonaceous material to form a composite, optionally performing a post-treatment of the composite, wherein at least one of the pre-treatment and the post-treatment are performed, to form the activated carbon composite. A method of treating water or gas includes contacting contaminated water or gas including one or more contaminants with a carbonaceous material and one or more additives to form treated water or gas having a lower concentration of the one or more contaminants than the contaminated water or gas.

18 Claims, 27 Drawing Sheets

(51) Int. Cl.

| | |
|---|---|
| ***B01J 20/30*** | (2006.01) |
| ***B01J 20/34*** | (2006.01) |
| ***C01B 32/318*** | (2017.01) |
| ***C01B 32/354*** | (2017.01) |
| ***C01B 32/36*** | (2017.01) |
| ***C01B 32/384*** | (2017.01) |
| ***C02F 1/28*** | (2023.01) |
| *C02F 101/36* | (2006.01) |

(52) U.S. Cl.
CPC ............ *C01B 32/384* (2017.08); *C02F 1/283* (2013.01); *B01D 2253/102* (2013.01); *B01D 2257/2066* (2013.01); *C02F 2101/36* (2013.01)

(56) References Cited

U.S. PATENT DOCUMENTS

| | | | | |
|---|---|---|---|---|
| 2009/0111690 | A1* | 4/2009 | Gadkarec | B01J 20/28042<br>502/417 |
| 2020/0048099 | A1* | 2/2020 | Lou | H01G 11/86 |
| 2024/0246059 | A1* | 7/2024 | Distefano | B01J 20/3236 |

OTHER PUBLICATIONS

"International Application Serial No. PCT US2025 054579, International Search Report mailed May 4, 2026", 5 pgs.
"International Application Serial No. PCT US2025 054579, Written Opinion mailed May 4, 2026", 9 pgs.

* cited by examiner

MODIFICATION OF GAC SHAPES

PAC

CMC

FIG. 5
FIG. 6
DRIED
AGGLOMERATES
DRIED
PELLETS

ACTIVATED CARBON COMPOSITE AND METHOD OF REMOVING CONTAMINANT

CROSS-REFERENCE TO RELATED APPLICATION

This application claims the benefit of priority to U.S. Provisional patent application Ser. No. 63/717,966 filed Nov. 8, 2024, the disclosure of which is incorporated herein in its entirety by reference.

BACKGROUND

Activated carbon (AC) is produced from various carbonaceous source materials including bamboo, coconut husk, willow peat, wood, coir, lignite, coal, and petroleum pitch. The activation process typically involves physical and/or chemical activation under high temperatures using gases such as steam and $CO_2$. The process begins with exposing the source material to temperatures of 600-900° C. to pyrolyze/carbonize the material, removing volatile chemicals and leaving primarily carbon and inorganic material. The carbonized material is then activated in an oxidizing environment at temperatures typically ranging from 600-1200° C.

Granular activated carbon (GAC) and powdered activated carbon (PAC) are the two main types of activated carbon, distinguished by particle size and application methods. GAC has larger particles and smaller external surface area compared to PAC and is designed with open pore structures to enable rapid diffusion for maximum contaminant adsorption. GAC is commonly used in air/gas filtration and water treatment facilities, with different size designations for liquid phase (e.g., 8×20, 20×40) and vapor phase (e.g., 4×6, 4×8) applications.

GAC serves as the most widely used and well-established treatment technology for removing per and polyfluoroalkyl substances (PFAS) from drinking water and wastewater. When GAC is no longer effective at removing contaminants such as PFAS, GAC becomes "spent carbon" which can be restored through thermal processes. Two common restoration methods are regeneration (performed at temperatures below 500° C.) and reactivation (performed at temperatures above 600° C.). PAC is also used for removing PFAS from drinking water and wastewater, but it is not as effective when greater than 50% of the PFAS is desired to be removed. The PAC used to remove PFAS is generally not recycled and is instead disposed of along with other solids from the water treatment.

A significant advantage of reactivated GAC is its cost-effectiveness, being more than 40% cheaper compared to virgin GAC. However, challenges exist with GAC treatment of PFAS, including competition from natural organic matter (NOM) and short breakthrough times requiring more frequent reactivation. During the reactivation process, adsorbed organic compounds thermally decompose into char and are subsequently mineralized to $CO_2$ to rejuvenate the GAC surfaces.

The current state of the art faces several limitations in GAC performance and reactivation efficiency. These include the need for improved contaminant removal capacity, better flow characteristics through filter beds, and enhanced cost-effectiveness in both virgin and reactivated GAC applications. Additionally, the industry faces challenges in maintaining consistent GAC performance after reactivation, particularly for specialized applications like PFAS removal.

Removal of contaminants from water or gas is a common need under a wide variety of circumstances, such as for treatment of contaminated natural water or gas or industrially-produced water or gas. However, conventional techniques for treatment of water or gas, such as to remove perfluoroalkyl or polyfluoroalkyl substances (PFASs), suffer from problems of inefficiency, ineffectiveness, lack of versatility, high expense, and complex implementation.

SUMMARY OF THE INVENTION

Various aspects of the present disclosure provide a method of forming an activated carbon composite. The method optionally includes performing a pre-treatment of a primary carbonaceous material. The method includes adding an additive composition to the primary carbonaceous material, to form a composite of the primary carbonaceous material and the additive composition. The method also optionally includes performing a post-treatment of the composite of the primary carbonaceous material and the additive composition. At least one of the pre-treatment and the post-treatment are performed. The method forms the activated carbon composite.

Various aspects of the present disclosure provide a method of forming an activated carbon composite. The method includes adding an additive composition including powdered activated carbon and a binder to a primary carbonaceous material including virgin granular activated carbon (i.e., granular activated carbon that has not yet been used for contaminate removal), to form a composite of the primary carbonaceous material and the additive composition. The method includes shaping the composite of the primary carbonaceous material and the additive composition, to form a shaped composite of the primary carbonaceous material and the additive composition. The method also includes performing a post-treatment of the shaped composite of the primary carbonaceous material and the additive composition including heating to transform the binder to a char, a pyrolyzed binder, a carbonized binder, or a combination thereof, to form the activated carbon composite.

Various aspects of the present disclosure provide a method of forming an activated carbon composite. The method includes adding an additive composition including powdered activated carbon to a primary carbonaceous material including used granular activated carbon, to form a composite of the primary carbonaceous material and the additive composition. The method also includes performing a post-treatment of the composite of the primary carbonaceous material and the additive composition including heating, to form the activated carbon composite.

Various aspects of the present disclosure provide a method of forming an activated carbon composite. The method includes adding an additive composition including powdered activated carbon and a binder to a primary carbonaceous material including used granular activated carbon, to form a composite of the primary carbonaceous material and the additive composition. The method also includes performing a post-treatment of the composite of the primary carbonaceous material and the additive composition including heating to transform the binder to a char, a pyrolyzed binder, a carbonized binder, or a combination thereof, to form the activated carbon composite.

Various aspects of the present disclosure provide a method of forming an activated carbon composite. The method includes adding an additive composition including powdered activated carbon and a binder to a primary carbonaceous material including used granular activated carbon, to form a composite of the primary carbonaceous material and the additive composition. The method includes shaping the composite of the primary carbonaceous material and the additive composition, to form a shaped composite of the primary carbonaceous material and the additive composition. The method also includes performing a post-treatment of the shaped composite of the primary carbonaceous material and the additive composition including heating to transform the binder to a char, a pyrolyzed binder, a carbonized binder, or a combination thereof, to form the activated carbon composite.

Various aspects of the present disclosure provide an activated carbon composite formed by the method of forming an activated carbon composite disclosed herein.

Various aspects of the present disclosure provide an activated carbon composite that includes granular activated carbon. The activated carbon composite also includes a powdered activated carbon at least one of adhered to, within, and mixed with the granular activated carbon.

Various aspects of the present disclosure provide a method of treating water. The method includes contacting contaminated water including one or more contaminants with the activated carbon composite disclosed herein or a ground product thereof to form treated water having a lower concentration of the one or more contaminants than the contaminated water.

Various aspects of the present disclosure provide a method of treating gas. The method includes contacting contaminated gas including one or more contaminants with the activated carbon composite disclosed herein or a ground product thereof to form treated gas having a lower concentration of the one or more contaminants than the contaminated gas.

Various aspects of the present disclosure provide a method of treating water or gas. The method includes contacting contaminated water or gas with carbonaceous material and one or more additives to form treated water or gas having a lower concentration of the one or more contaminants than the contaminated water or gas.

Various aspects of the present disclosure provide a method of treating water. The method includes contacting contaminated water including one or more contaminants including a perfluoroalkyl or polyfluoroalkyl substance (PFAS) with a carbonaceous material and one or more additives including alumina, activated alumina, aluminum hydroxide, or a combination thereof, to form treated water having a lower concentration of the one or more contaminants than the contaminated water.

Various aspects of the present disclosure provide various advantages over granulated activated carbon, granulated activated carbon composites, methods of using the same, or methods of treating water or gas. Various aspects of the present disclosure provide various performance and/or economic advantages over other activated carbon sorbents, methods of making the same, or methods of treating water or gas. For example, various aspects of the present disclosure provide enhanced adsorption capacity and/or enhanced contact with contaminants through incorporation of smaller AC particles onto and into GAC or PAC particles, such as for contaminants like organics, inorganics, metals, and PFAS. Various aspects of the present disclosure provide the ability to restore spent granular carbons to their near-virgin state or better, while simultaneously improving their performance for PFAS removal. Various aspects of the present disclosure provide development of additional surface area during reactivation when using carbon-based binders.

Various aspects of the present disclosure provide various operational and/or process advantages over other activated carbon sorbents, methods of making the same, or methods of treating water or gas. For example, various aspects of the present disclosure provide an activated carbon composite having improved flow characteristics and reduced pressure drop through filter/carbon beds as compared to other activated carbon sorbents, resulting in lower operating and maintenance costs. Various aspects of the present disclosure provide flexibility in processing timing, such as allowing smaller AC particles to be added before, during, or after thermal or other treatment processes of manufacturing the activated carbon composite. Various aspects of the present disclosure provide the capability to modify GAC or PAC particle size and shape while maintaining or improving contaminant removal performance. Various aspects of the present disclosure provide the ability to use high carbon-to-binder ratios, ensuring most of the resulting activated carbon composite is activated carbon while maintaining binding properties. Various aspects of the present disclosure provide versatility in processing spent GAC or PAC, allowing for commingling of spent GAC or PAC while maintaining the ability to reshape particles such as for fixed vessel applications. Various aspects of the present disclosure provide optimization potential through manipulation of temperature, temperature profile, and residence time to produce improved sorbents for contaminant removal.

Various aspects of the present disclosure provide various economic advantages over other activated carbon sorbents, methods of making the same, or methods of treating water or gas. For example, various aspects of the present disclosure provide cost savings through the use of reactivated GAC or PAC, which can be dramatically cheaper compared to virgin GAC or PAC. Various aspects of the present disclosure provide extended bed life and reduced GAC or PAC quantity requirements through particle shape modification and addition or one or more additives. Various aspects of the present disclosure provide lower cost treatment of water or gas by combining PAC or GAC with additives to achieve similar or greater contaminant removal efficiency than the use of the same mass of PAC or GAC alone as the combined mass of the PAC/GAC and additives.

Various aspects of the present disclosure provide various environmental advantages over other activated carbon sorbent, methods of making the same, or methods of treating water or gas. For example, various aspects of the present disclosure provide enhanced sustainability through the ability to reuse and improve spent GAC and/or PAC rather than disposing of it.

Various aspects of the present disclosure provide destruction of contaminants in spent GAC or PAC through reactivation, such as PFAS contaminants. By destroying the contaminants, the method can provide a better option than disposal of the GAC or PAC. For example, disposal of PFAS loaded on GAC or PAC can be an environmental hazard and liability.

Various aspects of the present disclosure provide an activated carbon composite having a lower rate of attrition, resulting in better integrity and performance. The activated carbon composite having a lower rate of attrition can provide advantages in terms of handling, conveying, and transport.

Various aspects of the present disclosure provide synergistic performance enhancement advantages over other activated carbon sorbents, methods of making the same, or methods of treating water or gas. For example, various aspects of the present disclosure provide unexpected performance improvements through blending of different carbonaceous materials, such as wood-derived and coal- or petroleum-derived materials, that exceed the performance of individual components. Various aspects of the present disclosure demonstrate synergistic effects where combinations of materials with different surface area characteristics produce superior adsorption performance compared to single-component systems. Various aspects of the present disclosure provide the ability to achieve enhanced iodine numbers and PFAS removal capacity through strategic material combinations that leverage the complementary properties of carbonaceous materials with one another and/or with one or more additives.

Various aspects of the present disclosure provide synergistic enhancement advantages over other activated carbon sorbents, methods of making the same, or methods of treating water or gas. For example, various aspects of the present disclosure provide unexpected synergistic effects through the addition of alumina, alumina-containing materials, activated alumina, materials containing activated alumina, aluminum hydroxide, or materials including aluminum hydroxide to carbonaceous materials, resulting in marked improvement in PFAS removal even when the alumina or aluminum hydroxide alone shows minimal contaminant removal capability. Various aspects of the present disclosure demonstrate that alumina, activated alumina, aluminum hydroxide, or materials including the same can serve as a synergist on GAC or PAC surfaces that enhances PFAS adsorption beyond what would be expected from the individual components. Various aspects of the present disclosure provide enhanced contaminant removal through alumina-based, activated alumina-based, or aluminum hydroxide-based additives that create favorable surface interactions for improved PFAS capture. Various aspects of the present disclosure demonstrate that further improvement in PFAS removal can be achieved via the addition of iron or iron-containing materials to the carbonaceous materials, in addition to the alumina, alumina-containing materials, activated alumina, materials containing activated alumina, aluminum hydroxide, or materials including aluminum hydroxide.

Various aspects of the present disclosure provide optimization control advantages over other activated carbon sorbents, methods of making the same, or methods of treating water or gas. For example, various aspects of the present disclosure provide the ability to identify and utilize material ratios for improving or maximizing performance characteristics while controlling costs. Various aspects of the present disclosure demonstrate that specific blend ratios can provide superior performance compared to other ratios, allowing for targeted optimization of both technical performance and economic considerations. Various aspects of the present disclosure provide the flexibility to adjust material combinations to achieve desired performance metrics for specific contaminant removal applications.

Various aspects of the present disclosure provide performance restoration enhancement advantages over other activated carbon sorbents, methods of making the same, or methods of treating water or gas. For example, various aspects of the present disclosure provide the ability to significantly improve the performance of reactivated GAC or PAC through strategic addition of virgin materials at optimized ratios. Various aspects of the present disclosure demonstrate that composites of reactivated and virgin materials can achieve enhanced PFAS removal performance that approaches or exceeds virgin GAC or PAC capabilities while maintaining cost advantages. Various aspects of the present disclosure provide methods to restore and enhance spent carbon performance through selective material addition and processing techniques.

Various aspects of the present disclosure provide material utilization efficiency advantages over other activated carbon sorbents, methods of making the same, or methods of treating water or gas. For example, various aspects of the present disclosure provide the ability to enhance lower-cost materials such as biochar through strategic addition of higher-performance materials to achieve desired surface area and adsorption characteristics. Various aspects of the present disclosure demonstrate effective utilization of relatively inexpensive base materials and/or additives enhanced with smaller quantities of premium carbonaceous materials to achieve performance improvements at reduced overall cost. Various aspects of the present disclosure provide efficient material usage strategies that maximize or improve performance benefits while optimizing material costs and resource utilization.

BRIEF DESCRIPTION OF THE FIGURES

The drawings illustrate generally, by way of example, but not by way of limitation, various aspects of the present invention.

DETAILED DESCRIPTION OF THE INVENTION

Figure 1:
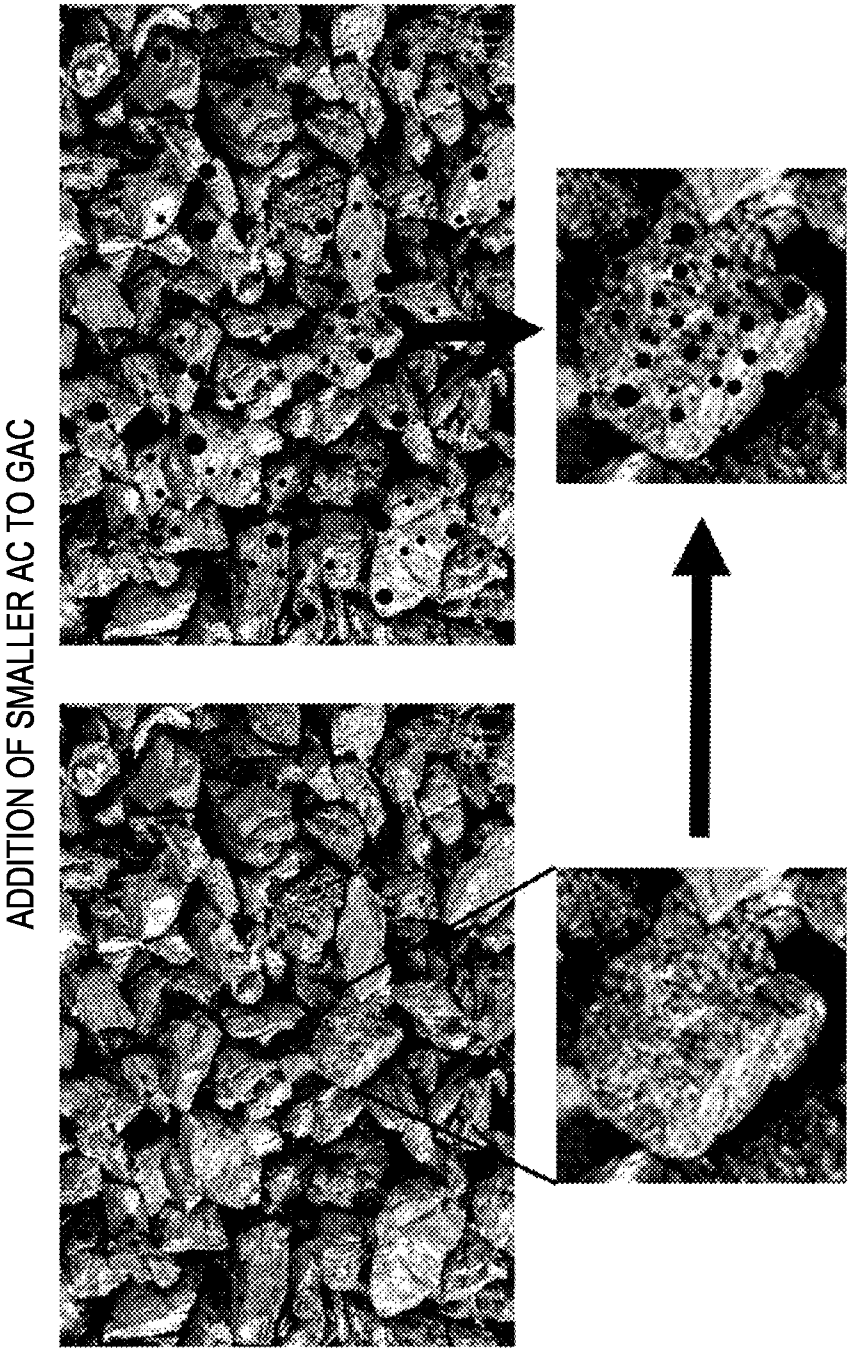
FIG. 1 illustrates addition of powdered activated carbon to granular activated carbon, in accordance with various aspects.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in a specific order as recited herein. Alternatively, in any aspect(s) disclosed herein, specific acts may be carried out in any order without departing from the principles of the invention, except when a temporal or operational sequence is explicitly recited. Furthermore, specified acts can be carried out concurrently unless explicit claim language recites that they be carried out separately or the plain meaning of the claims would require it. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Particle sizes denoted as $d_{50}$ or $d_{90}$ described herein can be determined via laser diffraction. A minimum sieve size is a size below which substantially none of the material (e.g., less than 1 wt %, or less than 0.1 wt %, or less than 0.01 wt %) passes. A maximum sieve size is the smallest sieve size which passes substantially all of the material (e.g., more than 99 wt %, or more than 99.9 wt %, or more than 99.99 wt %) therethrough. A sieve size is the range of sieve sizes between the maximum sieve size and the minimum sieve size.

Method of Forming an Activated Carbon Composite.

Various aspects of the present disclosure provide a method of forming an activated carbon composite. The method can optionally include performing a pre-treatment of a primary carbonaceous material. The method can include adding an additive composition to the primary carbonaceous material, to form a composite of the primary carbonaceous material and the additive composition. The method can optionally include performing a post-treatment of the composite of the primary carbonaceous material and the additive composition. At least one of the pre-treatment and the post-treatment are performed. The method forms the activated carbon composite. For example, if the post-treatment is not performed, the composite of the primary carbonaceous material and the additive composition can be the activated carbon composite, or a shaping of the composite of the primary carbonaceous material and the additive composition can be performed and the shaped composite of the primary carbonaceous material and the additive composition can be the activated carbon composite. For example, if the post-treatment is performed, the post-treatment can provide the activated carbon composite, or a shaping of the post-treatment product can be performed to provide the activated carbon composite.

The methods described herein can include restoring spent carbons to their near-virgin state, or better. Further, the methods are not only intended to restore spent carbons to their near-virgin state but also have the ability to improve the performance of virgin and spent carbons, such as the ability to sorb per- or poly-fluoroalkyl substances (PFAS). It should be noted that the terms sorb, absorb, or adsorb used within are not intended to restrict to any specific mechanism, but rather to broadly indicate capture, collect, hold on to, remove, and the like, contaminants from a gas or liquid.

The primary carbonaceous material can be any suitable carbonaceous material. The primary carbonaceous material can include biochar granulate, coal or petroleum char granulate, powdered biochar, powdered coal or petroleum char, wood-derived granular activated carbon, coal- or petroleum-derived granular activated carbon, wood-derived powdered activated carbon, coal- or petroleum-derived powdered activated carbon, virgin granulated activated carbon, reactivated powdered activated carbon, reactivated granulated activated carbon, spent activated carbon, spent powdered activated carbon, spent granulated activated carbon, or a combination thereof. Herein, biochar can be derived from any suitable biomaterial, such as wood, crop waste, bones, bamboo, coconut husk, peach pits, olive pits, nutshells, palm kernel shells, willow peat, coir, or a combination thereof. The primary carbonaceous material can include a granular carbonaceous material, such as biochar granulate, coal or petroleum char granulate, used granular activated carbon, virgin granular activated carbon, unactivated granular carbon, spent granular carbon, or a combination thereof; in such aspects, the activated carbon composite can be a granular activated carbon composite. The primary carbonaceous material can include used and/or spent granular activated carbon. The used and/or spent granular activated carbon can be contaminated with one or more sorbed materials, wherein the activated carbon composite has a concentration of the one or more sorbed materials that is less than 50% of a concentration of the one or more sorbed materials in the used and/or spent granular activated carbon, or 0.001% to 49% of a concentration of the one or more sorbed materials in the used and/or spent granular activated carbon, or less than or equal to 50% and greater than or equal to 0.001% and less than, equal to, or greater than 0.01%, 0.1, 0.5, 1, 2, 3, 4, 5, 6, 8, 10, 12, 14, 16, 18, 20, 25, 30, 35, 40, or 45%. The primary carbonaceous material can include a powdered carbon, such as a used powdered activated carbon, a virgin powdered activated carbon, an unactivated powdered carbon, or a combination thereof. The primary carbonaceous material can include used and/or spent powdered activated carbon. The used and/or spent powdered activated carbon can be contaminated with one or more sorbed materials, wherein the activated carbon composite has a concentration of the one or more sorbed materials that is less than 50% of a concentration of the one or more sorbed materials in the used and/or spent powdered activated carbon, or 0.001% to 49% of a concentration of the one or more sorbed materials in the used and/or spent powdered activated carbon, or less than or equal to 50% and greater than or equal to 0.001% and less than, equal to, or greater than 0.01%, 0.1, 0.5, 1, 2, 3, 4, 5, 6, 8, 10, 12, 14, 16, 18, 20, 25, 30, 35, 40, or 45%.

The used and/or spent granular or powdered activated carbon can be contaminated with one or more sorbed materials that include a perfluorinated alkyl compound or a polyfluorinated alkyl compound, wherein the activated carbon composite has a concentration of the perfluorinated alkyl compound or polyfluorinated alkyl compound that is 0.001% to 49% of a concentration of the perfluorinated alkyl compound or polyfluorinated alkyl compound in the used granular activated carbon. The perfluorinated alkyl compound or polyfluorinated alkyl compound can be a perfluoroalkyl or polyfluoroalkyl substance (PFAS), perfluoroalkyl substance, a polyfluoroalkyl substance, a perfluoroalkyl acid (PFAA), or a combination thereof. The perfluorinated alkyl compound or polyfluorinated alkyl compound can be perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

The primary carbonaceous material can have any suitable particle size. The primary carbonaceous material can have a $d_{50}$ particle size, a $d_{90}$ particle size, or a sieve size, in the range of 0.2 micron to 10 mm, or less than or equal to 10 mm and greater than or equal to 0.2 micron and less than, equal to, or greater than 0.3 microns, 0.4, 0.5, 0.6, 0.7, 0.8, 0.9, 1, 1.5, 2, 2.5, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, 9.5, or 10 mm. For example, the primary carbonaceous material can be a granular carbonaceous material (e.g., biochar granulate, coal or petroleum char granulate, used granular activated carbon, virgin granular activated carbon, unactivated granular carbon, spent granular carbon, or a combination thereof) having a $d_{50}$ particle size, a $d_{90}$ particle size, or a sieve size, in the range of 0.2 mm to 8 mm, or 0.2 mm to 5 mm, or less than or equal to 8 mm and greater than or equal to 0.2 mm and less than, equal to, or greater than 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, or 7.5 mm. The granular carbonaceous material can have a minimum sieve size through which the material passes of 0.2 mm to 8 mm, or 0.2 mm to 5 mm, or less than or equal to 8 mm and greater than or equal to 0.2 mm and less than, equal to, or greater than 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, or 7.5 mm. The granular carbonaceous material can have a maximum sieve size through which the material passes of 0.2 mm to 8 mm, or 0.2 mm to 5 mm, or less than or equal to 8 mm and greater than or equal to 0.2 mm and less than, equal to, or greater than 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, or 7.5 mm. The primary carbonaceous material can be a powered carbonaceous material (e.g., a used and/or spent powdered activated carbon, a virgin powdered activated carbon, an unactivated powdered carbon, a powdered biochar, a powdered coal or petroleum char, or a combination thereof) having a $d_{50}$ particle size, a $d_{90}$ particle size, or a sieve size, in the range of 0.2 microns to less than 200 microns, or 15 microns to 100 microns, or less than 200 microns and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a minimum sieve size through which the material passes of in the range of 0.2 microns to less than 200 microns, or 15 microns to 100 microns, or less than 200 microns and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a maximum sieve size through which the material passes of in the range of 0.2 microns to less than 200 microns, or 15 microns to 100 microns, or less than 200 microns and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns.

The additive composition can include an additive carbonaceous material, such as any suitable carbonaceous material, such as an organic substance, a binder, a powdered carbon (e.g., used and/or spent powdered activated carbon, a virgin powdered activated carbon, an unactivated powdered carbon, a powdered biochar, a powdered coal or petroleum char, or a combination thereof), or a combination thereof. The additive carbonaceous material can be any suitable proportion of the additive composition, such as about 0 wt %, or such as 5 wt % to 100 wt % of the additive composition, or 10 wt % to 100 wt %, or 20 wt % to 100 wt %, or 50 wt % to 100 wt %, or less than or equal to 100 wt % and greater than or equal to 0 wt % and less than, equal to, or greater than 1 wt %, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, or 99 wt %. The additive carbonaceous material can be any suitable proportion of the composite of the primary carbonaceous material and the additive composition, such as 0.001 wt % to 90 wt % of the composite of the primary carbonaceous material and the additive composition, or 0.001 wt % to 50 wt %, or 1 wt % to 40 wt %, or less than or equal to 90 wt % and greater than or equal to 0.001 wt % and less than, equal to, or greater than 0.01 wt %, 0.1, 1, 2, 3, 4, 5, 6, 8, 10, 12, 14, 16, 18, 20, 25, 30, 35, 40, 45, 50, 55, 60, 65, 70, 75, 80, or 85 wt %. The composite of the primary carbonaceous material and the additive composition can have any suitable mass ratio of the additive carbonaceous material to the primary carbonaceous material, such as 0.00001:1 to 7:1, or 0.00001:1 to 1:1, or 0.01:1 to 0.7:1, or less than or equal to 7:1 and greater than or equal to 0.00001:1 and less than, equal to, or greater than 0.00005:1, 0.0001:1, 0.0005:1, 0.001:1, 0.005:1, 0.01:1, 0.05:1, 0.1:1, 0.2:1, 0.3:1, 0.4:1, 0.5:1, 0.6:1, 0.7:1, 0.8:1, 0.9:1, 1:1, 2:1, 3:1, 4:1, 5:1, or 6:1. The composite of the primary carbonaceous material and the additive composition can have a mass ratio of the additive carbonaceous material to the primary carbonaceous material of 1:100 (0.01:1) to 100:1, or 1:10 (0.1:1) to 10:1, or 1:9 (0.11:1) to 7:3 (2.33:1), or 2:8 (0.25:1) to 6:4 (1.5:1), or less than or equal to 100:1 and greater than or equal to 0.01:1 and less than, equal to, or greater than 0.02:1, 0.03:1, 0.04:1, 0.05:1, 0.06:1, 0.07:1, 0.08:1, 0.09:1, 0.1:1, 0.15:1, 0.2:1, 0.25:1, 0.3:1, 0.35:1, 0.4:1, 0.45:1, 0.5:1, 0.55:1, 0.6:1, 0.65:1, 0.7:1, 0.75:1, 0.8:1, 0.85:1, 0.9:1, 0.95:1, 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, 3:1, 3.5:1, 4:1, 4.5:1, 5:1, 6:1, 7:1, 8:1, 9:1, 10:1, 12:1, 14:1, 16:1, 18:1, 20:1, 25:1, 30:1, 35:1, 40:1, 45:1, 50:1, 55:1, 60:1, 65:1, 70:1, 75:1, 80:1, 85:1, 90:1, or 95:1.

An additive carbonaceous material in the additive composition can be a powdered carbonaceous material, such as a wet powdered carbonaceous material (e.g., including at least some water and/or other solvents) or a dry powdered carbonaceous material (e.g., substantially free of water and other solvents). The powdered carbonaceous material can be a used and/or spent powdered activated carbon, a virgin powdered activated carbon, an unactivated powdered carbon, a powdered biochar, a powdered coal or petroleum char, or a combination thereof. In various aspects, the powdered carbonaceous material can be a virgin powdered activated carbon. The powdered carbonaceous material can be any suitable proportion of the additive composition, such as about 0 wt %, or such as 20 wt % to 100 wt % of the additive composition, or 50 wt % to 100 wt % of the additive composition, or less than or equal to 100 wt % and greater than or equal to 0 wt % and less than, equal to, or greater than 1 wt %, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, or 99 wt %. The powdered carbonaceous material can have any suitable particle size. For example, the powdered carbonaceous material can have a $d_{50}$ particle size, a $d_{90}$ particle size, or a sieve size, in the range of 0.2 microns to less than 200 microns, or 15 microns to 100 microns, or less than 200 microns and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a minimum sieve size through which the material passes of in the range of 0.2 microns to less than 200 microns, or 15 microns to 100 microns, or less than 200 microns and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a maximum sieve size through which the material passes of in the range of 0.2 microns to less than 200 microns, or 15 microns to 100 microns, or less than 200 microns and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns.

The powdered carbonaceous material can by any suitable proportion of the composite of the primary carbonaceous material and the additive composition, such as 0.001 wt % to 90 wt % of the composite of the primary carbonaceous material and the additive composition, 0.1 wt % to 40 wt %, 0.1 wt % to 10 wt %, 1 wt % to 40 wt %, or less than or equal to 90 wt % and greater than or equal to 0.001 wt % and less than, equal to, or greater than 0.005, 0.01, 0.05, 0.1, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, or 88 wt %. The composite of the primary carbonaceous material and the additive composition can have any suitable mass ratio of the powdered carbonaceous material to the primary carbonaceous material. For example, the composite of the primary carbonaceous material and the additive composition can have a mass ratio of the powdered carbonaceous material to the primary carbonaceous material of 0.00001:1 to 7:1, or 0.01:1 to 0.7:1, or less than or equal to 7:1 and greater than or equal to 0.00001:1 and less than, equal to, or greater than 0.00005:1, 0.0001:1, 0.0005:1, 0.001:1, 0.005:1, 0.01:1, 0.05:1, 0.1:1, 0.2:1, 0.3:1, 0.4:1, 0.5:1, 0.6:1, 0.7:1, 0.8:1, 0.9:1, 1:1, 1.5:1, 2:1, 2.5:1, 3:1, 3.5:1, 4:1, 4.5:1, 5:1, 5.5:1, 6:1, or 6.5:1. The composite of the primary carbonaceous material and the additive composition can have a mass ratio of the powdered carbonaceous material to the primary carbonaceous material of 1:100 (0.01:1) to 100:1, or 1:10 (0.1:1) to 10:1, or 1:9 (0.11:1) to 7:3 (2.33:1), or 2:8 (0.25:1) to 6:4 (1.5:1), or less than or equal to 100:1 and greater than or equal to 0.01:1 and less than, equal to, or greater than 0.02:1, 0.03:1, 0.04:1, 0.05:1, 0.06:1, 0.07:1, 0.08:1, 0.09:1, 0.1:1, 0.15:1, 0.2:1, 0.25:1, 0.3:1, 0.35:1, 0.4:1, 0.45:1, 0.5:1, 0.55:1, 0.6:1, 0.65:1, 0.7:1, 0.75:1, 0.8:1, 0.85:1, 0.9:1, 0.95:1, 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, 3:1, 3.5:1, 4:1, 4.5:1, 5:1, 6:1, 7:1, 8:1, 9:1, 10:1, 12:1, 14:1, 16:1, 18:1, 20:1, 25:1, 30:1, 35:1, 40:1, 45:1, 50:1, 55:1, 60:1, 65:1, 70:1, 75:1, 80:1, 85:1, 90:1, or 95:1.

The method can further include applying an electrical charge to the powdered carbonaceous material, adding one or more chemicals to alter a chemical charge of the powdered carbonaceous material, or a combination thereof. In other aspects, the method is free of applying an electrical charge to the powdered carbonaceous material or adding one or more chemicals to alter a chemical charge of the powdered carbonaceous material.

The composite of the primary carbonaceous material and the additive composition can have any suitable particle size. For example, the composite of the primary carbonaceous material and the additive composition can have a $d_{50}$ particle size, a $d_{90}$ particle size, or a sieve size, in the range of 0.2 microns to 10 mm, or 0.2 mm to 7 mm, or less than or equal to 10 mm and greater than or equal to 0.2 microns and less than, equal to, or greater than 0.3 microns, 0.4, 0.5, 0.6, 0.7, 0.8, 0.9, 1, 1.5, 2, 2.5, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, or 9.5 mm. The composite of the primary carbonaceous material and the additive composition can have a minimum sieve size through which the material passes of 0.2 microns to 10 mm, or 0.2 mm to 7 mm, or less than or equal to 10 mm and greater than or equal to 0.2 microns and less than, equal to, or greater than 0.3 microns, 0.4, 0.5, 0.6, 0.7, 0.8, 0.9, 1, 1.5, 2, 2.5, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, or 9.5 mm. The composite of the primary carbonaceous material and the additive composition can have a maximum sieve size through which the material passes of 0.2 microns to 10 mm, or 0.2 mm to 7 mm, or less than or equal to 10 mm and greater than or equal to 0.2 mm and less than, equal to, or greater than 0.3 microns, 0.4, 0.5, 0.6, 0.7, 0.8, 0.9, 1, 1.5, 2, 2.5, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, or 9.5 mm.

The activated carbon composite can have any suitable shape. The shape can be a regular shape or an irregular shape. For example, the activated carbon composite can have a shape including a sphere, a cylinder, an ovoid, or a polyhedron. The shape can be a shape that optimizes or improves the sorption of contaminants from gas and/or water while minimizing head loss for the treated fluid. The activated carbon composite can have a $d_{50}$ particle size, a $d_{90}$ particle size, or a sieve size that is larger than a corresponding $d_{50}$ particle size, $d_{90}$ particle size, or sieve size of the primary carbonaceous material. For example, the activated carbon composite can have a $d_{50}$ particle size, a $d_{90}$ particle size, or a sieve size that is 0.01% to 200% larger than a corresponding $d_{50}$ particle size, $d_{90}$ particle size, or sieve size of the primary carbonaceous material, or less than or equal to 200% larger and greater than or equal to 0.01% larger and less than, equal to, or greater than 0.05%, 0.1, 0.5, 1, 2, 4, 6, 8, 10, 15, 20, 25, 30, 40, 50, 60, 70, 80, 90, 100, 120, 140, 160, or 180% larger. The activated carbon composite can have $d_{50}$ particle size, a $d_{90}$ particle size, or a sieve size that is equal to or smaller than a corresponding $d_{50}$ particle size, $d_{90}$ particle size, or sieve size of the primary carbonaceous material.

The activated carbon composite can have an average mass per volume that is equal to or less than an average mass per volume of the primary carbonaceous material. For example, the activated carbon composite can have an average mass per volume that is 0% to 200% less than an average mass per volume of the primary carbonaceous material, or less than or equal to 200% less and greater than or equal to 0% less and less than, equal to, or greater than 0.05% less, 0.1, 0.5, 1, 2, 4, 6, 8, 10, 12, 14, 16, 18, 20, 25, 30, 40, 50, 60, 70, 80, 90, 100, 120, 140, 160, 180, or 190% less. The activated carbon composite can have an average mass per volume that is greater than an average mass per volume of the primary carbonaceous material. For example, the activated carbon composite can have an average mass per volume that is 0.01% to 800% greater than an average mass per volume of the primary carbonaceous material, or less than or equal to 800% greater and greater than or equal to 0.01% greater and less than, equal to, or greater than 0.05% larger, 0.1, 0.5, 1, 2, 4, 6, 8, 10, 12, 14, 16, 18, 20, 25, 30, 40, 50, 60, 70, 80, 90, 100, 120, 140, 160, 180, 200, 250, 300, 350, 400, 450, 500, 550, 600, 650, 700, or 750% larger.

The activated carbon composite can have about the same average number of through-pores per mass as the primary carbonaceous material. The activated carbon composite can have a greater number of through-pores per mass compared to the primary carbonaceous material. The activated carbon composite can have a smaller number of through-pores per mass compared to the primary carbonaceous material. The activated carbon composite can have about the same average pore size as the primary carbonaceous material. The activated carbon composite can have a greater average pore size as compared to the primary carbonaceous material.

The activated carbon composite can have a smaller average pore size as compared to the primary carbonaceous material. The activated carbon composite can have about the same pore volume as the primary carbonaceous material. The activated carbon composite can have a greater pore volume as compared to the primary carbonaceous material.

The activated carbon composite can have a smaller pore volume as compared to the primary carbonaceous material. The activated carbon composite can have about the same surface area per mass as the primary carbonaceous material. The activated carbon composite can have a lower surface area per mass as compared to the primary carbonaceous material. The activated carbon composite can have a greater surface area per mass as compared to the primary carbonaceous material.

The primary carbonaceous material can be any suitable proportion of the composite of the primary carbonaceous material and the additive composition. For example, the primary carbonaceous material can be 10 wt % to 99.999 wt % of the composite of the primary carbonaceous material and the additive composition, or 60 wt % to 99 wt %, or less than or equal to 99.999 wt % and greater than or equal to 10 wt % and less than, equal to, or greater than 12 wt %, 14, 16, 18, 20, 22, 24, 26, 28, 30, 32, 34, 36, 38, 40, 42, 44, 46, 48, 50, 52, 54, 56, 58, 60, 65, 70, 75, 80, 82, 84, 86, 88, 90, 91, 92, 93, 94, 95, 96, 97, 98, 99, 99.9, or 99.99 wt %. The additive composition can be any suitable proportion of the composite of the primary carbonaceous material and the additive composition, such as 0.001 wt % to 90 wt % of the composite of the primary carbonaceous material and the additive composition, or 1 wt % to 50 wt %, or less than or equal to 90 wt % and greater than or equal to 0.001 wt % and less than, equal to, or greater than 0.005 wt %, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, or 85 wt %.

The additive composition can include an additive carbonaceous material (e.g., a biochar, a coal or petroleum char, a biochar granulate, a coal or petroleum char granulate, a powdered biochar, a powdered coal or petroleum char, an organic substance, a binder, a powdered activated carbon, a granulated activated carbon, or a combination thereof), an organic substance, a metal, a metal salt, a metal oxide (e.g., alumina), an acid, an inorganic substance, a binder, a nitrogen-containing compound (e.g., ammonia, urea, or a combination thereof), water, or a combination thereof. The organic substance can include any suitable organic substance, such as a sugar, a fat, a protein, a carbohydrate, DNA, cellulose, chlorophyll, an enzyme, a hormone, a vitamin, petroleum, a plant, meat, a fruit, a vegetable, or a combination thereof. The metal can include any suitable metal, such as an elemental metal, such as an alkaline earth metal, silver, copper, aluminum, iron, or a combination thereof. The metal salt can include any suitable metal salt. The metal salt can include a halide salt of an alkaline earth metal, a hydroxide salt of an alkaline earth metal, or a combination thereof. The metal salt can include potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof. The acid can include any suitable acid, such as an organic acid or a mineral acid. The acid can include phosphoric acid. The inorganic substance can include any suitable inorganic substance, such as copper oxide, a zeolite, alumina, iron, iron oxide, or a combination thereof. In various aspects, the addition of the one or more additives can enhance the strength of the activated carbon composite, impact the rate of reaction during activation and/or thermal reactivation, enhance the sorption of various contaminants by the activated carbon composite (e.g., PFAS), or a combination thereof. The additive composition can include alumina, activated alumina, aluminum hydroxide, iron, bauxite, aluminum oxide, a clay (e.g., kaolinite or an aluminosilicate), an acid, a base, or a combination thereof. The additive composition can include alumina, activated alumina, aluminum hydroxide, iron, or a combination thereof. The additive composition can include alumina and/or a material that includes alumina. The additive composition can include activated alumina or a material that includes activated alumina. The additive composition can include aluminum hydroxide or a material that includes aluminum hydroxide. The additive composition can include iron or a composition that includes iron.

The additive composition can include any suitable binder. The binder can include a sulfonate, a starch, a highly viscous carbon solution (e.g., a pitch, such as a coal tar pitch), molasses, cellulose, a cellulose derivative, lignin, or a combination thereof. In the activated carbon composite, the binder can be in the form of a char, a pyrolyzed binder, a carbonized binder, or a combination thereof. In various aspects, the post-treatment includes processing condition (e.g., heating) that transforms the binder in the composite of the primary carbonaceous material and the additive composition (e.g., a sulfonate, a starch, a highly viscous carbon solution, molasses, cellulose, a cellulose derivative, lignin, or a combination thereof) into the form of a char, a pyrolyzed binder, a carbonized binder, or a combination thereof.

The binder can be any suitable proportion of the additive composition, such as 0.001 wt % to 80 wt % of the additive composition, or 0.001 wt % to 50 wt % of the additive composition, or less than or equal to 80 wt % and greater than or equal to 0.001 wt % and less than, equal to, or greater than 0.005 wt %, 0.01, 0.05, 0.1, 0.5, 1, 2, 3, 4, 5, 6, 7, 8, 9, 10, 12, 14, 16, 18, 20, 25, 30, 35, 40, 45, 50, 55, 60, 65, 70, or 75 wt %. The binder can be any suitable proportion of the composite of the primary carbonaceous material and the additive composition, such as or 0.0001 wt % to 20 wt % of the composite of the primary carbonaceous material and the additive composition, or 0.1 wt % to 15 wt %, or less than or equal to 20 wt % and greater than or equal to 0.0001 wt % and less than, equal to, or greater than 0.0005 wt %, 0.001, 0.005, 0.01, 0.05, 0.1, 0.5, 1, 2, 3, 4, 5, 6, 7, 8, 9, 10, 11, 12, 13, 14, 15, 16, 17, 18, or 19 wt %. The binder can be any suitable proportion of a total amount of primary carbonaceous material and any powdered carbonaceous material in the composite of the primary carbonaceous material, such as 0.0001 wt % to 20 wt %, or 0.1 wt % to 15 wt %, or less than or equal to 20 wt % and greater than or equal to 0.0001 wt % and less than, equal to, or greater than 0.0005 wt %, 0.001, 0.005, 0.01, 0.05, 0.1, 0.5, 1, 2, 3, 4, 5, 6, 7, 8, 9, 10, 11, 12, 13, 14, 15, 16, 17, 18, or 19 wt %.

In various aspects, the pre-treatment is not performed, and the method is free of the pre-treatment. In other aspects, the pre-treatment is performed. The pre-treatment can activate the primary carbonaceous material, the pre-treatment can add one or more materials to the primary carbonaceous material, the pre-treatment can process the primary carbonaceous material to prepare it for combination with the additive composition, or a combination thereof. The pre-treatment can include heating, adding one or more additives, steam treatment, $CO_2$ treatment, oxygen treatment, nitrogen treatment, treatment with a nitrogen-containing compound (e.g., ammonia, urea, or a combination thereof), application of vacuum, application of pressure, soaking, applying an electrical charge to the primary carbonaceous material, adding one or more chemicals to alter a chemical charge of the primary carbonaceous material, drying, addition of water, or a combination thereof. The pre-treatment can include soaking in a liquid (e.g., water, or an organic solvent) including the one or more additives. In various aspects, the pre-treatment can include soaking in a liquid that includes an additive carbonaceous material. In various aspects, the soaking can add carbon to the material being soaked (e.g., granular activated carbon), can remove contaminates from the material being soaked (e.g., used and/or spent granular activated carbon), or a combination thereof. In various aspects, the pre-treatment can include size manipulation such as reducing size such as by grinding, or increasing size such as by agglomeration.

The pre-treatment can include heating to a heating temperature. The heating temperature can include a temperature of 100° C. to 1200° C., or 250° C. to 1200° C., or 600° C. to 900° C., or less than or equal to 1200° C. and greater than or equal to 100° C. and less than, equal to, or greater than 150° C., 200, 250, 300, 350, 400, 450, 500, 550, 600, 620, 640, 650, 660, 680, 700, 720, 740, 750, 760, 780, 800, 820, 840, 850, 860, 880, 900, 950, 1000, 1050, 1100, or 1150° C. The heating can include heating in an oxygenated environment, such as an environment including at least 5 vol % or more oxygen, such as in air. The oxygenated environment can include 5 vol % to 100 vol % oxygen, or less than or equal to 100 vol % and greater than or equal to 5 vol % and less than, equal to, or greater than 6 vol %, 8, 10, 12, 14, 16, 18, 20, 25, 30, 35, 40, 45, 50, 55, 60, 65, 70, 75, 80, 85, 90, or 95 vol %. The heating can include heating in a substantially non-oxygenated environment, such as an environment including less than 5 vol % oxygen, such as 0 vol % to less 4 vol % oxygen, or less than or equal to 5 vol % and greater than or equal to 0 vol % and less than, equal to, or greater than 0.01 vol %, 0.05, 0.1, 0.5, 1, 1.5, 2, 2.5, 3, 3.5, 4, or 4.5 vol %. The heating can include heating in the presence of $CO_2$, oxygen, steam, nitrogen, or a combination thereof. The heating can include heating in the presence of one of more additives added to the primary carbonaceous material. The heating can include heating to the heating temperature for a duration of 1 minute to 240 hours, or less than or equal to 240 hours and greater than or equal to 1 minute and less than, equal to, or greater than 2 minutes, 3, 4, 5, 10, 15, 20, 25, 30, 35, 40, 45, 50, 55 minutes, 1 hour, 2 hours, 3, 4, 5, 6, 7, 8, 9, 10, 11, 12, 13, 14, 15, 16, 17, 18, 19, 20, 21, 22, 23, 24, 26, 28, 30, 35, 40, 45, 50, 60, 70, 80, 90, 100, 110, 120, 130, 140, 150, 160, 170, 180, 190, 200, 210, 220, or 230 hours.

The pre-treatment can include adding one or more additives to the primary carbonaceous material. The one or more additives can include any suitable additive, such as an organic substance, a metal, a metal salt, a metal oxide (e.g., alumina), an acid, an inorganic substance, a binder, or a combination thereof. The metal can include any suitable metal, such as an elemental metal, such as an alkaline earth metal, silver, copper, aluminum, iron, or a combination thereof. The metal salt can include any suitable metal salt, such as a halide salt of an alkaline earth metal, a hydroxide salt of an alkaline earth metal, or a combination thereof. The metal salt can include potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof. The acid can include any suitable acid, such as an organic acid or a mineral acid. The acid can include phosphoric acid. The inorganic substance can include any suitable inorganic substance, such as copper oxide, a zeolite, alumina, iron, iron oxide, or a combination thereof. In various aspects, the addition of the one or more additives can enhance the strength of the activated carbon composite, impact the rate of reaction during activation and/or thermal reactivation, enhance the sorption of contaminants by the activated carbon composite (e.g., PFAS), or a combination thereof. The one or more additives can include alumina, activated alumina, aluminum hydroxide, iron, bauxite, aluminum oxide, a clay (e.g., kaolinite or an aluminosilicate), an acid, a base, or a combination thereof. The one or more additives can include alumina, activated alumina, aluminum hydroxide, iron, or a combination thereof.

Various aspects of the method can be free of a shaping step as described herein, and the activated carbon composite can be shaped merely by virtue of having the additive composition added thereto. In other aspects, the method can further include performing shaping. The method can include performing shaping of the primary carbonaceous material before and/or after the optional pre-treatment step, performing shaping of the composite of the primary carbonaceous material and the additive composition before and/or after the optional post-treatment step, or a combination thereof. The shaping can include any suitable shaping method, such as grinding, molding, tumbling, extrusion, pelletizing, use of a pin mixer, fluidization, shear forces, impaction, or a combination thereof. The material being shaped can include water and can be dried after shaping such as during a later treatment step. The shaping can include forming the material being shaped into any suitable shape that can be achieved using grinding, molding, tumbling, extrusion, pelletizing, use of a pin mixer, fluidization, shear forces, impaction, or a combination thereof. The shaping can include forming the material into irregular or regular shaped materials. The shaping into a regular shaped material can include shaping into a cylinder, a sphere, an ovoid, or a polyhedron. The shape formed can be a shape that optimizes or improves the sorption of contaminants from gas and/or water while minimizing head loss for the treated fluid.

In various aspects, the post-treatment is not performed, and the method is free of the post-treatment. In such aspects, the composite of the primary carbonaceous material and the additive composition can be the activated carbon composite, or shaping can be performed on the composite of the primary carbonaceous material and the additive material and the additive composition and the product of the shaping is the activated carbon composite.

In various aspects, the post-treatment is performed. The post-treatment can activate the composite of the primary carbonaceous material and the additive composition, the post-treatment can add one or more materials to the composite of the primary carbonaceous material and the additive composition, the post-treatment can process the primary carbonaceous material to prepare it for shaping, or a combination thereof. The post-treatment can include heating, adding one or more additives, steam treatment, $CO_2$ treatment, oxygen treatment, nitrogen treatment, treatment with a nitrogen-containing compound (e.g., ammonia, urea, or a combination thereof), application of vacuum, application of pressure, soaking, drying, addition of water, or a combination thereof. The post-treatment can include soaking in a liquid (e.g., water or an organic solvent) including the one or more additives. The post-treatment can include soaking in a liquid including an additive carbonaceous material. In various aspects, the soaking can add carbon to the material being soaked (e.g., granular activated carbon), can remove contaminates from the material being soaked (e.g., used and/or spent granular activated carbon), or a combination thereof.

The post-treatment can include heating to a heating temperature. The heating temperature can be a temperature of 100° C. to 1200° C., or 250° C. to 1200° C., or 600° C. to 900° C., or less than or equal to 1200° C. and greater than or equal to 100° C. and less than, equal to, or greater than 150° C., 200, 250, 300, 350, 400, 450, 500, 550, 600, 620, 640, 650, 660, 680, 700, 720, 740, 750, 760, 780, 800, 820, 840, 850, 860, 880, 900, 950, 1000, 1050, 1100, or 1150° C. The heating can include heating in an oxygenated environment, such as an environment including at least 5 vol % or more oxygen, such as in air. The oxygenated environment can include 5 vol % to 100 vol % oxygen, or less than or equal to 100 vol % and greater than or equal to 5 vol % and less than, equal to, or greater than 6 vol %, 8, 10, 12, 14, 16, 18, 20, 25, 30, 35, 40, 45, 50, 55, 60, 65, 70, 75, 80, 85, 90, or 95 vol %. The heating can include heating in a substantially non-oxygenated environment, such as an environment including less than 5 vol % oxygen, such as 0 vol % to less 4 vol % oxygen, or less than or equal to 5 vol % and greater than or equal to 0 vol % and less than, equal to, or greater than 0.01 vol %, 0.05, 0.1, 0.5, 1, 1.5, 2, 2.5, 3, 3.5, 4, or 4.5 vol %. The heating can include heating in the presence of $CO_2$, oxygen, steam, nitrogen, or a combination thereof. The heating can include heating in the presence of one of more additives added to the composite of the primary carbonaceous material and the additive composition. The heating can include heating to the heating temperature for a duration of 1 minute to 240 hours, or less than or equal to 240 hours and greater than or equal to 1 minute and less than, equal to, or greater than 2 minutes, 3, 4, 5, 10, 15, 20, 25, 30, 35, 40, 45, 50, 55 minutes, 1 hour, 2 hours, 3, 4, 5, 6, 7, 8, 9, 10, 11, 12, 13, 14, 15, 16, 17, 18, 19, 20, 21, 22, 23, 24, 26, 28, 30, 35, 40, 45, 50, 60, 70, 80, 90, 100, 110, 120, 130, 140, 150, 160, 170, 180, 190, 200, 210, 220, or 230 hours.

The post-treatment can include adding one or more additives to the composite of the primary carbonaceous material and the additive composition. The one or more additives can include any suitable additive, such as an organic substance, a metal, a metal salt, a metal oxide (e.g., alumina), an acid, an inorganic substance, a binder, or a combination thereof. The metal can include any suitable metal, such as an elemental metal, such as an alkaline earth metal, silver, copper, aluminum, iron, or a combination thereof. The metal salt can include any suitable metal salt, such as a halide salt of an alkaline earth metal, a hydroxide salt of an alkaline earth metal, or a combination thereof. The metal salt can include potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof. The acid can include any suitable acid, such as an organic acid or a mineral acid. The acid can include phosphoric acid. The inorganic substance can include any suitable inorganic substance, such as copper oxide, a zeolite, alumina, iron, iron oxide, or a combination thereof. In various aspects, the addition of the one or more additives can enhance the strength of the activated carbon composite, impact the rate of reaction during activation and/or thermal reactivation, enhance the sorption of contaminants by the activated carbon composite (e.g., PFAS), or a combination thereof. The one or more additives can include alumina, activated alumina, aluminum hydroxide, iron, bauxite, aluminum oxide, a clay (e.g., kaolinite or an aluminosilicate), an acid, a base, or a combination thereof. The one or more additives can include alumina, activated alumina, aluminum hydroxide, iron, or a combination thereof.

In various aspects, the method can include performing both the pre-treatment and the post-treatment.

In various aspects, the primary carbonaceous material is the starting material for the method and the method is free of any pre-processing steps prior to performing the optional pre-treatment or performing the addition of the additive composition to the primary carbonaceous material to form the composite of the primary carbonaceous material and the additive composition. In other aspects, the method can include carbonizing a starting material to form the primary carbonaceous material. The starting material can be any suitable material from which primary carbonaceous material can be formed, such as bituminous coal, bones, bamboo, coconut husk, peach pits, olive pits, nutshells, palm kernel shells, willow peat, wood, coir, lignite, coal, petroleum pitch, or a combination thereof. The method can further includes granulating the starting material prior to performing the carbonizing. The method can include granulating the starting material after the carbonizing to form the primary carbonaceous material. The carbonizing can include heating, such as heating in a substantially non-oxygenated environment, such as an environment including less than 5 vol % oxygen, such as 0 vol % to less 4 vol % oxygen, or less than or equal to 5 vol % and greater than or equal to 0 vol % and less than, equal to, or greater than 0.01 vol %, 0.05, 0.1, 0.5, 1, 1.5, 2, 2.5, 3, 3.5, 4, or 4.5 vol %. The heating can include heating to a temperature of 100° C. to 1200° C., or 250° C. to 1200° C. in a substantially non-oxygenated environment, or 600° C. to 900° C., or less than or equal to 1200° C. and greater than or equal to 100° C. and less than, equal to, or greater than 150° C., 200, 250, 300, 350, 400, 450, 500, 550, 600, 620, 640, 650, 660, 680, 700, 720, 740, 750, 760, 780, 800, 820, 840, 850, 860, 880, 900, 950, 1000, 1050, 1100, or 1150° C.

The activated carbon composite can have a ball pan hardness of 70% to 100%, or 85% to 99%, or less than or equal to 100% and greater than or equal to 70% and less than, equal to, or greater than 71%, 72, 73, 74, 75, 76, 77, 78, 79, 80, 81, 82, 83, 84, 85, 86, 87, 88, 89, 90, 91, 92, 93, 94, 95, 96, 97, 98, or 99%.

The activated carbon composite can have an iodine number of 300 mg/g to 1,000 mg/g, or 400 mg/g to 800 mg/g, or less than or equal to 1,000 mg/g and greater than or equal to 300 mg/g and less than, equal to, or greater than 320 mg/g, 340, 360, 380, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 820, 840, 860, 880, 900, 920, 940, 960, or 980 mg/g.

The activated carbon composite can have an ash percentage of 1% to 20%, or 5% to 15%, or less than or equal to 20% and greater than or equal to 1% and less than, equal to, or greater than 2%, 3, 4, 5, 6, 7, 8, 9, 10, 10.5, 11, 11.5, 12, 12.5, 13, 13.5, 14, 14.5, 15, 16, 17, 18, or 19%.

Activated Carbon Composite.

Various aspects of the present disclosure provide an activated carbon composite formed by any one of the methods described herein for forming an activated carbon composite.

Various aspects of the present disclosure provide an activated carbon composite. The activated carbon composite includes a primary carbonaceous material. The activated carbon composite includes an additive composition at least one of adhered to, within, and mixed with the primary carbonaceous material. The additive composition can be at least one of adhered to, within, and mixed with the primary carbonaceous material in any suitable way. In various aspects, the additive composition is at least one of directly adhered to, within, and mixed with the primary carbonaceous material without any binders (e.g., via mechanofusion). In various aspects, the additive composition is at least one of adhered to, within, and mixed with the primary carbonaceous material via one or more binders that are in a form in the activated carbon composite including a char, a pyrolyzed binder, a carbonized binder, or a combination thereof.

Method of Treating Water or Gas.

Various aspects of the present disclosure provide a method of treating water or gas. The method can include contacting contaminated water or gas including one or more contaminants with the activated carbon composite of the present disclosure or a ground product thereof to form treated water or gas having a lower concentration of the one or more contaminants than the contaminated water or gas.

Various aspects of the present disclosure provide a method of treating gas. The method can include contacting contaminated gas including one or more contaminants with the activated carbon composite of the present disclosure or a ground product thereof to form treated gas having a lower concentration of the one or more contaminants that the contaminated gas. The gas can be any suitable one or more gases. The gas can be air. The gas can be industrially-produced gas, such as industrially-produced gas, industrially-produced air, or one or more other gases.

The one or more contaminants can be any suitable one or more contaminants that can be removed with the activated carbon composite. In various aspects, the one or more contaminants can include a perfluorinated alkyl compound or a polyfluorinated alkyl compound. The perfluorinated alkyl compound or polyfluorinated alkyl compound can be a perfluoroalkyl or polyfluoroalkyl substance (PFAS), perfluoroalkyl substance, a polyfluoroalkyl substance, a perfluoroalkyl acid (PFAA), or a combination thereof. The perfluorinated alkyl compound or polyfluorinated alkyl compound can be perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Various aspects of the present disclosure provide a method of treating water or gas. The method includes contacting contaminated water or gas including one or more contaminants with a carbonaceous material and one or more additives. The contacting forms treated water or gas having a lower concentration of the one or more contaminants than the contaminated water or gas. The carbonaceous material can be any suitable carbonaceous material described for use as the primary carbonaceous material in aspects of the present disclosure toward the method of forming the activated carbon composite. The one or more additives can be any one or more components from the additive composition described herein in aspects of the present disclosure toward the method of forming the activated carbon composite.

In various aspects, the method includes adding the contaminated water or gas to the carbonaceous material and the one or more additives. In various aspects, the method includes adding the carbonaceous material and the one or more additives to the contaminated water or gas. In various aspects, the carbonaceous material can be combined with the contaminated water or gas separately from one another, such as by separately combining the carbonaceous material with the water or gas and combining the one or more additives with the water or gas. In various aspects, the method includes adding the carbonaceous material and the one or more additives to the water or gas together with one another, such as by addition of a composite including the carbonaceous material and the one or more additives or a ground product thereof, or such as by addition of a mixture of the carbonaceous material and the one or more additives wherein the carbonaceous material and the one or more additives are separate and discrete particles in the mixture and are not fused in the form of a composite. The contacting can include stirring and/or agitating a mixture of the contaminated water or gas and the carbonaceous material and the one or more additives. The contacting can include forming a substantially homogeneous mixture of the water or gas and the carbonaceous material and the one or more additives. The contacting can include running the contaminated water through any suitable type of water-solid separator that includes the carbonaceous material and one or more additives, such as a column, a plate separator, a clarifier, a gravity/settling device, a decanter, filtration media, a filtration device, a filter bed, a centrifuge, or a combination thereof. The contacting can include running the contaminated gas through any suitable type of gas-solid separator that includes the carbonaceous material and the one or more additives, such as a column, a plate separator, an electrostatic separator, filtration media, a filtration device, a filter bed, or a combination thereof.

In various aspects, the contacting of the contaminated water or gas with the carbonaceous material and the one or more additives includes contacting the contaminated water or gas with the activated carbon composite described herein, or a ground product thereof. A ground product of the activated carbon composite is ground to reduce the particle size thereof. The ground product can be produced by any suitable method, such as via grinding, pulverizing, crushing, milling, granulating, or a combination thereof. The ground product can have any suitable particle size, such as a $d_{50}$ particle size, a $d_{90}$ particle size, or a sieve size, in the range of 0.2 microns to 10 mm, or less than or equal to 10 mm and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, 9.5, or 10 mm.

The contacting can include using the combination of the carbonaceous material and the one of the additives in the contaminated water or gas such that the contaminated water or gas has a loading level of the combination of the carbonaceous material and the one or more additives of 0.01 mg/L to 1,000 mg/L, or 10 mg/L to 100 mg/L, or less than or equal to 1,000 mg/L and greater than or equal to 0.01 mg/L and less than, equal to, or greater than 0.05 mg/L, 0.1, 0.5, 1, 1.5, 2, 4, 6, 8, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, or 950 mg/L. The contacting can include using the combination of the carbonaceous material and the one of the additives in the contaminated water or gas such that the contaminated water or gas has a carbon loading level of the combination of the carbonaceous material and the one or more additives of 0.01 mg/L to 1,000 mg/L, or 10 mg/L to 100 mg/L, or less than or equal to 1,000 mg/L and greater than or equal to 0.01 mg/L and less than, equal to, or greater than 0.05 mg/L, 0.1, 0.5, 1, 1.5, 2, 4, 6, 8, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, or 950 mg/L. The contacting can include using the combination of the carbonaceous material and the one or more additives in the contaminated water or gas such that the contaminated water or gas has a weight ratio of the carbonaceous material to the one or more additives of 1:100 (0.01:1) to 100:1, or 1:10 (0.1:1) to 10:1, or 1:9 (0.11:1) to 7:3 (2.33:1), or 2:8 (0.25:1) to 6:4 (1.5:1), or less than or equal to 100:1 and greater than or equal to 0.01:1 and less than, equal to, or greater than 0.02:1, 0.03:1, 0.04:1, 0.05:1, 0.06:1, 0.07:1, 0.08:1, 0.09:1, 0.1:1, 0.15:1, 0.2:1, 0.25:1, 0.3:1, 0.35:1, 0.4:1, 0.45:1, 0.5:1, 0.55:1, 0.6:1, 0.65:1, 0.7:1, 0.75:1, 0.8:1, 0.85:1, 0.9:1, 0.95:1, 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, 3:1, 3.5:1, 4:1, 4.5:1, 5:1, 6:1, 7:1, 8:1, 9:1, 10:1, 12:1, 14:1, 16:1, 18:1, 20:1, 25:1, 30:1, 35:1, 40:1, 45:1, 50:1, 55:1, 60:1, 65:1, 70:1, 75:1, 80:1, 85:1, 90:1, or 95:1.

The method can further include separating the carbonaceous material and the one or more additives from the contaminated water or gas contacted with the same. The water or gas separated from the combination of the carbonaceous material and the one or more additives and the contaminated water or gas can be the treated water or gas. The separating can be performed in any suitable way. For example, the separating can include decantation, filtration, centrifugation, or a combination thereof. The separating can include filtration. The separating for water can include the use of any suitable type of water-solid separator such as a column, a plate separator, a clarifier, a gravity/settling device, a decanter, filtration media, a filtration device, a filter bed, a centrifuge, or a combination thereof. The separating for gas can include the use of any suitable type of gas-solid separator such as a column, a plate separator, an electrostatic separator, filtration media, a filtration device, a filter bed, or a combination thereof.

The contacting of the carbonaceous material and the one or more additives with the contaminated water or gas can be performed at any suitable temperature, such as a temperature of 0.1° C. to 150° C., or 10° C. to 35° C., or less than or equal to 150° C. and greater than or equal to 0.1° C. and less than, equal to, or greater than 1° C., 2, 4, 6, 8, 10, 15, 16, 17, 18, 19, 20, 21, 22, 23, 24, 25, 30, 35, 40, 45, 50, 55, 60, 65, 70, 75, 80, 85, 90, 95, 100, 110, 120, 130, or 140° C. The contacting of the carbonaceous material and the one or more additives with the contaminated water or gas can be performed at ambient temperature and/or room temperature. The contacting of the carbonaceous material and the one or more additives with the contaminated water or gas can be performed at any suitable pressure, such as a pressure of 10 kPa to 1,000 kPa, or 95 kPa to 105 kPa, or less than or equal to 1,000 kPa and greater than or equal to 10 kPa and less than, equal to, or greater than 20 kPa, 30, 40, 50, 60, 70, 80, 90, 91, 92, 93, 94, 95, 96, 97, 98, 99, 100, 101, 102, 103, 104, 105, 106, 107, 108, 109, 110, 120, 130, 140, 150, 200, 250, 300, 350, 400, 450, 500, 550, 600, 650, 700, 750, 800, 850, 900, or 950 kPa. The contacting of the carbonaceous material and the one or more additives with the contaminated water or gas can be performed at ambient pressure and/or atmospheric pressure. The contacting can be performed for any suitable duration, such as a duration of 1 second to 7 days, or 10 minutes to 24 hours, or less than or equal to 7 days and greater than or equal to 1 second and less than, equal to, or greater than 5 seconds, 10, 15, 20, 25, 30, 30, 40, 45, 50, 55 seconds, 1 minute, 1.5, 2, 2.5, 3, 3.5, 4, 5, 6, 8, 10, 15, 20, 25, 30, 35, 40, 45, 50, 55 minutes, 1 hour, 2, 3, 4, 5, 6, 7, 8, 9, 10, 11, 12, 13, 14, 15, 16, 17, 18, 19, 20, 21, 22, 23 hours, 1 day, 1.5, 2, 2.5, 3, 3.5, 4, 4.5, 5, 5.5, 6, or 6.5 days. The contacting can be performed as a batch process. The contacting can be performed as a continuous process.

The carbonaceous material can include any suitable carbonaceous material. The carbonaceous material can include a granular activated carbon, a granular biochar, a granular coal or petroleum char, a powdered carbon (e.g., a powdered biochar, a powdered coal or petroleum char, used powdered activated carbon, virgin powdered activated carbon, unactivated powdered carbon, or a combination thereof), or a combination thereof. The carbonaceous material can include char, biochar, coal or petroleum char, wood-derived granular activated carbon, coal- or petroleum-derived granular activated carbon, wood-derived powdered activated carbon, coal- or petroleum-derived powdered activated carbon, virgin granulated activated carbon, reactivated powdered activated carbon, reactivated granulated activated carbon, spent granulated activated carbon, spent powdered activated carbon, or a combination thereof. The carbonaceous material can have any suitable particle size. The carbonaceous material can have a $d_{50}$ particle size, a $d_{90}$ particle size, or a sieve size, in the range of 0.2 micron to 10 mm, or less than or equal to 10 mm and greater than or equal to 0.2 micron and less than, equal to, or greater than 0.3, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, 9.5, or 10 mm. For example, the carbonaceous material can be a granular carbonaceous material (e.g., granulated biochar, granulated coal or petroleum char, used granular activated carbon, virgin granular activated carbon, unactivated granular carbon, spent granular carbon, or a combination thereof) having a $d_{50}$ particle size, a $d_{90}$ particle size, or a sieve size, in the range of 0.2 microns to 10 mm, or 0.2 mm to 5 mm, or less than or equal to 10 mm and greater than or equal to 0.2 microns and less than, equal to, or greater than 0.3 microns, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, or 7.5 mm. The granular carbonaceous material can have a minimum sieve size through which the material passes of 0.2 mm to 10 mm, or 0.2 mm to 5 mm, or less than or equal to 8 mm and greater than or equal to 0.2 mm and less than, equal to, or greater than 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, or 9.5 mm. The granular carbonaceous material can have a maximum sieve size through which the material passes of 0.2 mm to 10 mm, or 0.2 mm to 5 mm, or less than or equal to 8 mm and greater than or equal to 0.2 mm and less than, equal to, or greater than 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, or 9.5 mm. The carbonaceous material can be a powered carbonaceous material (e.g., a powdered biochar, a powdered coal or petroleum char, a used and/or spent powdered activated carbon, a virgin powdered activated carbon, an unactivated powdered carbon, or a combination thereof) having a $d_{50}$ particle size, a $d_{90}$ particle size, or a sieve size, in the range of 0.2 microns to less than 200 microns, or 15 microns to 100 microns, or less than 200 microns and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a minimum sieve size through which the material passes of in the range of 0.2 microns to less than 200 microns, or 15 microns to 100 microns, or less than 200 microns and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a maximum sieve size through which the material passes of in the range of 0.2 microns to less than 200 microns, or 15 microns to 100 microns, or less than 200 microns and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns.

The one or more additives can include an organic substance, a binder, a powdered carbon (e.g., powdered biochar, powdered coal or petroleum char, used powdered activated carbon, virgin powdered activated carbon, unactivated powdered carbon, or a combination thereof), a metal, a metal salt, a metal oxide (e.g., alumina), an acid, an inorganic substance, a nitrogen-containing compound (e.g., urea, ammonia, or a combination thereof), or a combination thereof. The organic substance can include any suitable organic substance, such as a sugar, a fat, a protein, a carbohydrate, DNA, cellulose, chlorophyll, an enzyme, a hormone, a vitamin, petroleum, a plant, meat, a fruit, a vegetable, or a combination thereof. The metal can include any suitable metal, such as an alkaline earth metal, silver, copper, aluminum, iron, or a combination thereof. The metal salt can include any suitable metal salt, such as a halide salt of an alkaline earth metal, a hydroxide salt of an alkaline earth metal, or a combination thereof. The metal salt can include potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof. The acid can include any suitable acid, such as phosphoric acid. The inorganic substance can include any suitable inorganic substance, such as copper oxide, a zeolite, alumina, iron, iron oxide, or a combination thereof. The binder can include any suitable binder, such as a sulfonate, a starch, a highly viscous carbon solution, molasses, cellulose, a cellulose derivative, lignin, a char, a pyrolyzed binder, a carbonized binder, or a combination thereof. The one or more additives can include alumina, activated alumina, aluminum hydroxide, iron, bauxite, aluminum oxide, a clay (e.g., kaolinite or an aluminosilicate), an acid, a base, or a combination thereof. The one or more additives can include alumina, activated alumina, aluminum hydroxide, iron, a material containing any one or any combination thereof, or a combination thereof.

The one or more additives can have a $d_{50}$ particle size, a $d_{90}$ particle size, or a sieve size, in the range of 0.2 microns to 10 mm, or less than or equal to 10 mm and greater than or equal to 0.2 microns and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, 190 microns, 0.2 mm, 0.3, 0.4, 0.5, 0.6, 0.7, 0.8, 0.9, 1, 1.2, 1.4, 1.6, 1.8, 2, 2.5, 3, 3.5, 4, 4.5, 5, 5.5, 6, 6.5, 7, 7.5, 8, 8.5, 9, 9.5, or 10 mm.

The one or more additives can include an additive carbonaceous material that can be a powdered carbonaceous material, such as a wet powdered carbonaceous material (e.g., including at least some water and/or other solvents) or a dry powdered carbonaceous material (e.g., substantially free of water and other solvents). The powdered carbonaceous material can be a powdered biochar, a powdered coal or petroleum char, used and/or spent powdered activated carbon, a virgin powdered activated carbon, an unactivated powdered carbon, or a combination thereof. In various aspects, the powdered carbonaceous material can be a virgin powdered activated carbon. The powdered carbonaceous material can be any suitable proportion of the one or more additives, such as about 0 wt %, or such as 20 wt % to 100 wt % of the additive composition, or 50 wt % to 100 wt % of the additive composition, or less than or equal to 100 wt % and greater than or equal to 0 wt % and less than, equal to, or greater than 1 wt %, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, or 99 wt %. The powdered carbonaceous material can have any suitable particle size. For example, the powdered carbonaceous material can have a $d_{50}$ particle size, a $d_{90}$ particle size, or a sieve size, in the range of 0.2 microns to less than 200 microns, or 15 microns to 100 microns, or less than 200 microns and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a minimum sieve size through which the material passes of in the range of 0.2 microns to less than 200 microns, or 15 microns to 100 microns, or less than 200 microns and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The powdered carbonaceous material can have a maximum sieve size through which the material passes of in the range of 0.2 microns to less than 200 microns, or 15 microns to 100 microns, or less than 200 microns and greater than or equal to 0.2 micron and less than, equal to, or greater than 0.3 microns, 0.4, 0.5, 0.6, 0.7, 0.8, 0.9, 1, 1.5, 2, 3, 4, 5, 6, 8, 10, 12, 14, 16, 18, 20, 30, 40, 50, 60, 70, 80, 90, 100, 110, 120, 130, 140, 150, 160, 170, 180, or 190 microns. The additive carbonaceous material can by any suitable proportion of the combination of the carbonaceous material and the one or more additives, such as 0.001 wt % to 90 wt %, 0.1 wt % to 40 wt %, 0.1 wt % to 10 wt %, 1 wt % to 40 wt %, or less than or equal to 90 wt % and greater than or equal to 0.001 wt % and less than, equal to, or greater than 0.005, 0.01, 0.05, 0.1, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, or 88 wt %.

The carbonaceous material can be any suitable proportion of the combination of the carbonaceous material and the one or more additives. For example, the carbonaceous material can be 10 wt % to 99.999 wt % of the combination of the carbonaceous material and the one or more additives, or 60 wt % to 99 wt %, or less than or equal to 99.999 wt % and greater than or equal to 10 wt % and less than, equal to, or greater than 12 wt %, 14, 16, 18, 20, 22, 24, 26, 28, 30, 32, 34, 36, 38, 40, 42, 44, 46, 48, 50, 52, 54, 56, 58, 60, 65, 70, 75, 80, 82, 84, 86, 88, 90, 91, 92, 93, 94, 95, 96, 97, 98, 99, 99.9, or 99.99 wt %. The one or more additives can be any suitable proportion of the combination of the carbonaceous material and the one or more additives, such as 0.001 wt % to 90 wt % of the combination of the carbonaceous material and the one or more additives, or 1 wt % to 50 wt %, or less than or equal to 90 wt % and greater than or equal to 0.001 wt % and less than, equal to, or greater than 0.005 wt %, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, or 85 wt %. A weight ratio of the carbonaceous material to the one or more additives can be 1:100 (0.01:1) to 100:1, or 1:10 (0.1:1) to 10:1, or 1:9 (0.11:1) to 7:3 (2.33:1), or 2:8 (0.25:1) to 6:4 (1.5:1), or less than or equal to 100:1 and greater than or equal to 0.01:1 and less than, equal to, or greater than 0.02:1, 0.03:1, 0.04:1, 0.05:1, 0.06:1, 0.07:1, 0.08:1, 0.09:1, 0.1:1, 0.15:1, 0.2:1, 0.25:1, 0.3:1, 0.35:1, 0.4:1, 0.45:1, 0.5:1, 0.55:1, 0.6:1, 0.65:1, 0.7:1, 0.75:1, 0.8:1, 0.85:1, 0.9:1, 0.95:1, 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, 3:1, 3.5:1, 4:1, 4.5:1, 5:1, 6:1, 7:1, 8:1, 9:1, 10:1, 12:1, 14:1, 16:1, 18:1, 20:1, 25:1, 30:1, 35:1, 40:1, 45:1, 50:1, 55:1, 60:1, 65:1, 70:1, 75:1, 80:1, 85:1, 90:1, or 95:1.

The one or more contaminants can be any suitable one or more contaminants. The one or more contaminants can include an organic contaminant, fuel oil, an organic solvent, a polychlorinated biphenyl (PCB), a dioxin, mercury, a metal, an industrial chemical, a radioactive material, a perfluoroalkyl or polyfluoroalkyl substance (PFAS), or a combination thereof. The one or more contaminants can include a perfluoroalkyl or polyfluoroalkyl substance (PFAS), perfluoroalkyl substance, a polyfluoroalkyl substance, a perfluoroalkyl acid (PFAA), or a combination thereof. The one or more contaminants can include perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof. The contaminated water or gas can have a concentration of the one or more contaminants of 1 part per trillion (ppt) to 100 parts per million (ppm), or greater than 100 ppm, or 20 ppt to 100 ppm, or less than or equal to 100 ppm and greater than or equal to 1 ppt and less than, equal to, or greater than 2 ppt, 3, 4, 5, 6, 8, 10, 12, 14, 16, 18, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950 ppt, 1 ppm, 2, 3, 4, 5, 6, 8, 10, 12, 14, 16, 18, 20, 25, 30, 35, 40, 45, 50, 55, 60, 65, 70, 75, 80, 85, 90, or 95 ppm. The treated water or gas can have a concentration of the one or more contaminants of 0.001 ppt to 1 ppm, or 0.001 ppt to 100 ppt, or 0.001 ppt to 15 ppt, or less than or equal to 1 ppm and greater than or equal to 0.001 ppt and less than, equal to, or greater than 0.005 ppt, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, or 950 ppt. The contacting can remove any suitable proportion of the one or more contaminants from the contaminated water or gas, such as 20% to 100% of the one or more contaminants, or 60% to 99.999%, or less than or equal to 100% and greater than or equal to 20% and less than, equal to, or greater than 22%, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, 95, 96, 97, 98, 99, 99.9, 99.99, or 99.999%.

EXAMPLES

Various aspects of the present invention can be better understood by reference to the following Examples which are offered by way of illustration. The present invention is not limited to the Examples given herein.

Part I. Hypothetical Examples

Example 1. Addition of Powdered Activated Carbon to Granular Activated Carbon (Hypothetical)

GACs are of relatively larger particle size with open internal pore structures and external surfaces to adsorb contaminants such as PFAS. One aspect of the present disclosure is to add smaller AC particles to and within the GAC to manufacture a GAC that has superior adsorbent capacity. This is of particular importance to GACs that have been regenerated or reactivated but may also apply to virgin carbons. FIG. 1 illustrates this concept.

In FIG. 1, the smaller round particles represent AC particles added to/with GAC. However, it should be noted that the smaller AC particles can be of varying size and any shape (e.g., regular shape or irregular shape) and are shown here round for illustration purposes only.

As shown in FIG. 1, smaller AC particles are added to the bulk of GAC and individual particles within the GAC. These smaller AC particles are then incorporated onto and into the GAC particles improving their ability to adsorb contaminants such organics, inorganics, metals, and PFAS. As part of the process of adding the AC particles, the GAC particles can retain their original size and shape with minimal deformation. The smaller particles can be added before, during, or after the thermal process of manufacturing a virgin, a regenerated, or a reactivated carbon.

Example 2. Modification of Granular Activated Carbon Shape (Hypothetical)

Figure 2:
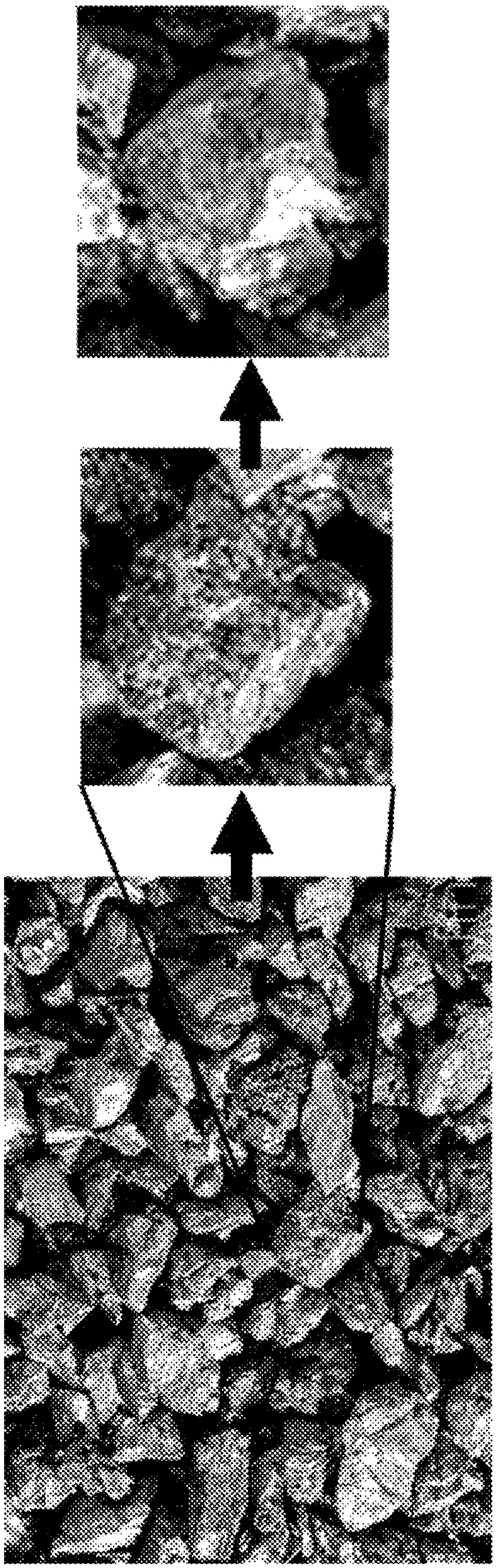
FIG. 2 illustrates modification of the shape of granular activated carbon, in accordance with various aspects.

One aspect of the present disclosure includes modifying and changing the shape of the bulk GAC particles thereby restoring the particles to their near virgin size/shape and/or improve upon their shape characteristics. One aspect of this is to modify and change the size and/or shape such that overall performance of the bulk GAC is improved to adsorb contaminants. Further, the shape and/or size is modified in a way to improve contact with contaminants, flow characteristics, and patterns through a filter/carbon bed (or container filled with GAC) such that lower pressure drop is observed while improving and/or maintaining contaminant removal performance. Improving flow characteristics and lowering the pressure drop results in reduced operating and maintenance costs. FIG. 2 illustrates this concept.

As shown in FIG. 2, GAC is processed using specific equipment that results in the size and/or shape of the GAC being modified and changed. These modified GAC particles may be larger or smaller in size and retain similar shapes, or they may be of larger or smaller in size with shapes and geometries that are different from the original material. Further, modifying the size and shape of GAC can be performed before, during, or after it is activated, regenerated, or reactivated. Both size and/or shape are modified to optimize performance toward improved capability to remove/adsorb contaminants such organics, inorganics, metals, and PFAS. Additionally, both size and/or shape are modified in a way to lower capital, operating, and maintenance costs. Modifying and changing the size and shape of GAC particles as part of present disclosure applies to the manufacturing a virgin, a regenerated, or a reactivated carbon.

Example 3. Addition of Powdered Activated Carbon Particles to and Modifying the Shape of Granular Activated Carbon (Hypothetical)

One aspect of the present disclosure is to both add small AC particles and modify the shape of the bulk GAC particles thereby restoring the particles to their near or better than virgin state for removal of contaminants such as organics, inorganics, metals, and PFAS. The AC particles are added in a way simultaneous, or not simultaneous, to when the size and/or shape are modified by using specific equipment designed to do so. That is, the GAC size and shape can be modified before the AC is added, while the AC is added, or after the AC is added. Further, the size and shape of GAC and addition of AC can be performed before GAC is activated, regenerated, or reactivated. The added AC and modified shape of the GAC will improve the flow characteristics and patterns through a filter/carbon bed (or container filled with GAC) such that lower pressure drop is observed while improving and/or maintaining contaminant removal performance. This will extend the bed life and result in lower amounts of GAC needed and lower operating cost. This concept is illustrated in FIG. 3.

Figure 3:
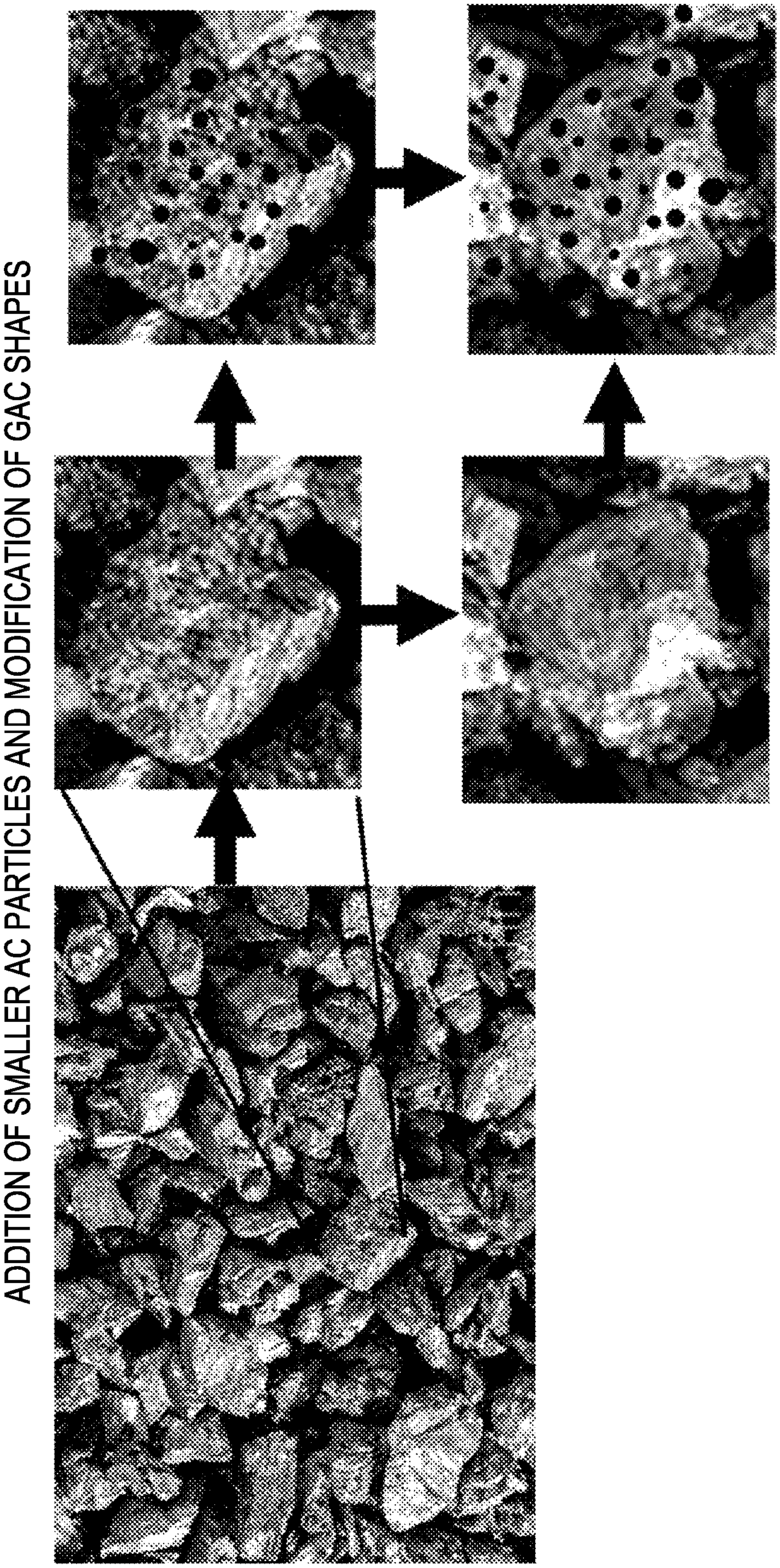
FIG. 3 illustrates addition of powdered activated carbon to granular activated carbon and modification of the shape of granular activated carbon, in accordance with various aspects.

In FIG. 3, the smaller round particles represent AC particles added to/with GAC. However, it should be noted that the smaller AC particles can be of varying size and any shape (e.g., regular shape or irregular shape), and are shown here round for illustration purposes only. As shown in FIG. 3, GAC is processed by adding AC to the bulk of GAC and individual GAC particles while also using specific equipment that results in the size and shape of the GAC to be modified and changed. These AC enhanced and modified GAC particles may be larger or smaller in size and retain similar shapes to original material, or they may be of larger or smaller in size with shapes and geometries that are different. The added AC can be incorporated and adhere to the GAC internal and external surfaces allowing the GAC shape and size to be retained or modified. Further, modifying the size and shape of GAC can be performed before, during, or after the GAC is activated, regenerated, or reactivated. Enhancing GAC with AC particles and modification of size and/or shape are done in a way to optimize flow through GAC beds/filters and improve removal of contaminants such organics, inorganics, metals, and PFAS. This will result in lower capital, operating, and maintenance costs. The combination of adding AC particles and modifying the size and shape of GAC particles as part of the present disclosure applies to the manufacturing a virgin, a regenerated, or a reactivated carbon.

Reactivation of GAC is a sustainable solution that allows for reuse of GAC by removing contaminants from spent carbon. Reactivation can be optimized so that reactivated GAC performs as well as or better than virgin carbon while destroying contaminants such as PFAS. The motive for using reactivated GAC is that it is more than 40% cheaper compared to virgin GAC thereby reducing treatment costs. Recent data suggests that GAC can be effective at removing PFAS from water streams. However, competition from natural organic matter (NOM) and short breakthrough times will require more frequent reactivation of spent GAC. During reactivation, adsorbed organic compounds thermally decompose into a char, and are subsequently mineralized (oxidized to $CO_2$) to clean and rejuvenate the GAC surfaces.

Example 4. Addition of Powdered Activated Carbon Particles to and Modifying the Shape of Granular Activated Carbon (Hypothetical)

One aspect of the present disclosure includes adding small AC particles and modifying the shape of the reactivated GAC particles rendering this activated carbon well suited for fixed vessel applications. Spent GAC is often commingled before reactivation. However, some water utilities request custom or segregated GAC whereby their spent GAC is not commingled and they receive their original GAC back. However, this is not always possible. Therefore, the present disclosure permits the commingling of spent GAC, reactivation of this GAC, addition of small AC particles to enhance adsorption performance (e.g., extend lifetime), and then re-shaping this particle so that it can be used again for fixed vessel and other applications. As such, particles of a given spent GAC are reshaped and restored.

Example 5. Optimization/Improvement of GAC for Specific Purposes (Hypothetical)

An aspect of the present disclosure can also manipulate the temperature, temperature profile, and residence time to produce an optimal GAC for removal of unwanted contaminants. Further, pore structure, pore size distribution, and surface area (internal and external) are also optimized. Optimal thermal processes and conditions can be used as part of the present disclosure to reactivate GAC by appropriately modifying process conditions that improve pore structures and surfaces leading to more effective GAC for removing contaminants such as PFAS from gas and liquid streams. Furthermore, certain chemicals/additives and/or binders can be added and/or impregnated onto/into GAC to make the activation/reactivation process more effective and efficient while also improving the efficacy of the GAC to remove unwanted contaminants. The present disclosure provides for optimal activations, regeneration, reactivation processes and operating conditions as well as adding and impregnating certain chemicals/additives to enhance the effectiveness of virgin and spent GACs. These inventive steps and methods are not limited to GAC but can apply to any new or used carbon.

Example 6. Mechanofusion to Bind Powdered Activated Carbon to Granular Activated Carbon (Hypothetical)

In one preferred aspect, activated carbon was introduced and then rolled through a chamber to create particle collisions. The rate of activated carbon addition through the chamber can be controlled to impact the size and shape of the resulting GAC. The chamber can be outfitted with dams, weirs, and extensions to enhance mixing. Mechanofusion causes the particles to stick together. The addition of a binder and/or chemical/additive into the chamber can be used to increase particle size, control shape, control hardness (e.g., increase hardness or decrease hardness), or a combination thereof. As the newly shaped particles exit the chamber, a dryer can be used to remove residual moisture that accompanied the binder.

Part II. Examples Performed in the Lab

Both PAC and GAC are used to remove harmful or unwanted chemicals (contaminants) from contaminated gas, vapor, and liquid streams. GAC is primarily used to remove unwanted chemicals, tastes, and odors from water and air by adsorbing contaminants onto its large surface area (internal and external), making it a common component in water treatment systems and air purification filters; it is particularly effective against organic compounds like pesticides, solvents, and chlorine. GAC can be used as a primary means of separating contaminant from streams or as a polishing/finishing step to ensure that contaminants are effectively removed to extremely low concentrations. As contaminated water or gas flows through GAC, contaminants sorb (stick) to the GAC surface and are removed. GAC can sorb a wide range of contaminants such as organics, fuel oil, solvents, polychlorinated biphenyls (PCBs), dioxins, mercury, metals, and other industrial chemicals, as well as radioactive materials. More recently, there has been a desire to use PAC and GAC to remove perfluoroalkyl and polyfluoroalkyl substances, or PFAS. PFAS are a group of more than 15,000 human-made chemicals known as “forever chemicals” because they do not rapidly break down and can accumulate in the environment and living organisms, including people. These chemicals have useful properties like resistance to heat, grease, and water, leading to their use in countless products, including nonstick cookware, food packaging, water-resistant clothing, and cosmetics.

The experiments performed herein are focused on restoring spent carbons to their near-virgin state, or better. Further, there was a desire to not only restore spent carbons to their near-virgin state but also improve the performance of virgin and spent carbons, particularly to adsorb PFAS. Various aspects of the present disclosure include changing shape, compositions, chemical, and physical properties that lead to more effective and lower cost removal of contaminants from drinking and wastewater.

Sample Materials.

Figure 4A:
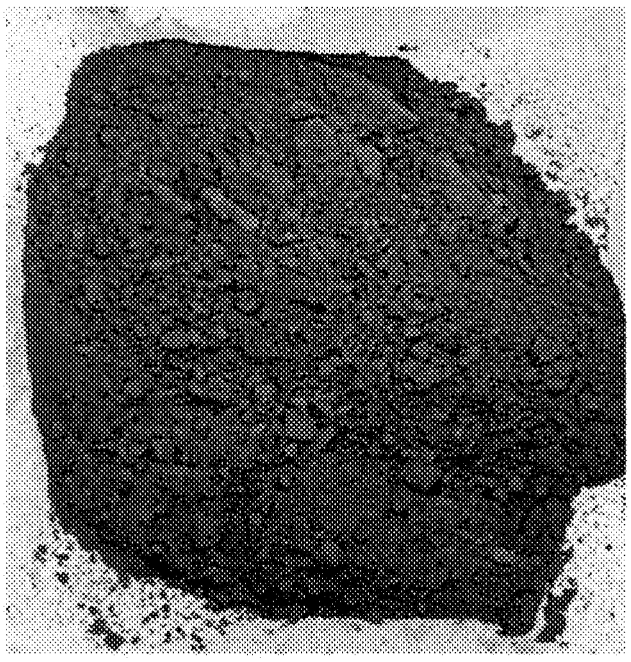
FIG. 4A illustrates a photograph of a wood-based powdered activated carbon, in accordance with various aspects.
Figure 4B:
FIG. 4B illustrates a photograph of carboxymethyl cellulose powder, in accordance with various aspects.

The following materials were used to prepare samples for testing. To improve performance, two different PACs were used: wood-based activated carbon produced by Kajah Activated Carbon (a photograph of which is illustrated in FIG. 4A), and a coal-based PAC produced by grinding Iluka AC830-950 coal-based granular activated carbon produced by Iluka Resources. A commercially available virgin GAC and PAC produced by Norit was also used. The reactivated GAC used was reactivated in-house using a spent GAC, and some of the reactivated GAC was reduced in size to less than 200 mesh. BB300 was a wood-based biochar produced by Carbonxt, Inc. Carboxymethyl cellulose (CMC) was used as an extrusion aid/binder and a photograph of the CMC is shown in FIG. 4B. The water used was Grand Forks City, ND tap water (GFK water), Pennsylvania State College tap water, or deionized (DI) water. Other materials used are described below.

Sample Preparation.

Figure 5:
FIG. 5 illustrates a photograph of dried agglomerates formed from reactivated GAC and coal-derived PAC, in accordance with various aspects.

For some tests, materials were combined in a way to change their shape and improve their chemical, physical, and intrinsic properties. The following is a brief description of the general procedure that was used, with slight variations made to improve the overall quality of the final composite. Materials were combined and mixed in a cake mixer and blender for a duration of time, typically about 13 minutes. The mixed materials generally formed more sphere-like agglomerates, compared to original materials. These sphere-like agglomerates were dried overnight at 100° C. FIG. 5 illustrates a photograph of dried agglomerates formed from reactivated spent GAC and coal-based PAC that was ground Iluka GAC.

Figure 6:
FIG. 6 illustrates a photograph of dried extruded pellets formed from a mixture of wood- and coal-derived PAC, in accordance with various aspects.

To further modify the shape, some of the test materials were made using a benchtop extruder using the following procedure. The materials were combined and mixed in a cake mixer with water. The mixture was extruded in a benchtop extruder through a 1-inch orifice in a die. The extruded material was dried overnight at 100° C. FIG. 6 illustrates a photograph of dried extruded pellets formed from a mixture of wood-based PAC (Kajah) and coal-based PAC that was ground Iluka GAC.

Some of test samples were subject to activation and reactivation conditions that varied from a low temperature of about 100° C. to higher temperatures of over 1000° C., under varying holding times, steam activation, atmospheres, and the like. Pyrolysis was performed at 850° C. for 10 min under 7 L/min of $N_2$ gas. Reactivation was performed at 850° C. for 30 min under 0.9 mL/min of $H_2O$; the samples described as reactivated GACs in this Part were reactivated using this process. All of the reactivated GACs in this Part when through the pyrolysis step before reactivation.

Test Methods.

Surface area. To illustrate improvements made via various aspects of the present disclosure, several samples were prepared, and the iodine number was measured. The iodine number is a measure of activated carbon’s surface porosity and activity, providing a relative estimate of surface area. For the samples tested, a higher iodine number correlates to a greater surface area and more effective adsorption. Iodine number was determined following ASTM D4607-14 (reapproved 2021) Standard Test Method for Determination of Iodine Number of Activated Carbon.

Jar tests. Jar tests are a laboratory procedure typically used in water and wastewater treatment to determine the optimal dosage of chemicals to achieve specific water quality goals, such as removing turbidity, TOCs, suspended solids, PFAS, and the like. The test involves adding varying amounts of chemicals/sorbents to water samples in a series of jars and observing/measuring the effect and/or uptake (removal) of certain contaminants. The tests that were conducted involved different composites consisting of carbons, mixes of carbons, mixes of carbon and additives, and other additions (chemicals, materials). These composites were then added at different amounts to a series of jars spiked with PFAS, in particular PFOA (perfluorooctanoic acid) and PFBS (perfluorobutanesulfonic acid). To determine if improvements were made the uptake (removal) and capacity of the different composites to remove PFAS was compared in determining which performed best. While there are no standards for jar tests with PFAS, the tests performed generally followed the guidelines provided in ANSI/AWWA B600-24, APPENDIX BB.1.3.2.

Figure 7:
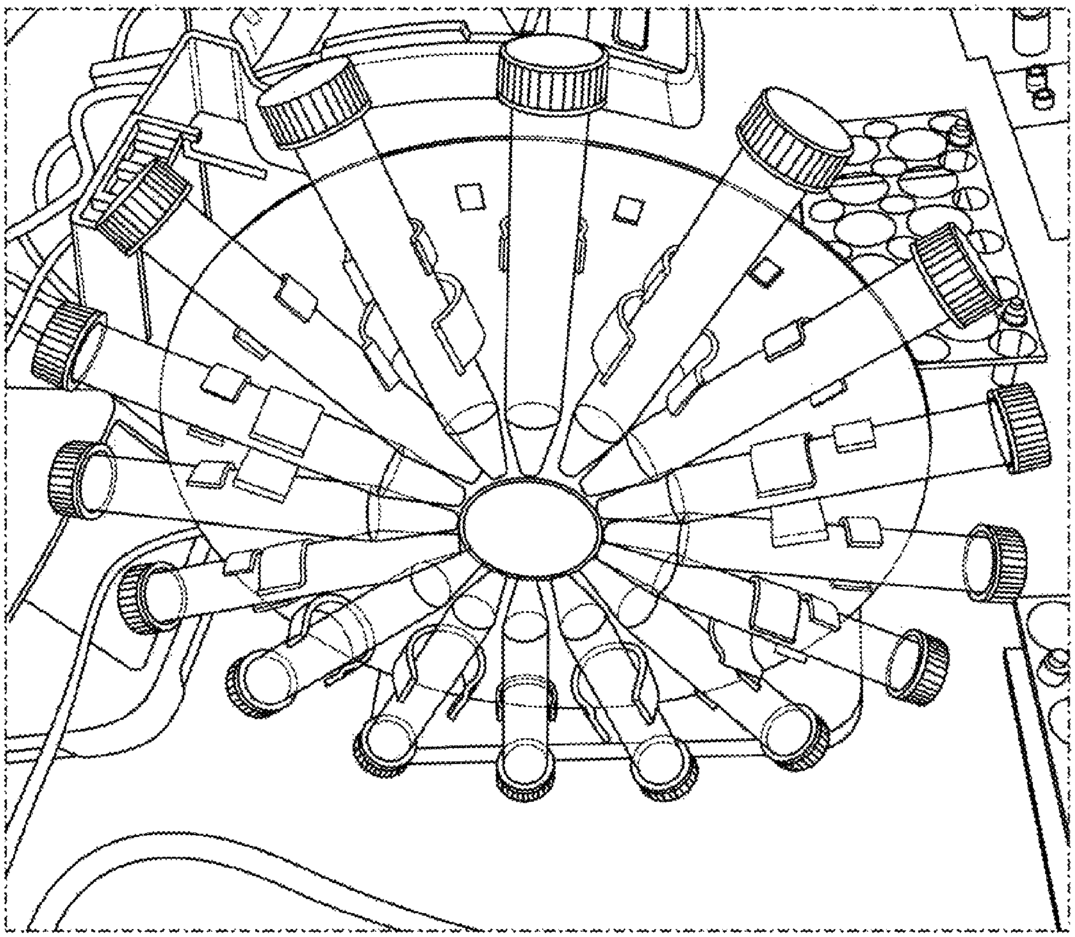
FIG. 7 is a photograph illustrating tubes on a wheel mixer used to perform a jar test, in accordance with various aspects.

The following is the procedure that was used to perform the jar tests. A solution of 50,000 ng/L PFAS was made in a 250 or 500 ml bottle. The sorbents tested were generally less than 200 microns in size with specific tests performed with sorbents that had an average size range of 70-90 microns and 30-50 microns in size. For each sorbent 150 to 250 mg of the sorbent was put into a 15 mL centrifuge tube with 14 mL deionized (DI) PFAS-free water to form a slurry. The slurry was kept suspended by constant mixing or stirring. A portion of the PFAS solution (5 to 14 mL) was added to a 15 mL centrifuge tube. A targeted amount of the sorbent slurry was added from the prepared slurry into the PFAS solution to achieve different sorbent loadings. The 15 mL tubes containing the sorbent and PFAS solution were run on a wheel mixer for 2 hours at 20 rpm. A photograph of tubes on a wheel mixer is illustrated in FIG. 7. The tubes were removed from the wheel mixer, allowed to settle for 30 minutes, and centrifuged for 10 minutes at 400 rpm. Aliquots were taken from each sample and transferred to an LC vial with appropriate dilution (50/50 water/methanol for dilutant) for LCMS analysis. The dilution factor ranged from 10 to 100, depending on test conditions.

Rapid small scale column tests (RSSCT). The rapid small-scale column tests (RSSCTs) are laboratory procedures that use ground adsorbents, like activated carbon, in small columns to quickly predict the performance of full-scale water treatment systems, such as breakthrough times and media service life. By reducing the particle size of the adsorbent, mass transfer is enhanced, allowing contaminants like PFAS to be removed much faster than in conventional tests or pilot studies, which require significant time and resources. RSSCTs provide essential data for evaluating/selecting adsorbents, optimizing design parameters, and avoiding costly full-scale failures by simulating the long-term performance of large systems in a compressed time-frame. In an RSSCT, adsorption media, such as granular activated carbon (GAC) or ion exchange (IX) resins, are ground into smaller particles. These ground adsorbents are then packed into small, bench-scale columns. Contaminated water is pumped through these columns under controlled laboratory conditions. Effluent water is collected at specific intervals and analyzed for contaminant levels to track the breakthrough. Then, using established scaling equations, the data from these small-scale tests are used to predict the adsorption and breakthrough behavior of larger, full-scale systems.

Figure 8:
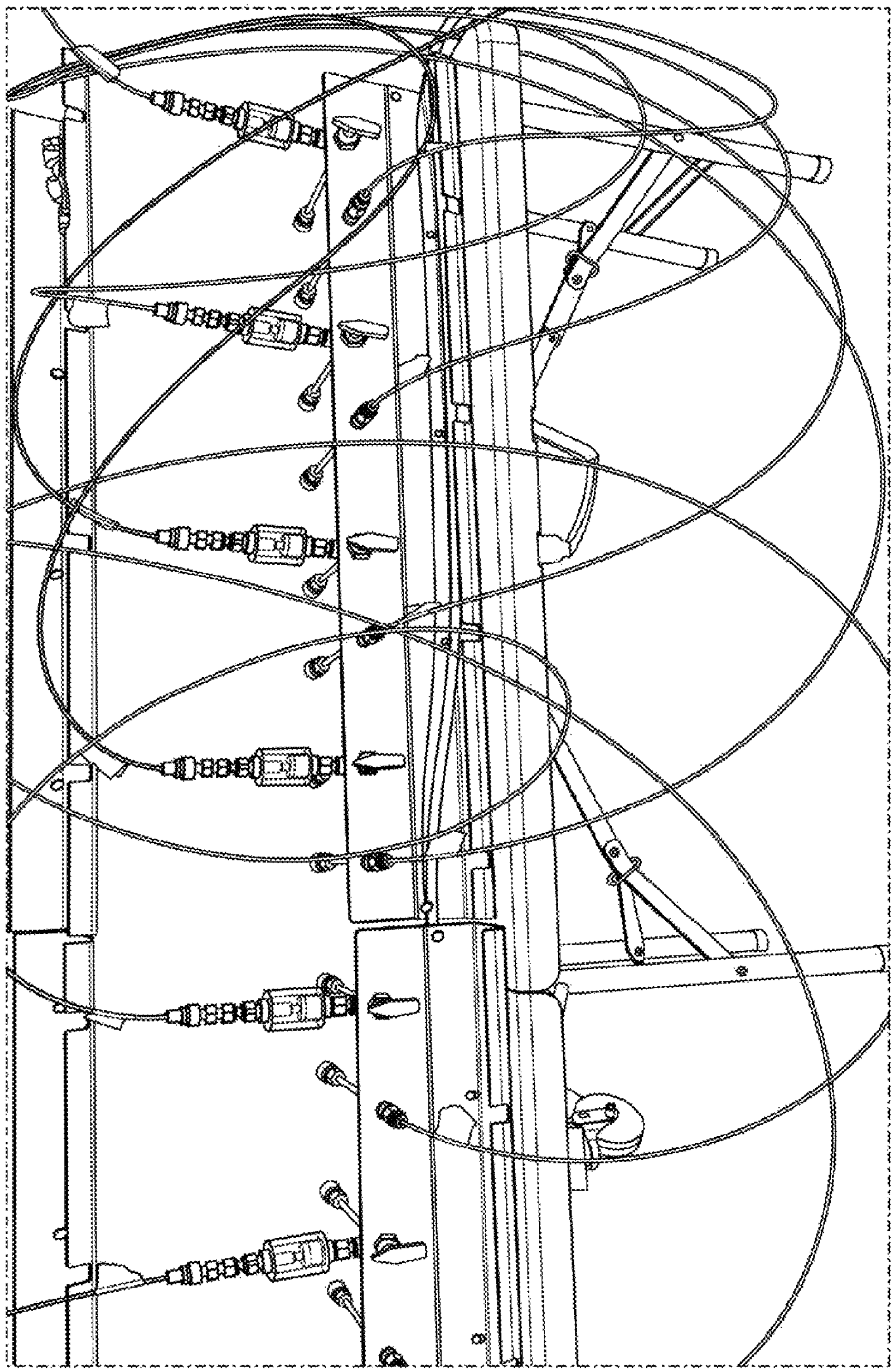
FIG. 8 is a photograph illustrating columns used to perform a rapid small-scale column test, in accordance with various aspects.

The following procedure was used to perform RSSCTs. To prepare the RSSCT samples, 170 and 200 mesh sieves were washed and dried overnight in a 60° C. oven before use. Test sorbents (e.g. GAC, pellets, spherical agglomerates, and the like) were either dried overnight in a 100° C. or 60° C. oven or taken directly from a sealed airtight container. Test sorbents were milled/ground using either a coffee grinder or a mortar and pestle (depending on hardness). The milled sample was placed on the 170 mesh sieve and run on a sieve shaker for 10 minutes. After 10 minutes, the material that passed through the 170 mesh and what remains on top of the 200 sieve was collected and stored. A sorbent sample was prepped to 170×200 mesh and rinsed and dried to remove fines. To perform the RSSCT test, the RSSCT column was filled with the sorbent sample, and the weight required to fill the sample was recorded. RSSCT conditions such as EBCT, sample rate, test duration, and flow rate were verified via calculations to ensure the test was within acceptable ranges. A PFAS solution of a given concentration (typically around 50 ppt) was spiked into the desired test water. A water volume of around 5 to 7 gallons was typically required. Grand Forks City tap water was typically used. All flow and sampling parameters were entered into the system. The columns with the sorbent were loaded onto the column apparatus, and the test water was run through the system for about 10 minutes to equilibrate the columns and ensure that the zero time sample was a representative sample. The test was started following the equilibration time and ran to completion, depending on the target empty bed contact time selected. At the end of the test, the samples collected were transferred to the LCMS for analysis. FIG. 8 is a photograph illustrating columns used to perform a rapid small-scale column test.

Hardness. Hardness was measured using the ball pan hardness (BPH) test as per ASTM D3802-23, with the following minor deviations: No vibratory feeder was available for determining density and instead a sample was added to a graduated cylinder and the cylinder was tapped three times to settle the particles. Also, the sieve-shaker apparatus (SS-15) did not have a mechanical tapping action, so instead an orbital motion was used that consisted of back and forth lateral motion combined with up and down and tilting motions which caused the material to travel in an orbit on the sieve surfaces, operating at 480 strokes per minute.

Figure 9A:
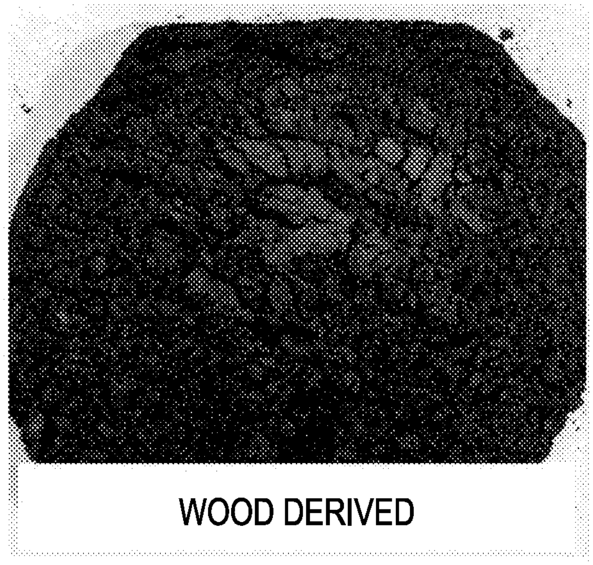
FIG. 9A illustrates a photograph of wood-derived biochar, in accordance with various aspects.
Figure 9B:
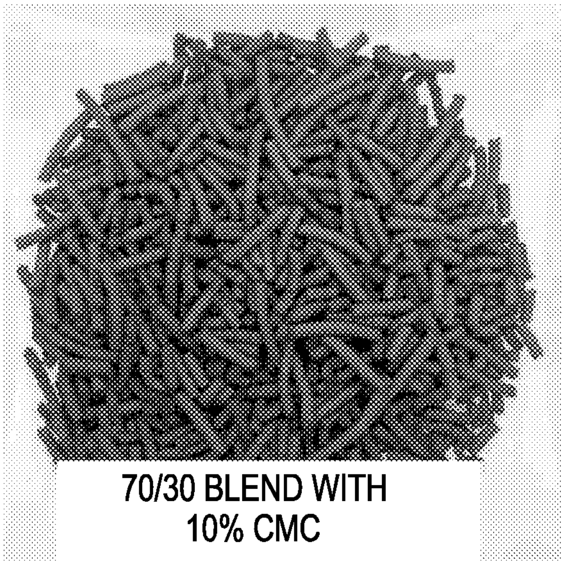
FIG. 9B illustrates a photograph of a shaped composite formed from wood-derived biochar/PAC at a weight ratio of 70/30 and 10 wt % CMC, in accordance with various aspects.
Figure 9C:
FIG. 9C illustrates a photograph of a shaped composite formed from wood-derived biochar/PAC at a weight ratio of 50/50 and 10 wt % CMC, in accordance with various aspects.
Figure 9D:
FIG. 9D illustrates a photograph of a shaped composite formed from wood-derived biochar/PAC at a weight ratio of 30/70 and 10 wt % CMC, in accordance with various aspects.

Example 7. Shaped GAC Composite Produced from Wood-Derived Biochar and Coal-Derived PAC A shaped GAC composite was produced by adding in various amounts of a low surface area wood derived biochar with a relatively high surface area coal-derived PAC combined with a CMC binder. The combined material was then extruded following the general procedure described above. FIG. 9A illustrates a photograph of wood-derived biochar. FIG. 9B illustrates a photograph of a shaped composite formed from wood-derived biochar/PAC at a weight ratio of 70/30 and 10 wt % CMC. FIG. 9C illustrates a photograph of a shaped composite formed from wood-derived biochar/PAC at a weight ratio of 50/50 and 10 wt % CMC. FIG. 9D illustrates a photograph of a shaped composite formed from wood-derived biochar/PAC at a weight ratio of 30/70 and 10 wt % CMC. As can be seen from FIGS. 9B-9D, the shape of the extruded material was in the form of elongated pellets. This material could be further reduced in size and/or shape that is suitable for the intended application. The objective of these tests was to take a relatively inexpensive material (biochar) and produce a carbon that had improved surface area at a relatively low cost thereby providing an economic advantage over more expensive carbons that have higher surface area but are produced from more expensive starting materials.

Table 1 shows the results for three different shaped composites of wood biochar and coal derived PAC and their respective properties. The results show that adding in a coal-derived PAC to the wood-derived biochar resulted in a significant improvement (increase) in iodine number (surface area), ranging from 300 to over 600 mg/g. The results also showed that hardness (BPH) also improved with an optimum ratio of 70/30 wood biochar/coal derived PAC combined with 10% CMC.

TABLE 1

Wood biochar/coal-derived PAC shaped composite properties.

| Blend ratio of wood-derived biochar/coal-derived PAC | Wt % CMC | Density (g/mL) | BPH | Iodine# (mg/g) |
|---|---|---|---|---|
| 100% | — | 0.30 | — | ~300 |
| 70/30 | 10 | 0.34 | 95% | 470 |
| 50/50 | 10 | 0.33 | 91% | 546 |
| 30/70 | 10 | 0.32 | 89% | 637 |

Figure 10A:
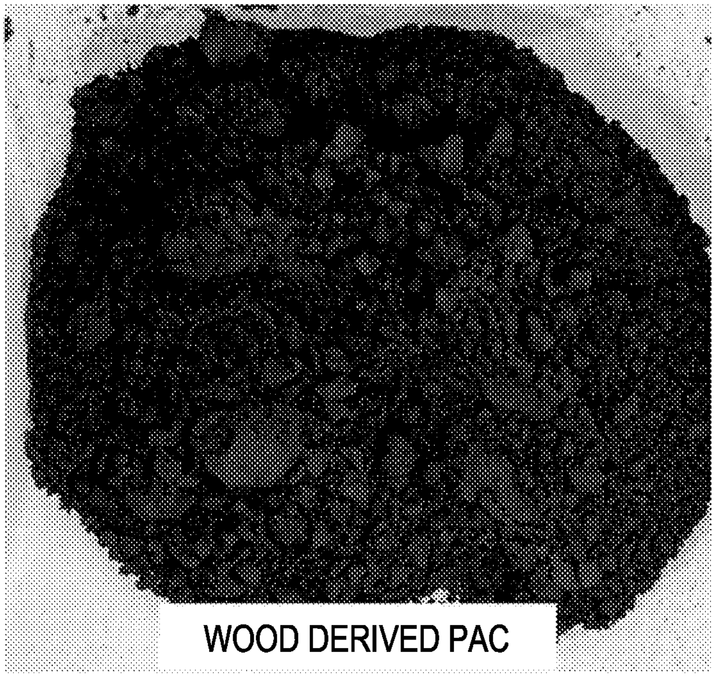
FIG. 10A illustrates a photograph of wood-derived PAC, in accordance with various aspects.
Figure 10B:
FIG. 10B illustrates a photograph of a shaped composite formed from wood-derived PAC/coal-derived PAC at a weight ratio of 30/70 and 10 wt % CMC, in accordance with various aspects.

Example 8. Shaped GAC Composite Produced from Wood-Derived PAC and Coal-Derived PAC A shaped GAC composite was produced by mixing a lower surface area wood derived PAC with a relatively higher surface area coal-derived PAC combined with a CMC binder. The combined material was then extruded following the general procedure. FIG. 10A illustrates a photograph of the wood-derived PAC. FIG. 10B illustrates a photograph of the shaped composite formed from wood-derived PAC/coal-derived PAC at a weight ratio of 30/70 and 10 wt % CMC. As can be seen from FIG. 10B, the shape is in the form of elongated pellets. This material could be further reduced in size and/or shape that is suitable for the intended application.

Table 2 shows the results for blended wood-/coal-derived PAC shaped composite and the respective properties. The results show that adding a coal-derived PAC to the wood-derived PAC resulted in an improvement (increase) in iodine number (surface area), from 664 to over 707 mg/g.

TABLE 2

| Wood-derived PAC/coal-derived PAC shaped composite properties. | | | |
|---|---|---|---|
| Wood/Coal PAC Blend Ratio | % CMC | Density (g/mL) | Iodine# (mg/g) |
| 100% Wood PAC | — | — | 664 |
| 30/70 | 10 | 0.32 | 707 |

Example 9. Jar Tests

Figure 11:
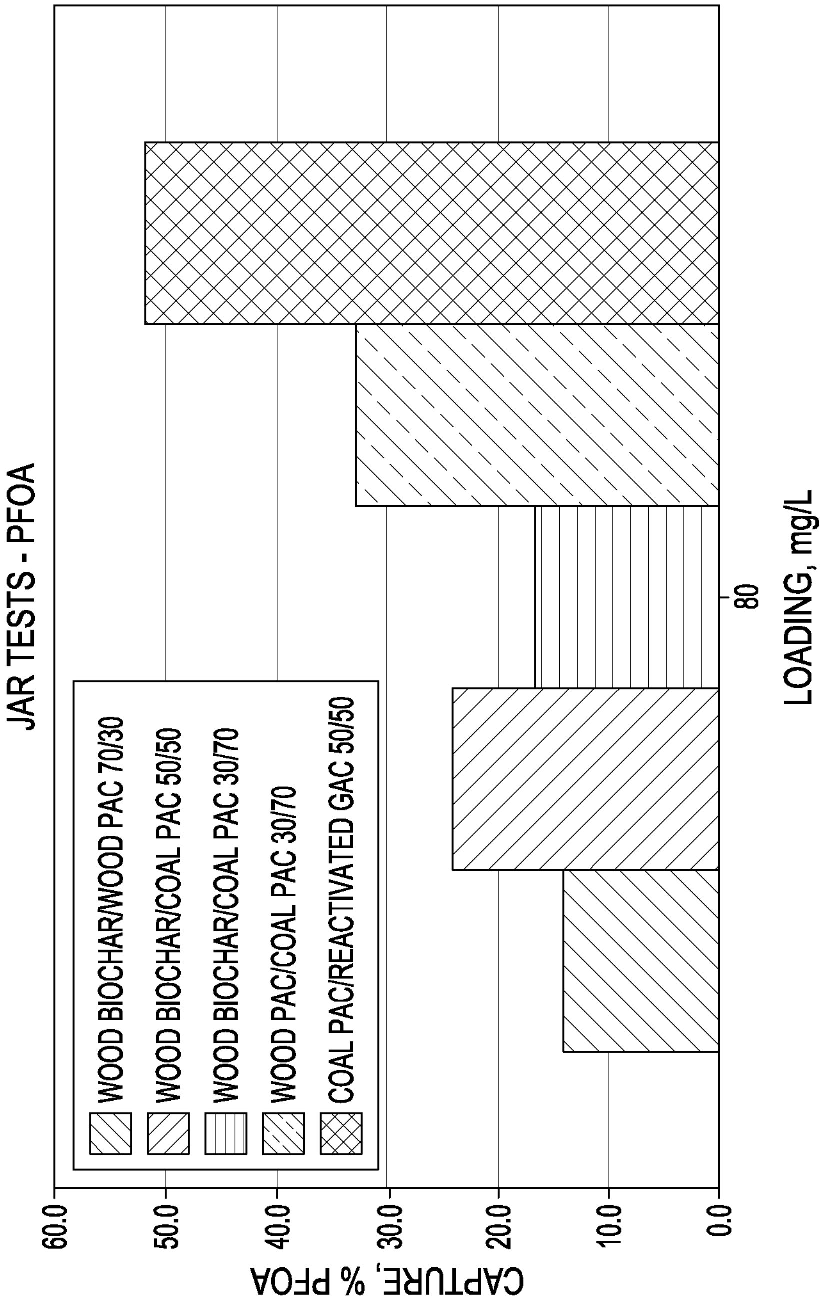
FIG. 11 is a graph of PFOA capture percentage at a loading of 80 mg/L for a jar test of various sorbents, in accordance with various aspects.
Figure 12:
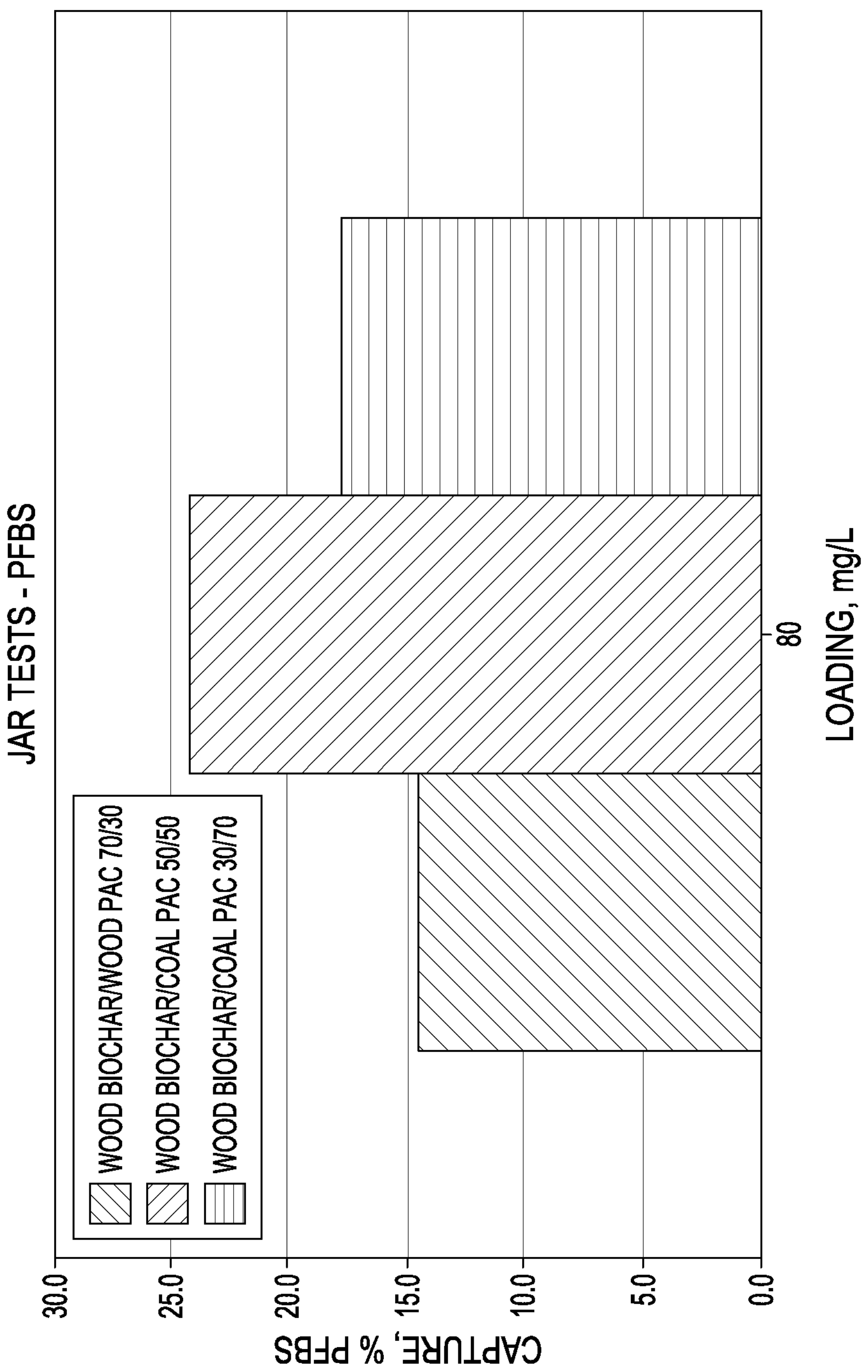
FIG. 12 is a graph of PFBS capture percentage at a loading of 80 mg/L for a jar test of various sorbents, in accordance with various aspects.

Jar tests were performed using the general procedure for the three samples of wood biochar/coal-derived PAC samples formed in Example 7, the sample of wood PAC/coal PAC at 30/70 from Example 8, and a shaped composite formed from a mixture of 50% reactivated GAC and 50% coal-based PAC with 10% CMC added to the 50/50 mixture. Each sample was ground to a size of approximately 70-90 microns, with an average size of about 80 microns. Each sample was added at 0, 10, 20, 40, or 80 mg/L to tubes with a DI water solution of 50,000 ng/L of PFOA (long chain PFAS) and separate tests with PFBS (short chain PFAS). FIG. 11 is a graph of PFOA capture percentage at a loading of 82 mg/L. FIG. 12 is a graph of PFBS capture percentage at a loading of 80 mg/L. The results in FIGS. 11-12 show that the addition of higher surface area PAC not only improved the surface area but also improved the uptake of PFOA and PFBS. As an unexpected result, the data further suggests that there may be an optimum (or limiting) ratio as the 50/50 blend performed better than the 30/70 blend for the wood biochar/coal PAC mix. This composite provides an economic advantage as the wood biochar is less expensive than the PAC. The addition of the PAC to the GAC at a ratio of 50/50 performed the best and better than the 50/50 blend of wood biochar/coal PAC which suggests that the PAC addition to the GAC is more effective than to the wood biochar albeit at a higher cost to produce.

Jar tests were performed following the general procedure for four test samples containing 100% activated alumina, a 50/50 blend of activated alumina with a commercial virgin GAC produced by Norit, 100% commercial virgin GAC produced by Norit, and a reactivated spent GAC (PFOA test only). Each sample was ground to a size of about 70-90 microns, with an average size of 82 microns. Each sample was added at 0, 10, 20, 40, or 80 mg/L to tubes with a DI water solution of 50,000 ng/L of PFOA (long chain PFAS) and separate tests with PFBS (short chain PFAS).

Figure 13:
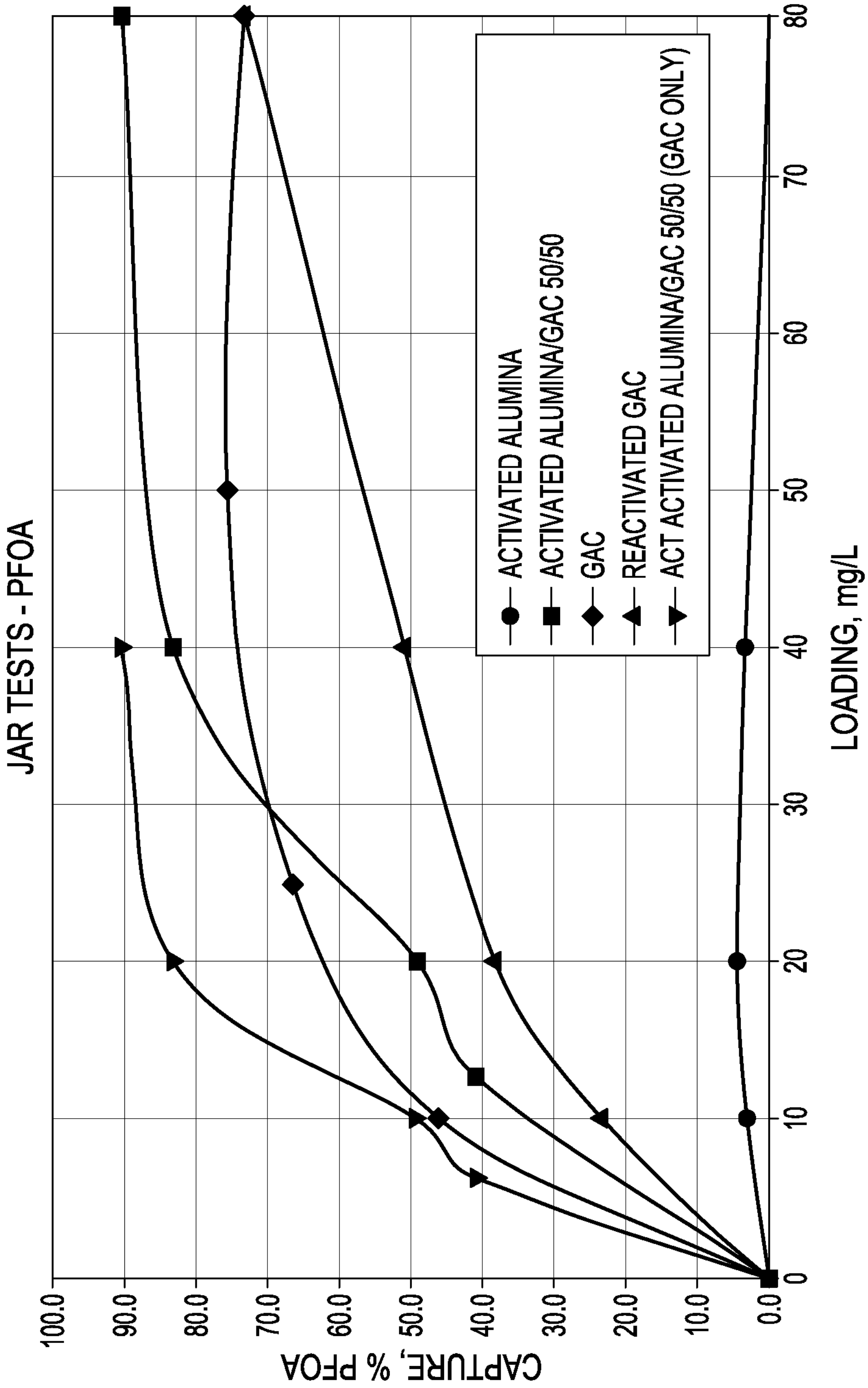
FIG. 13 is a graph of PFOA capture percentage versus loading for a jar test of various sorbents, in accordance with various aspects.
Figure 14:
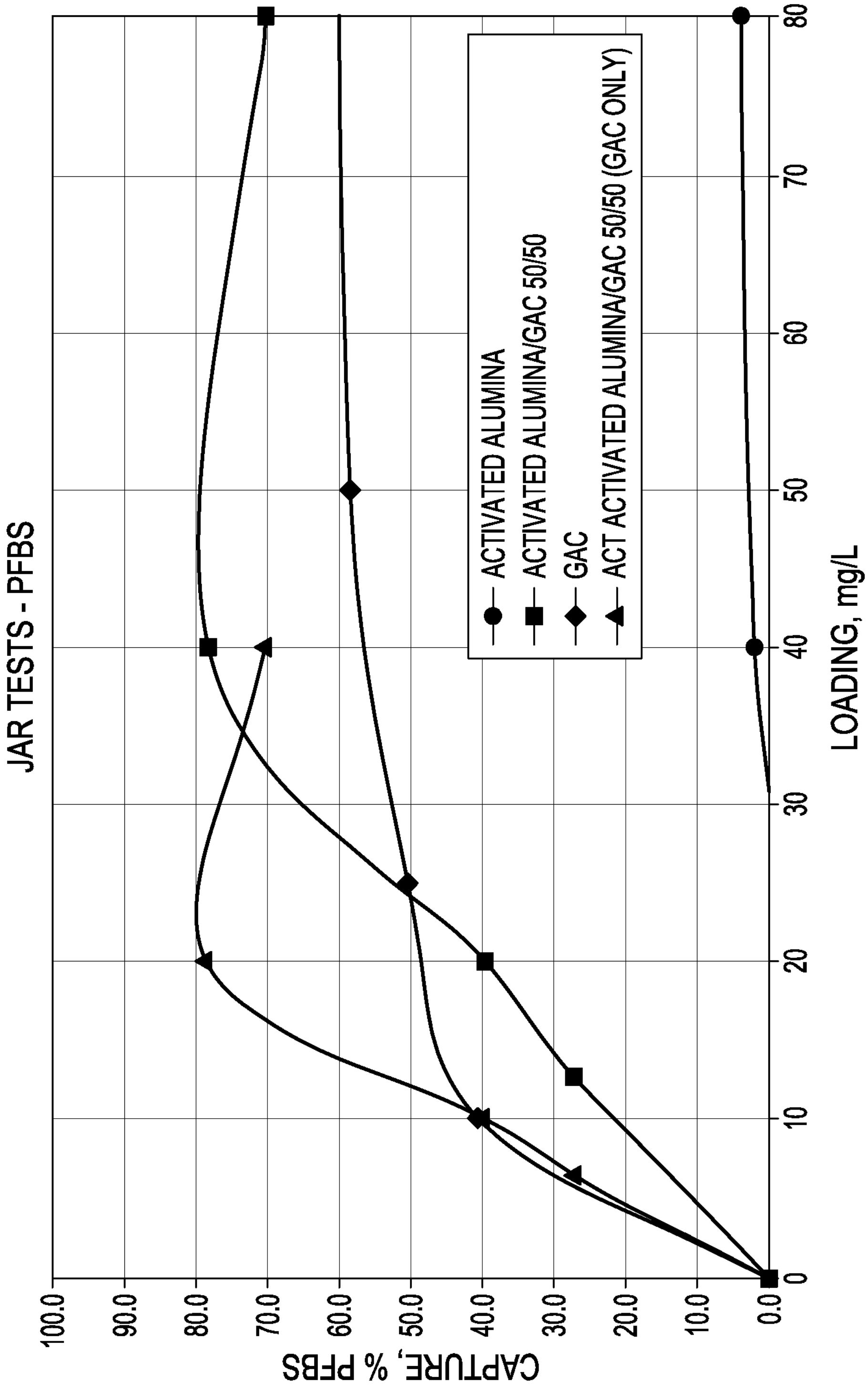
FIG. 14 is a graph of PFBS capture percentage versus loading for a jar test of various sorbents, in accordance with various aspects.

FIG. 13 is a graph of PFOA capture percentage versus loading for a jar test of the samples. FIG. 14 is a graph of PFBS capture percentage versus loading for a jar test of the samples. The percent removed/captured was calculated by subtracting the ending concentration from the starting concentration divided by the starting concentration of the solution multiplied by 100 to get a percentage value. The ending solution is as described above with the sample drawn and analyzed by LCMS. FIGS. 13-14 show that the 100% activated alumina removed less than 5% of the PFOA and PFBS, the 50/50 blend of activated alumina and virgin GAC removed over 90% of PFOA and 70% PFBS. The commercial virgin GAC removed over 70% of the PFOA and over 60% of the PFBS. The addition of the activated alumina to the GAC at the 50/50 ratio showed a nonobvious unexpected, marked improvement in removal of both PFOA and PFBS as compared to the 100% virgin GAC, providing both a significant performance improvement and an economic advantage. These results were not expected given that the activated alumina by itself removed less than 5% of the PFOA and PFBS. Further, in FIGS. 13-14, the data for activated alumina/GAC is presented on a GAC (carbon) basis only (50% of the total) basis assuming that the activated alumina removes almost no PFAS, and the results show less than half as much virgin GAC achieved better removal than when the virgin GAC is used by itself. One advantage of various aspects of the present disclosure is to reduce the amount of carbon (e.g., GAC and/or PAC) used and still achieve a high degree of removal because activated alumina and aluminum hydroxide are approximately 3 to 6 times less costly than PAC and GAC.

Aspects of the present disclosure are not limited by any theory of chemical mechanism. It is possible that the addition of activated alumina serves as catalyst on the GAC surfaces that enhances the removal of PFAS. It is also possible that the treatment process and/or chemical used to create the activated alumina serves to enhance the performance of the GAC to remove PFAS. In one case, iron was added along with the activated alumina and the removal of PFAS improved. It should be noted that any source of alumina or aluminum such as bauxite, aluminum hydroxide, aluminum oxide, clays (e.g. kaolinite, aluminosilicates) may serve to enhance the GAC or PAC. It is further possible that the pH of the solution changes making the interaction between the activated alumina and GAC or PAC more effective toward removal of PFAS. All these possibilities and enhancements are covered under various aspects of the present disclosure.

The reactivated GAC removed over 70% of the PFOA, similar to the commercial GAC. Based on the data herein, it can be predicted that by further optimization of reactivation conditions the performance of the reactivated GAC can be better than the virgin GAC.

Figure 15:
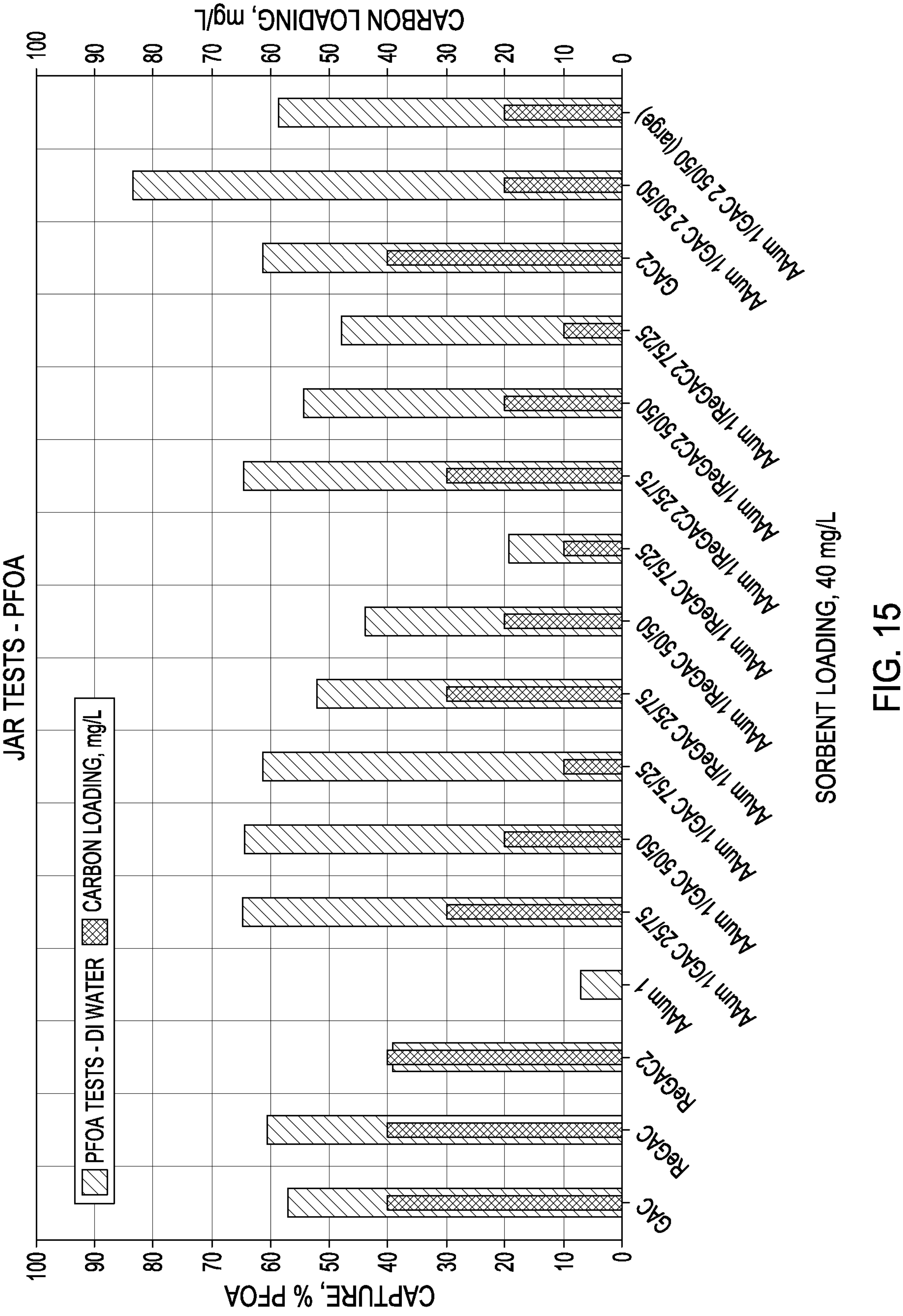
FIG. 15 is a graph of PFOA capture percentage and carbon loading in DI water for a jar test of various sorbents, in accordance with various aspects.

Based on the test results presented above, additional jar tests were done at a loading rate of 40 mg/L which seemed to be a loading rate that achieved good to maximum removal of PFAS. Jar tests were performed as described above for a 100% commercial virgin GAC produced by Norit, a second wood-derived GAC (GAC2), three reactivated GACs (ReGAC, ReGAC2 and ReGACMod), an activated alumina (AAlum), and various addition/mix ratios. Each sample was ground to a size of 70-90 microns, with an average size of 82 microns. An additional sample of activated alumina was tested with a larger size of about 1,000 microns. The ReGACMod was a spent GAC for which approximately 14% activated alumina and 10% CMC were added and then reactivated under conditions described above and reduced in size to about 82 microns. Each sample was added at 40 mg/L to tubes with a DI water solution of 50,000 ng/L of PFOA (long chain PFAS). FIG. 15 is a graph of PFOA capture percentage and carbon loading for a jar test of the samples. It should be noted that these samples were not centrifuged prior to analysis as other samples were. Given the different addition/mix ratios, the amount of GAC (carbon) varies and is shown in FIG. 15.

As can be seen from FIG. 15, the addition of activated alumina significantly improved the removal of PFOA beyond what was achieved with the same amount of GACs, or with the GACs by themselves. The larger-sized activated alumina also performed fairly well but not as good as the smaller-sized activated alumina.

The data further shows that there is likely an optimum addition rate of 0-50%, with data showing a ratio of 25/75 of activated alumina to GAC performing very well, and better than the GACs by themselves. However, the optimal addition could be lower or higher depending on water quality and contaminants within the water. Further, depending on overall cost, the optimum ratio could be different as each material has different costs. To determine the best product, both performance and cost need to be considered. As noted above, an advantage of various aspects of the present disclosure is to reduce the amount of carbon (e.g., GAC and/or PAC) used and still achieve a high degree of PFAS removal because activated alumina is 3 to 6 times less costly than PAC and GAC.

Figure 16:
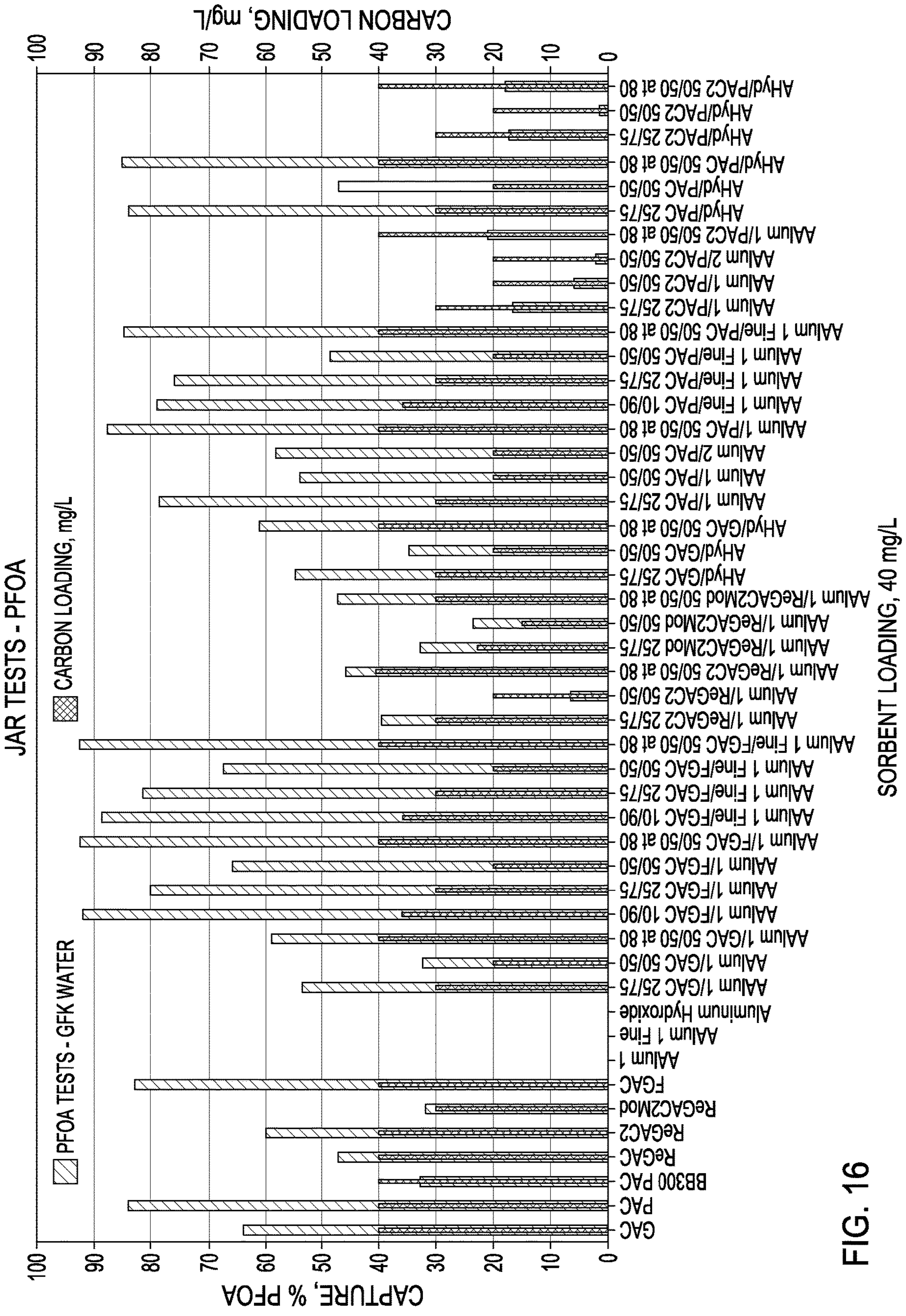
FIG. 16 is a graph of PFOA capture percentage and carbon loading for various sorbents/composites, in accordance with various aspects.

Additional jar tests were done at a loading rate of 40 mg/L using GFK water. The GFK water has been shown to have total organic carbon (TOC) values approaching 10 mg/L and alkalinity values approaching 300 mg/L which are very high compared to other drinking water across the US which generally has TOC values of 1-4 mg/L and alkalinity of below 200 mg/L. This water source was selected to determine the applicability range of various aspects of the present disclosure to attempt to understand the impacts of water quality on the efficacy of various aspects of the present disclosure. Jar tests were performed as described above for a 100% commercial virgin GAC (GAC) produced by Norit, a commercial virgin PAC (PAC) produced by Norit, a second wood-derived PAC (BB300), three reactivated GACs (ReGAC, ReGAC2 and ReGACMod), a fine GAC (FGAC) produced by Norit and reduced in size, an activated alumina (AAlum1), an activated alumina reduced in size (AAlum1 fine), an activated alumina with iron added (AAlum 2), an alumina hydroxide (AHyd), and various blends/mix ratios. All of the tests were done with a loading of 40 mg/L except for the ones marked with a "at 80" which were done at a sorbent loading of 80 mg/L. Each sample was ground to a size of approximately 70-90 microns with an average size of about 82 microns, or for sorbent/additives/blends denoted as "fine" to a size with 90% passing a 325 mesh and having a size of approximately 30-50 microns with particles of approximately 44 microns or smaller. All the PACs and FGAC tested were of the fine size with 90% passing a 325 mesh or approximately 44 microns or smaller. The ReGACMod was a spent GAC for which approximately 14% activated alumina and 10% CMC were added and then reactivated under conditions described above and reduced in size to approximately 82 microns. The ratios shown are for composites of additives/sorbents. For example, a composite of AAlum1/GAC of 25/75 contains 25% AAlum1 and 75% GAC, and a composite of GAC with no additives is 100% GAC. Each sorbent/composite was added at 40 mg/L (or 80 mg/L as denoted) to tubes with a GFK water solution of 50,000 ng/L of PFOA (long chain PFAS). To achieve the 40 (or 80) mg/L loading, each individual component was added to the PFOA solution in the appropriate amount/ratio. For these tests the GFK water had a TOC value of approximately 6 mg/L and an alkalinity value of 115 mg/L. FIG. 16 is a graph of PFOA capture percentage and carbon loading for each sorbent/composite tested. Given the different composites (blend/mix ratios), the amount of GAC/PAC (carbon) contained within varies and are shown in FIG. 16 on the right Y axis.

Figure 17:
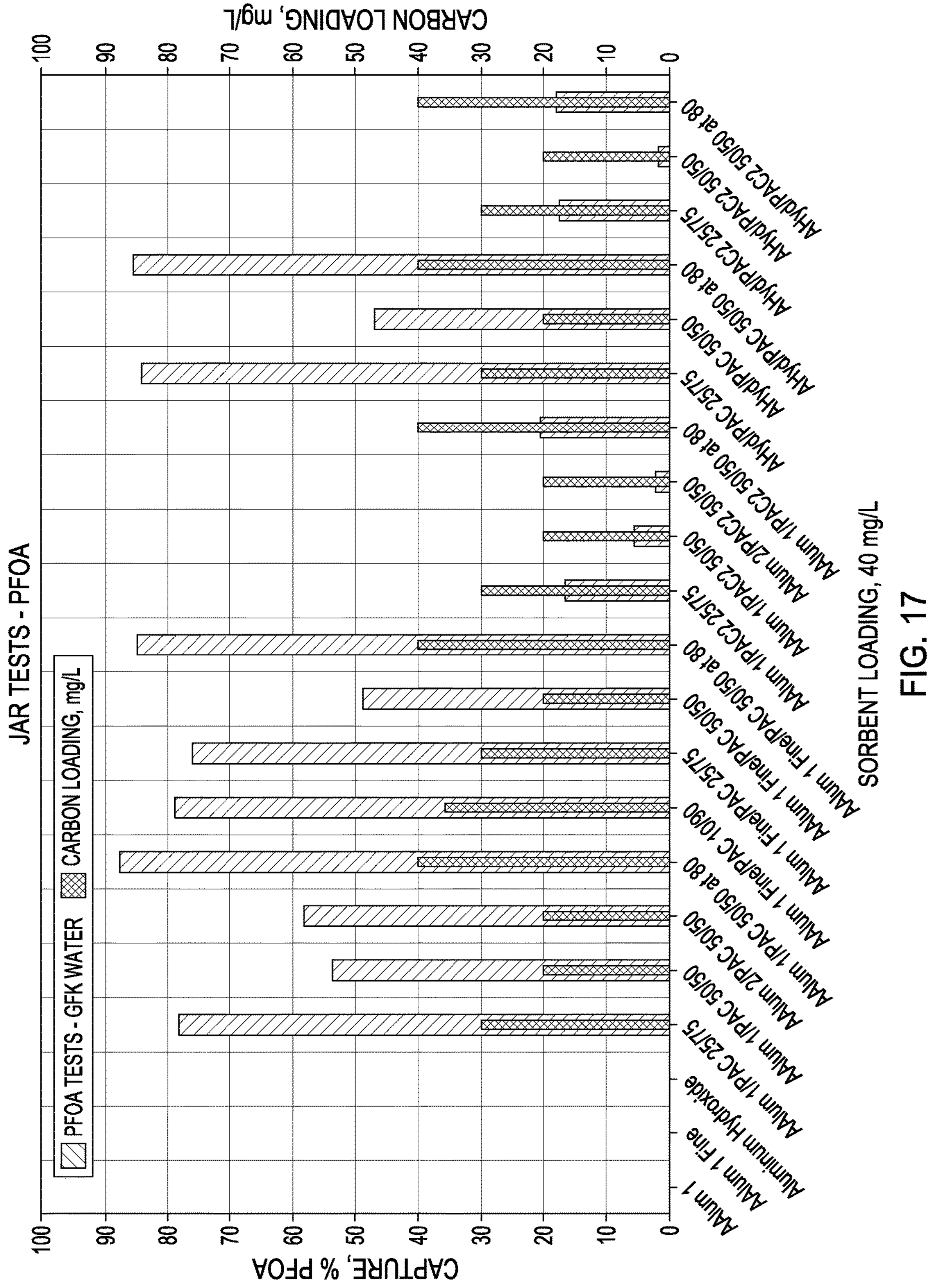
FIG. 17 is a graph of PFOA capture percentage and carbon loading for a subset of the sorbents/composites shown in FIG. 16, in accordance with various aspects.
Figure 18:
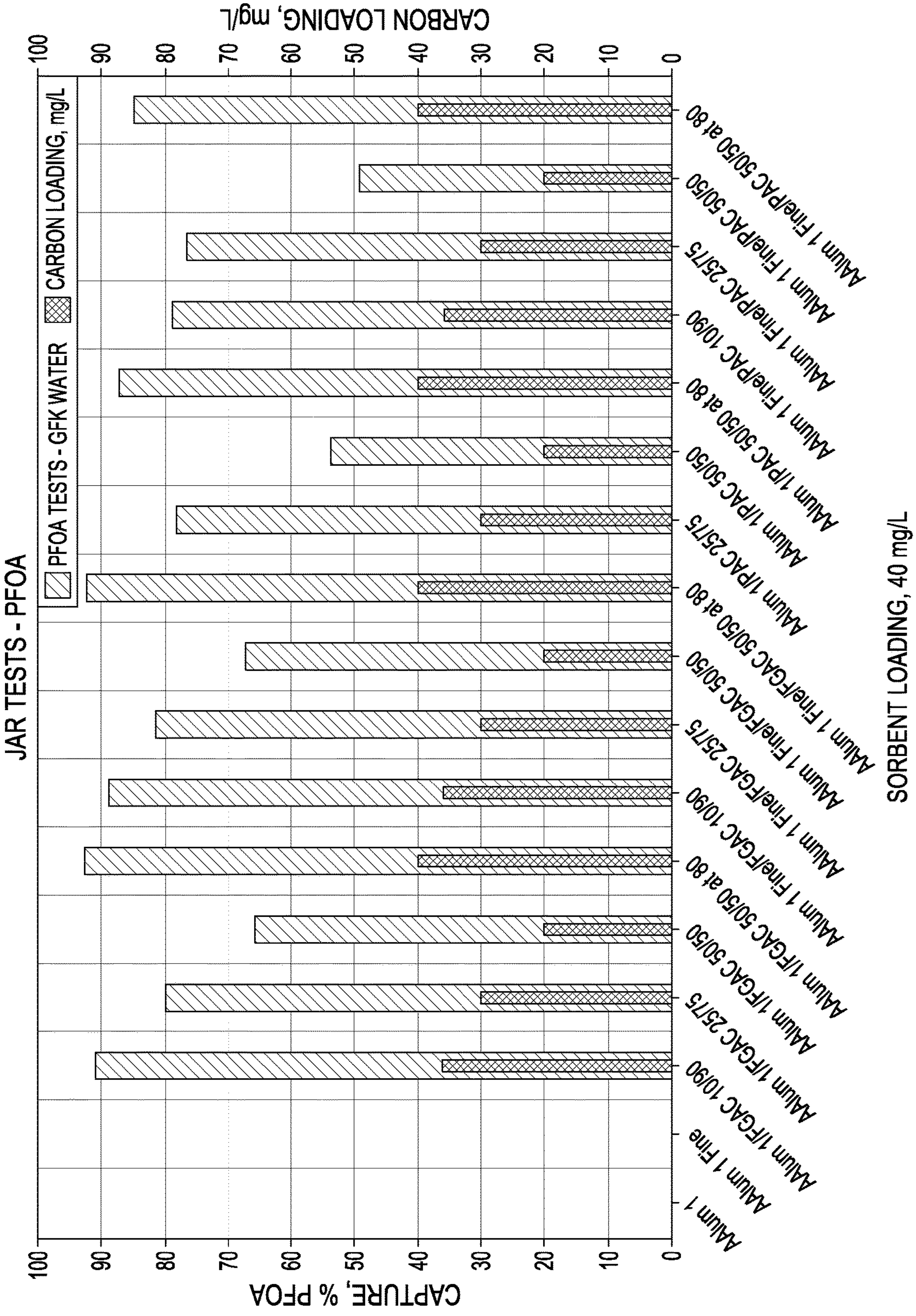
FIG. 18 is a graph of PFOA capture percentage and carbon loading for a subset of the sorbents/composites shown in FIG. 16, in accordance with various aspects.

As can be seen in FIG. 16, for the 48 tests, the removal (capture) of PFOA ranged for a low of near 0% to over 90% showing that some sorbents/composites performed poorly and some very good. Four different additives (described above) AAlum1, AAlum1 fine, AAlum2, AHyd were used during these tests to determine whether one would perform better than the other. FIG. 17 is a graph of PFOA capture percentage and carbon loading for a subset of the sorbents/composites shown in FIG. 16 and shows that all four of the additives performed similarly in enhancing the PAC to remove PFOA. The AAlum1 fine performed near to slightly better than the AAlum likely due to its finer particles. AAlum2 performed slightly better than AAlum1 indicating that adding small amounts of iron may further enhance PAC removal of PFOA. AHyd appeared to perform similarly to AAlum1 indicating that either form of alumina could be used as an additive with predicted similar removal of PFOA. AAlum1, AAlum1 fine, and AHyd all showed essentially no removal of PFOA when applied by themselves without adding in some form of carbon. FIG. 18 is a graph of PFOA capture percentage and carbon loading for a subset of the sorbents/composites shown in FIG. 16 and shows that AAlum1 and AAlum1 fine when combined with a carbon yielded similar results suggesting that the finer AAlum1 (~44 microns) performed similar to the larger sized AAlum1 (~82 microns). It is hypothesized that a size of AAlum less than 44 microns would work similarly while a size significantly larger than 82 microns (e.g., 4×82 microns) may not be as effective.

Figure 19:
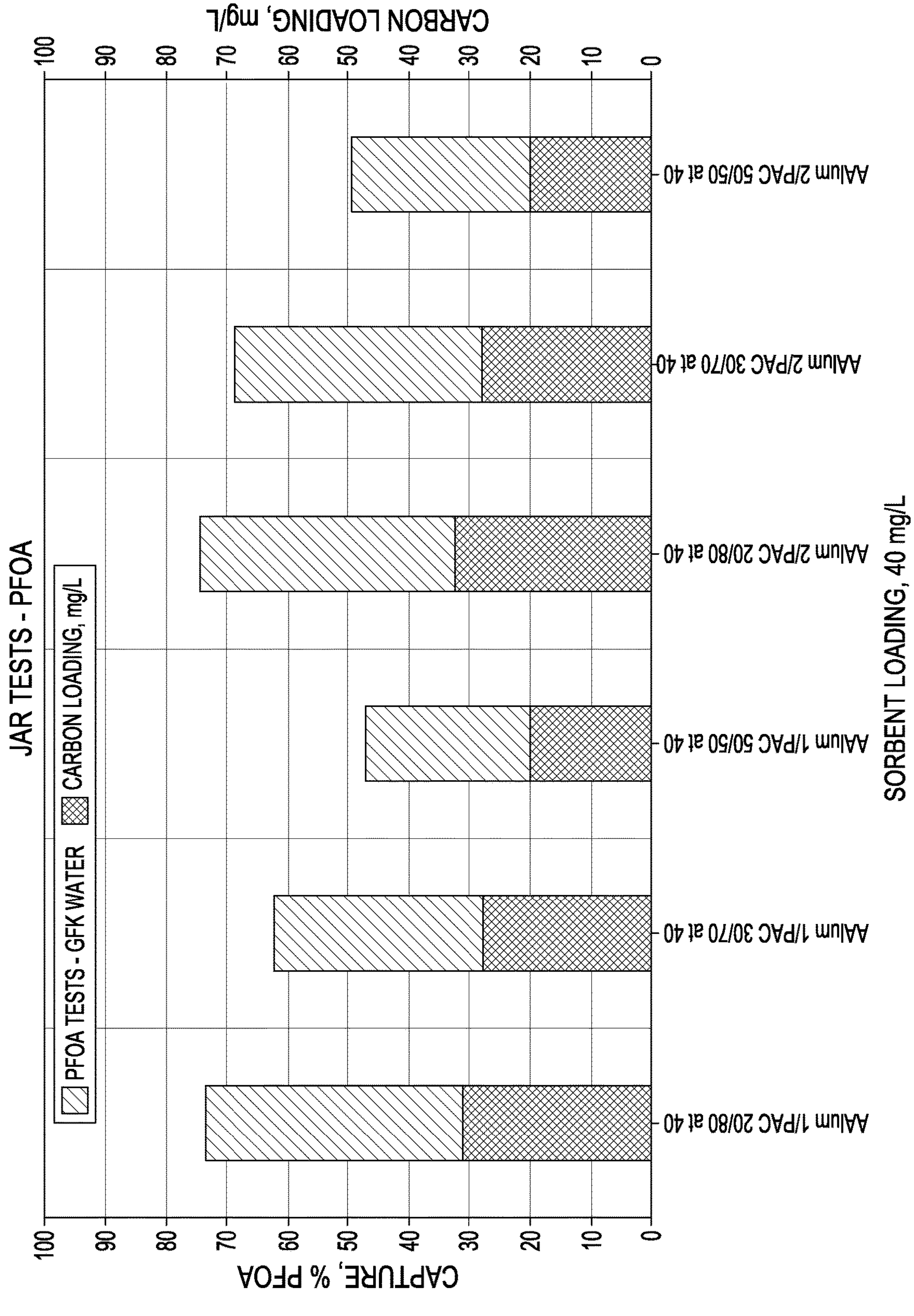
FIG. 19 is a graph of PFOA capture percentage and carbon loading for various sorbents/composites, in accordance with various aspects.

As noted above, FIGS. 16 and 17 show that adding a relatively small amount of iron with the activated alumina can further enhance the ability of the carbon (PAC) to remove PFOA. FIG. 19 is a graph of PFOA capture percentage and carbon loading for various sorbents/composites showing PFOA removal in GFK water and shows that AAlum2 (with iron) removed more PFOA by 2-6 percent as compared to AAlum1 (without iron) at the same loading.

Figure 20:
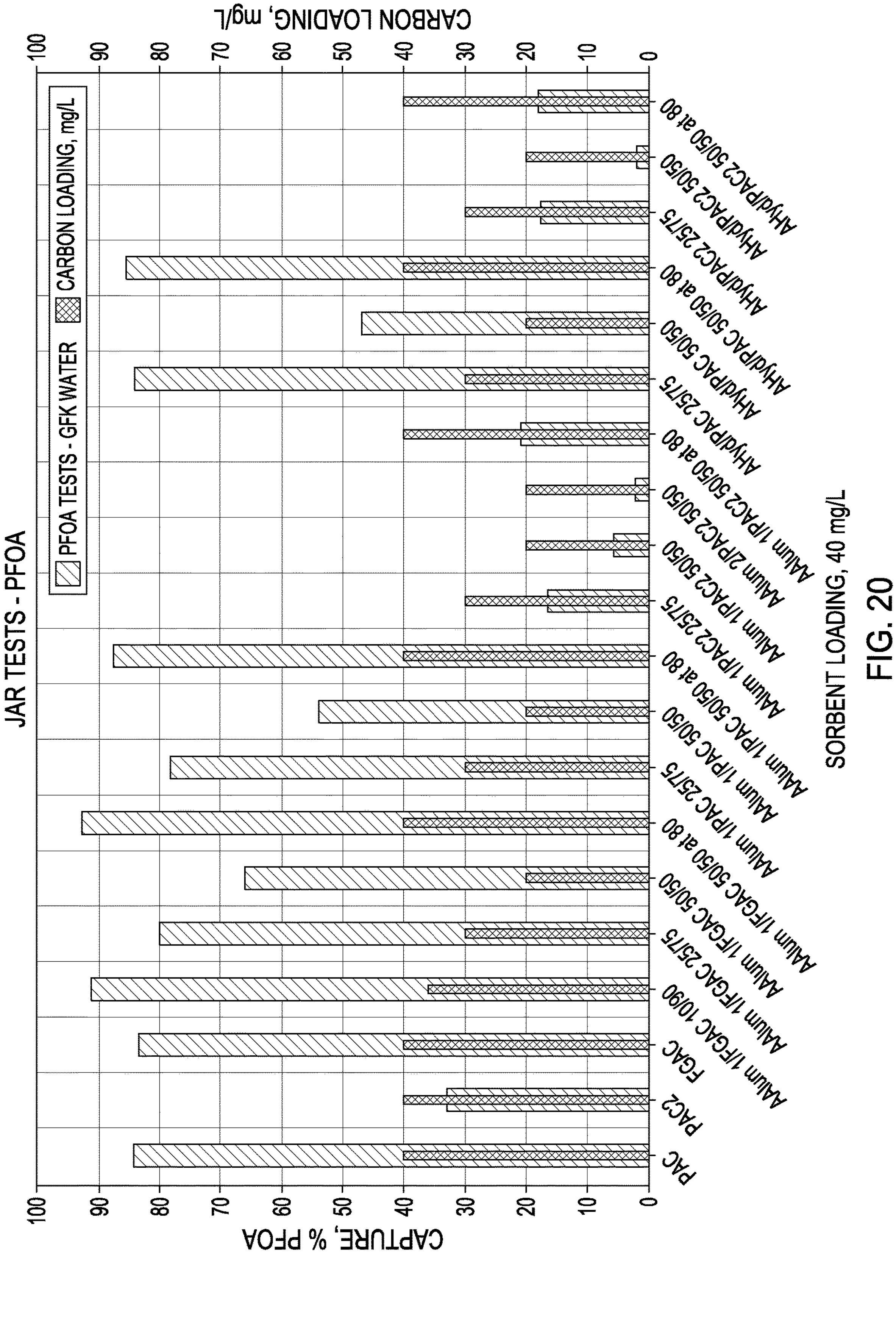
FIG. 20 is a graph of PFOA capture percentage and carbon loading for a subset of the sorbents/composites shown in FIG. 16, in accordance with various aspects.

FIG. 20 is a graph of PFOA capture percentage and carbon loading for a subset of the sorbents/composites shown in FIG. 16 and shows test results for the carbons that had a smaller size of approximately 30-50 microns with particles of approximately 44 microns or smaller. As shown in FIG. 20, PAC2 performed poorly with and without the alumina additive. This is due to the very low surface area of PAC2, which is around 300 $m^2/g$ or less. FGAC and PAC performed similarly with noted improvement in PFOA removals when AAlum1 and AHyd were added in ratios of 10-25%. Similar to better PFOA removal was observed when 10-25% alumina was added, reducing the amount of carbon by 10-25% which provides a significant cost advantage as the AAlum1 and AHyd is lower in cost by a factor of about 3 to 6. Also, the best removal resulted when high doses of 40 mg/L of AAlum1 were added to 40 mg/L of FGAC resulting in greater than 90% removal of PFOA and greater removal as compared to 40 mg/L of FGAC by itself. This improvement can be significant in cases where maximum PFOA removal is required.

Figure 21:
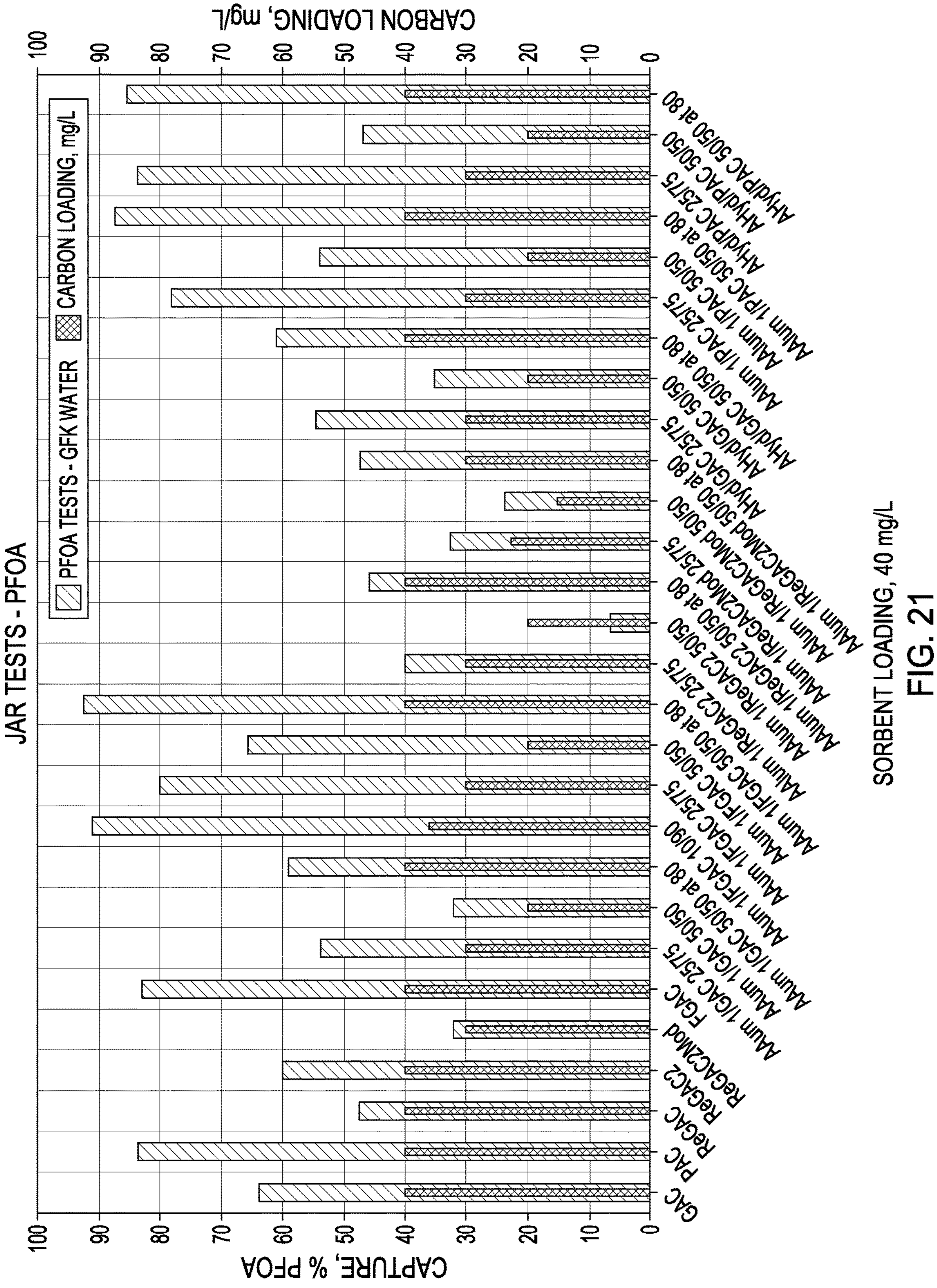
FIG. 21 is a graph of PFOA capture percentage and carbon loading for a subset of the sorbents/composites shown in FIG. 16, in accordance with various aspects.

FIG. 21 is a graph of PFOA capture percentage and carbon loading for a subset of the sorbents/composites shown in FIG. 16 and shows that the finer sized FGAC and PAC of approximately 44 microns (90% through 325 mesh) performed much better in removing over 80% PFOA as compared to larger sized GACs of approximately 82 microns that removed closer to 60%. Carbons smaller in size than 90% through 325 mesh (approximately 44 microns) may perform better but the cost of grinding would need to be considered versus performance improvements. The addition of AAlum1 and AHyd appeared to have a modest improvement when added in the amount of 10-25% providing significant cost advantages by reducing carbon loadings and achieving similar to better removal of PGOA. While ReGAC2 performed similar to GAC, ReGAC1 and ReGACMod did not perform as good. This is likely due to different starting materials and reactivation conditions. ReGAC2 showed similar removal of PFOA as compared to the virgin GAC showing that spent GAC can be reactivated to near same performance as virgin GACs. Based on the data herein, further optimization of reactivation conditions and addition of additives can be predicted to generate a reactivated GAC that performs better than virgin GAC.

Figure 22:
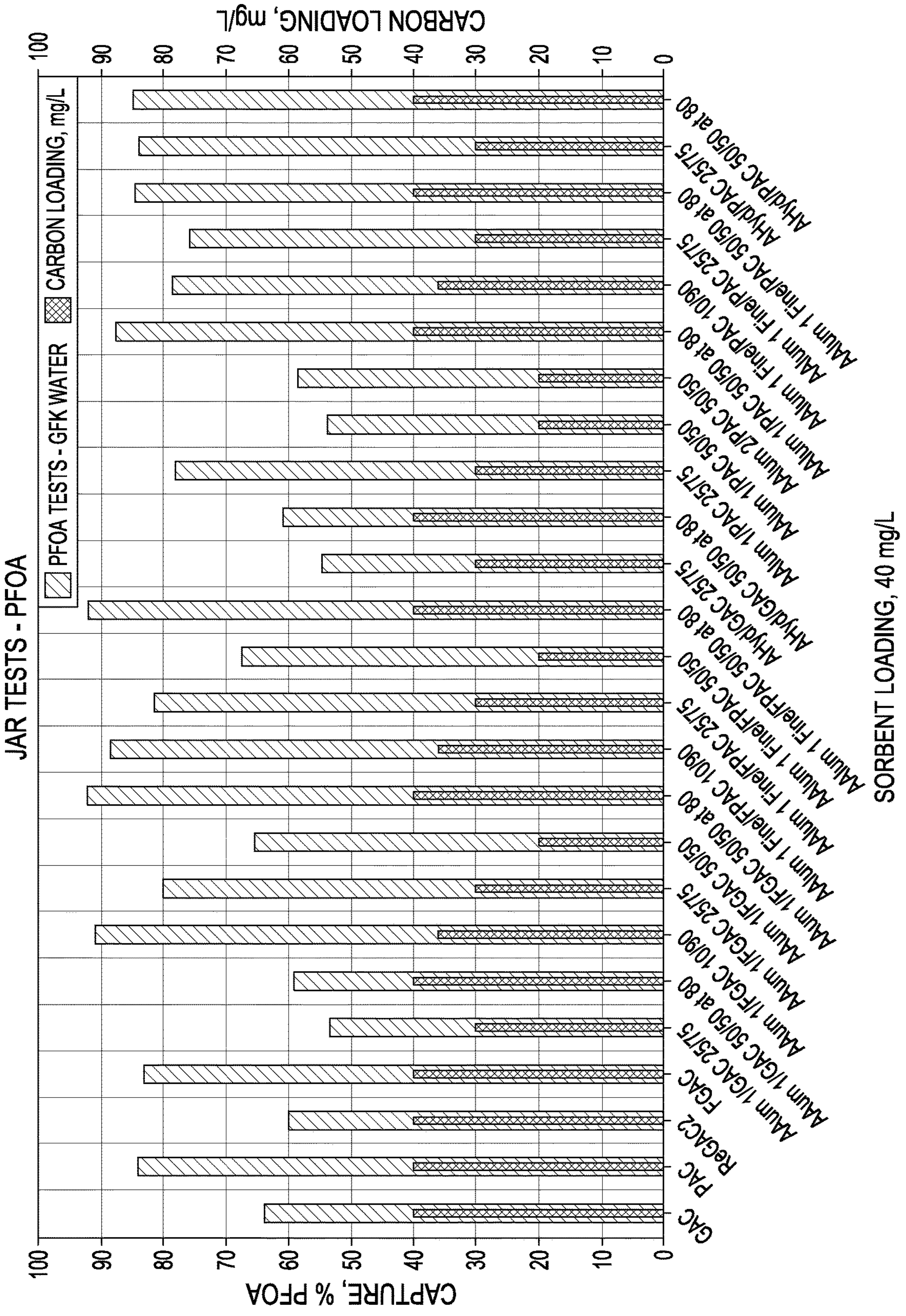
FIG. 22 is a graph of PFOA capture percentage and carbon loading for a subset of the sorbents/composites shown in FIG. 16, in accordance with various aspects.

FIG. 22 is a graph of PFOA capture percentage and carbon loading for a subset of the sorbents/composites shown in FIG. 16 and shows all the sorbents and combinations of additives and sorbents that exhibited greater than 50% removal of PFOA. The results show that the finer carbons and combinations of additives and finer carbons performed better than the larger sized sorbents and combinations of additives and larger sized sorbents. The addition of AAlum1 to FGAC showed a removal of over 90% compared to over 80% with FGAC alone, providing a 10% increase. This combination not only improved removal of PFOA but also at a lower carbon loading and lower cost since AAlum1 is 5-6 times less costly than FGAC. The data also show that adding AAlum1 at 25% showed similar performance to GAC, PAC, and FGAC alone providing significant cost advantages. The data also shows that adding in AAlum1 at ratios of 1:1 (or greater) can enhance maximum removal of PFOA by finer sized carbons such as FGAC and PAC which could be used to reduce levels of PFAS to a lower concentration when required, or where water quality is poor. Based on the data, alumina to carbon ratios of 1:1 to 5:1 are predicted to maximize PFAS removal at minimum carbon loadings, or result in maximum PFAS removal at alumina to carbon ratios of 1:1 to 5:1 at higher carbon loadings.

Figure 23:
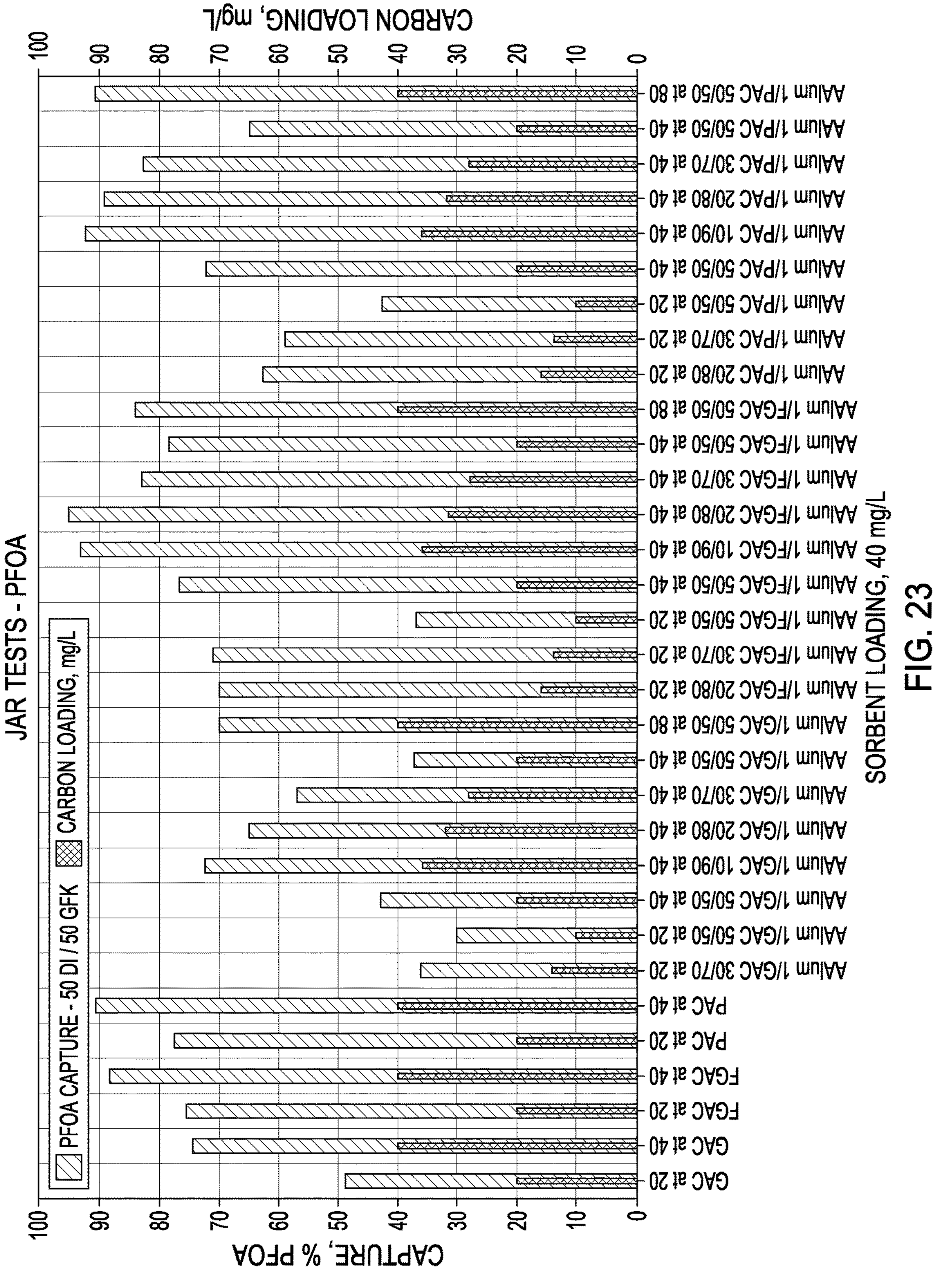
FIG. 23 is a graph of PFOA capture percentage and carbon loading for various sorbents/composites, in accordance with various aspects.

Tests were performed using a mixture of 50% DI water and 50% GFK water to simulate a water that has lower TOC and alkalinity values. The TOC values were approximately 3 mg/L and the alkalinity values were approximately 50 mg/L for the water used during these tests. Additional jar tests were done at loading rates of 20, 40, and 80 mg/L as denoted on FIG. 23. Jar test procedures were performed as described above for a 100% commercial virgin GAC (GAC) produced by Norit, a commercial virgin PAC (PAC) produced by Norit, a fine GAC (FGAC) produced by Norit and reduced in size, an activated alumina (AAlum1), and various blend/mix ratio composites. The GAC sample was ground to a size of 70-90 microns, with an average size of 82 microns. FGAC and PAC were ground to 90% through 325 mesh, or particles less than 44 microns. Each sample was added at 20, 40, or 80 mg/L to tubes with a DI water solution of 50,000 ng/L of PFOA (long chain PFAS). FIG. 23 is a graph of PFOA capture percentage and carbon loading for a jar test of the samples. As shown in FIG. 23, FGAC and PAC performed similarly and better than GAC primarily due to the smaller sized particles. PFOA removal increased significantly when increasing the loading rate from 20 mg/L to 40-80 mg/L resulting in PFOA removals of approximately 40-50% to 80-90%.

Figure 24:
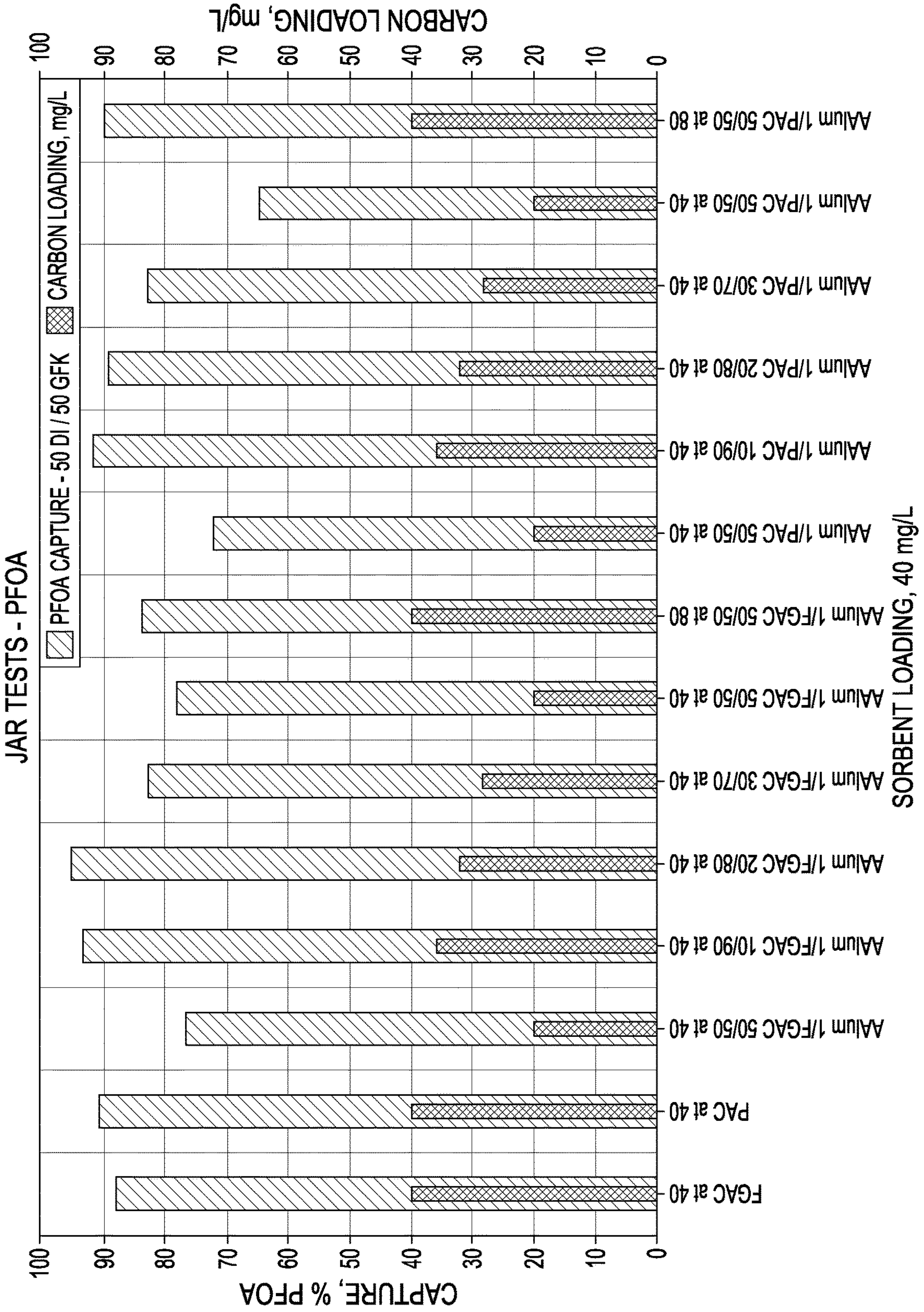
FIG. 24 is a graph of PFOA capture percentage and carbon loading for a subset of the sorbents/composites shown in FIG. 23, in accordance with various aspects.

FIG. 24 is a graph of PFOA capture percentage and carbon loading for a subset of the sorbents/composites shown in FIG. 23. As shown in FIG. 24, similar to better PFOA removal was observed when 10-30 percent alumina was added, reducing the amount of carbon by 10-30% which provides a significant cost advantage as the AAlum1 (and AHyd) is less expensive than the carbonaceous materials by a factor of 3 to 6. The highest level of PFOA removal was with the combination of 20% AAlum1 and 80% FGAC of over 95% compared to FGAC alone which achieved 88% removal. The data show that the alumina addition (e.g., AAlum1) promotes and enhances the capture of PFOA by carbons, in particular finer sized carbons. Further, the proportion of alumina to carbon can influence the degree of PFOA removal. That is, if there is too small of an amount of carbon present, then there is too small or an amount of carbon to enhance/promote. The optimal proportion of alumina to carbon can depend on the water quality and on the target amount of PFAS to be removed. While the data shown here are for PFOA, based on the data it can be predicted that similar results would be achieved for all PFAS as PFOA has been shown to be more difficult to remove than other PFAS.

FIG. 22 showing a subset of FIG. 16 showing all of the sorbents and combinations of additives and sorbents that exhibit greater than 50% removal of PFOA. The results show that the finer carbons and combinations of additives and finer carbons performed better than the larger sized sorbents and combinations of additives and larger sized sorbents. The addition of AAlum1 to FGAC showed a removal of over 90% compared to over 80% with FGAC alone, providing a 10% increase. This combination not only improved removal of PFOA but also at a lower carbon loading and lower cost since AAlum1 is 5-6 times less costly than FGAC. The data also show that adding AAlum1 at 25% showed similar performance to GAC, PAC, and FGAC alone, providing significant cost advantages. The data also shows that adding in AAlum1 at ratios to the carbonaceous material of 1:1 (or greater) can enhance maximum removal of PFOA by finer sized carbons such as FGAC and PAC which could be used to reduce levels of PFAS to a lower concentration when required, or where water quality is poor. Based on the data, alumina to carbon ratios of 1:1 to 6.5:1 can be predicted to maximize PFAS removal at minimum carbon loadings, or result in maximum PFAS removal at alumina to carbon ratios of 1:1 to 6.5:1.

Figure 25:
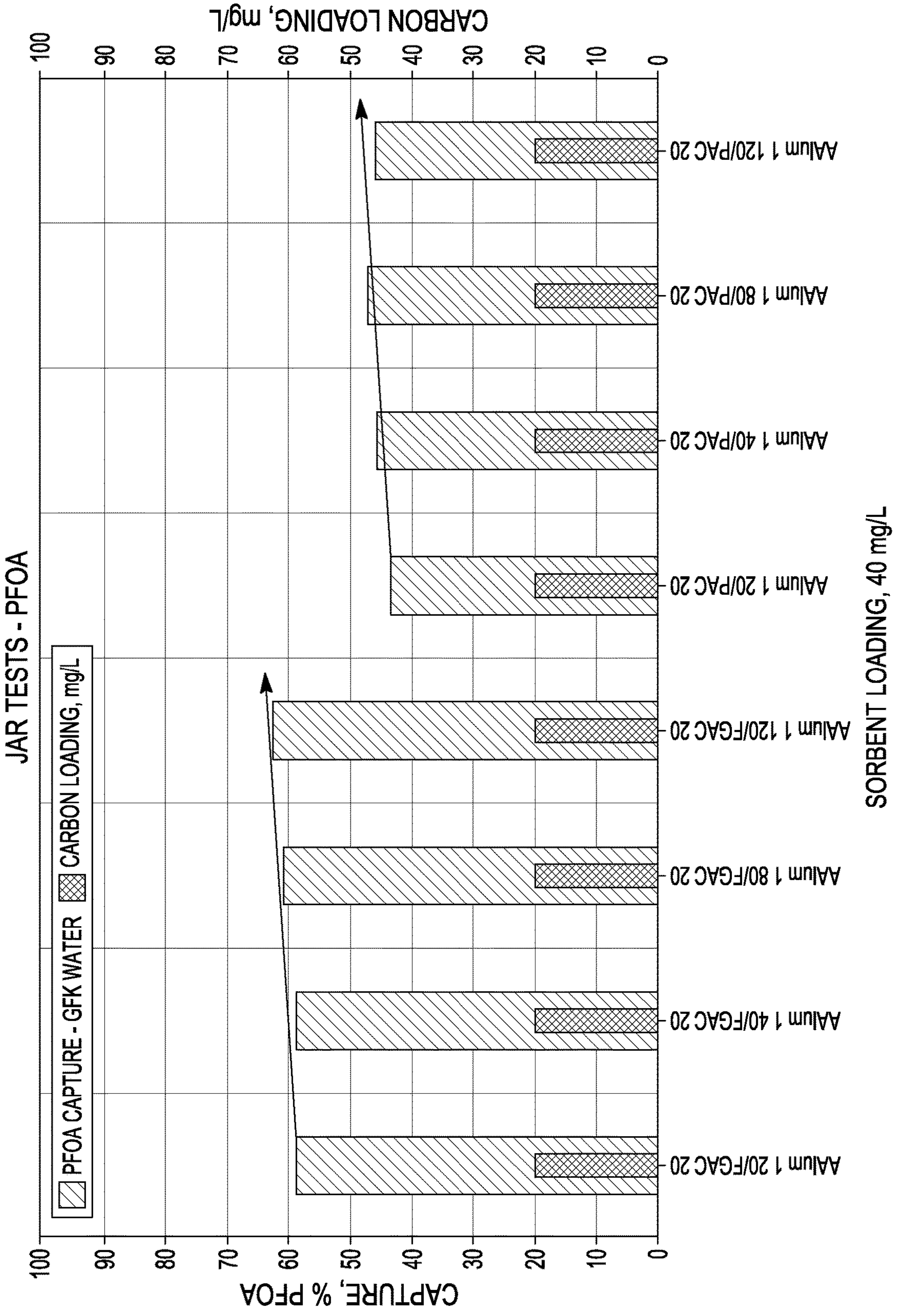
FIG. 25 is a graph of PFOA capture percentage and carbon loading for various sorbents/composites, in accordance with various aspects.

Additional tests were done to further evaluate alumina to carbon ratios of 1:1 to 6:1, with the data shown in FIG. 25. As shown in FIG. 25 there was approximately a 5% increase in PFOA removal as the alumina to carbon ratio increased from 1:1 to 6:1.

Figure 26:
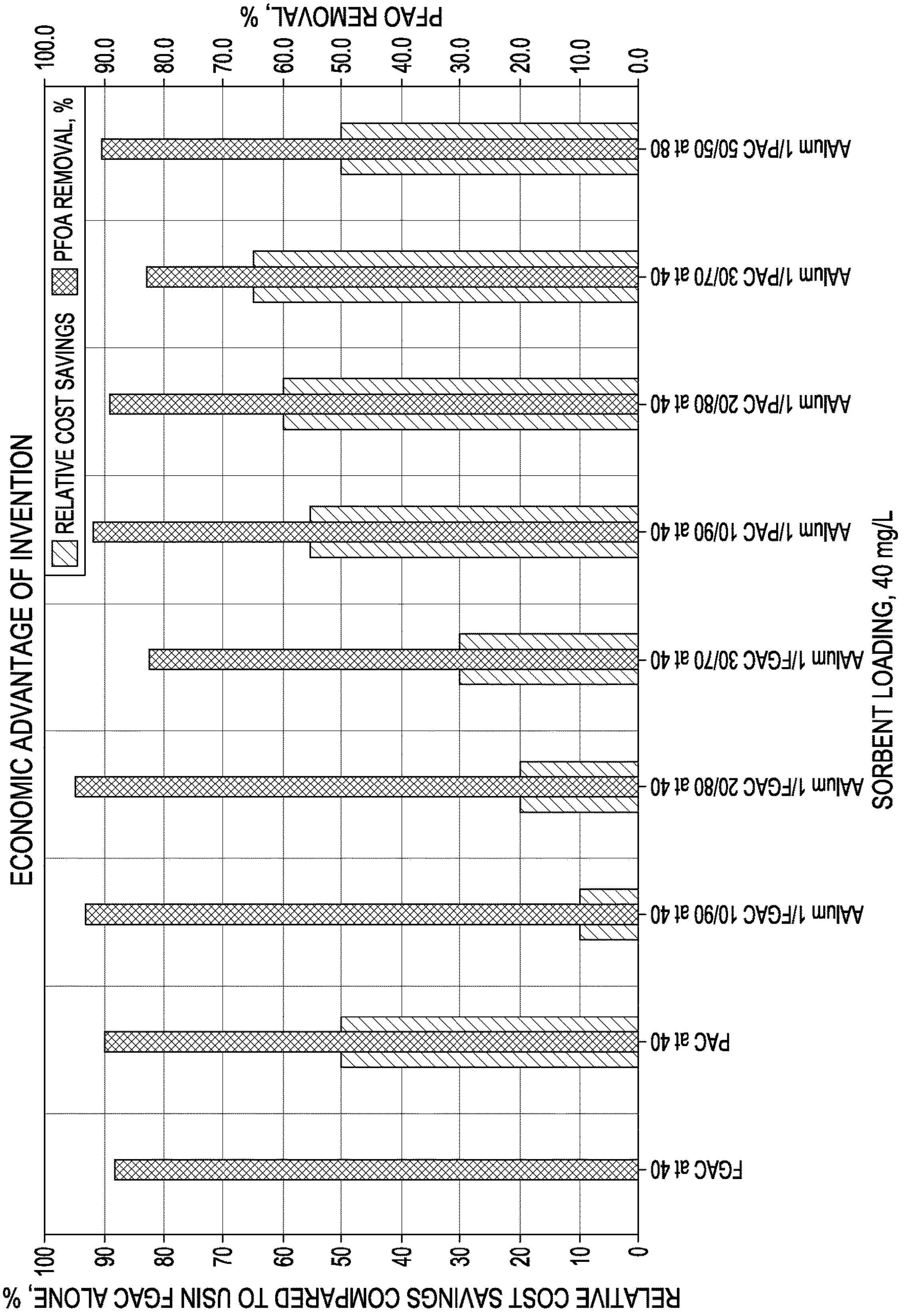
FIG. 26 is a graph of relative cost savings compared to FGAC alone and PFAO removal for various sorbents/composites shown in FIG. 23, in accordance with various aspects.

Based on the data presented in FIGS. 16-25, there can be significant economic advantages to various aspects of the present disclosure. The addition of alumina has been shown to promote and enhance the carbon, making it more effective towards removal of PFAS from water. The data shows that by combining alumina and carbon there is a reduction of 10-30% of carbon while still achieving similar to better removal of PFOA, with similar results predicted for all PFAS. The cost savings are realized by the cost of alumina being about 3-6 times less than PAC and GAC carbons. FIG. 26 shows the potential cost savings relative to using only FGAC for options/combinations that have been shown by the data to achieve greater than 80% removal of PFOA. As can be seen by the graph, the cost saving relative to using only FGAC can be predicted to be 10-65%. In addition to potential cost savings, various aspects of the present disclosure allow for increased and maximum removal of PFAS by combining higher rates of alumina to carbon in ratios of greater than 1:1 (even as high 6:1 or higher) when high levels of PFAS removal are desired/required, in particular when treating poor water quality, and cost is less of a consideration. Depending on water quality, various aspects of the present disclosure can provide for tunability by varying the amount of alumina to carbon from approximately 0.1:1 to 10:1.

Figure 27:
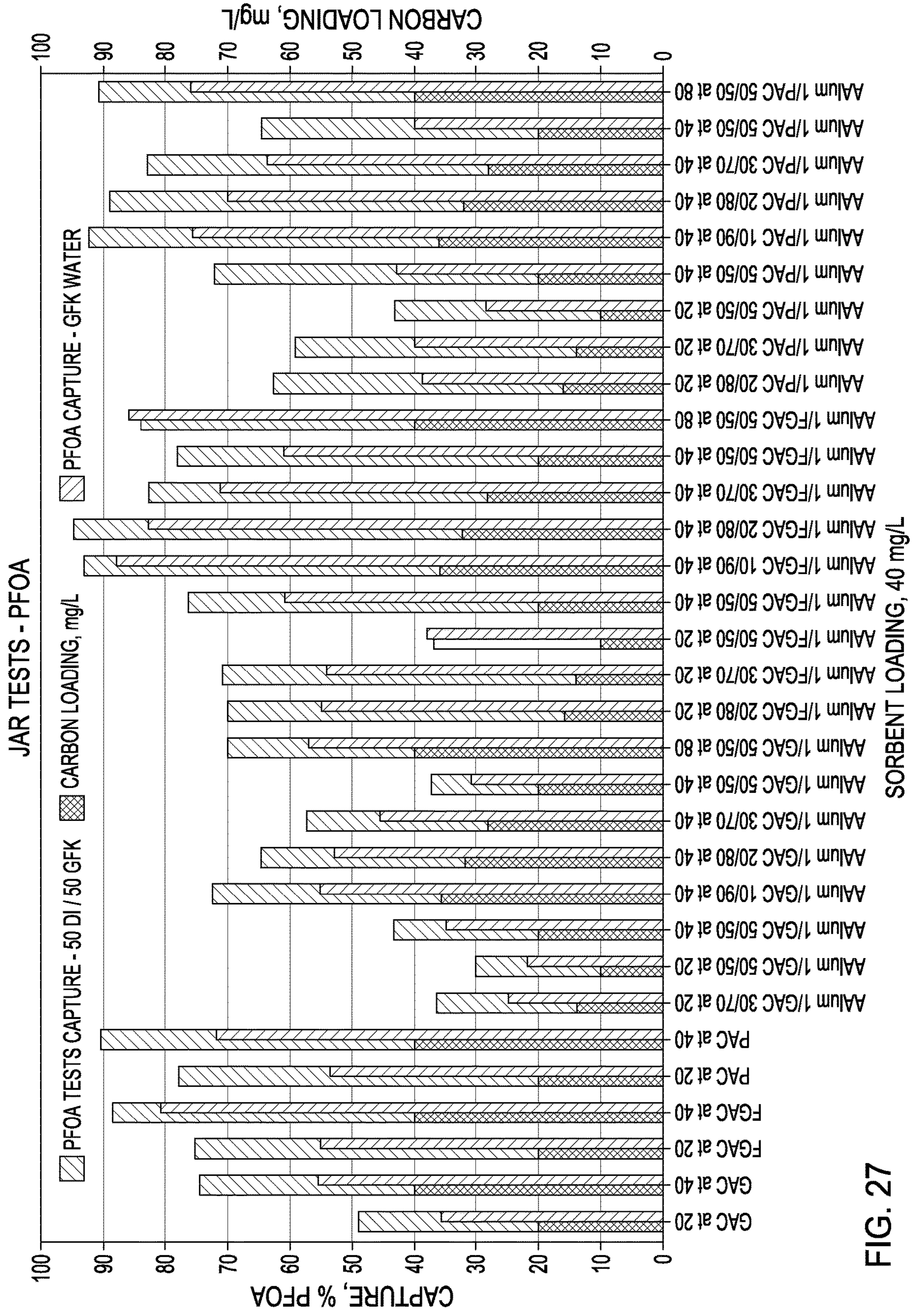
FIG. 27 is a graph of PFOA capture percentage and carbon loading for various sorbents/composites, in accordance with various aspects.

Additional tests were performed using GFK water to determine the impact that water quality and contaminants within the water impact removal of PFOA. The water used for these tests was GFK water that had TOC values of approximately 6 mg/L and the alkalinity values were approximately 115 mg/L. Similarly to the data presented in FIG. 23, jar tests were done at a loading rate of 20, 40, and 80 mg/L as denoted on FIG. 26. Jar test procedures were performed as described above for a 100% commercial virgin GAC (GAC) produced by Norit, a commercial virgin PAC (PAC) produced by Norit, a fine GAC (FGAC) produced by Norit and reduced in size, an activated alumina (AAlum1), and various blend/mix ratio composites. The GAC sample was ground to a size of 70-90 microns, with an average size of 82 microns. FGAC and PAC were ground to 90% through 325 mesh, or particles less than 44 microns. Each sample was added at 20, 40, or 80 mg/L to tubes with a DI water solution of 50,000 ng/L of PFOA (long chain PFAS). FIG. 27 is a compilation and comparison of data presented in FIG. 23, which was performed with 50% DI and 50 GFK water. The data in FIG. 27 clearly shows the impact of contaminants in the water as the percent removal of PFOA by all options tested were reduced by 10-20% with the GFK water as compared to the 50% DI and 50% GFK water. However, while the percentage decreased, the trends among all options tested remained the same. That is, similar to better PFOA removal was observed when 10-30% alumina was added, reducing the amount of carbon by 10-30% which provides a cost advantage as the AAlum1 costs significantly less by a factor of about 3 to 6. To note, while the data shown here are for PFOA, it can be predicted that similar results would be achieved for all PFAS as PFOA has shown to be more difficult to remove than other PFAS.

Example 10. Rapid Small Scale Column Tests (RSSCTs)

RSSCTs were performed with a reactivated spent GAC and compared with two virgin GACs: Calgon F400 (denoted as GAC 1 and a Norit GAC (denoted as GAC 3). Additionally, tests with three additions of virgin GAC were added to the reactivated GAC at ratios of 85/10, 70/30 and 50/50 to demonstrate how the performance of the reactivated GAC performance can be improved for removal of PFAS. The RSSCTs were conducted under constant diffusivity (CD) conditions spiked with 50 ppt PFOA into GFK water and a 7.5 minute EBCT.

Figure 28:
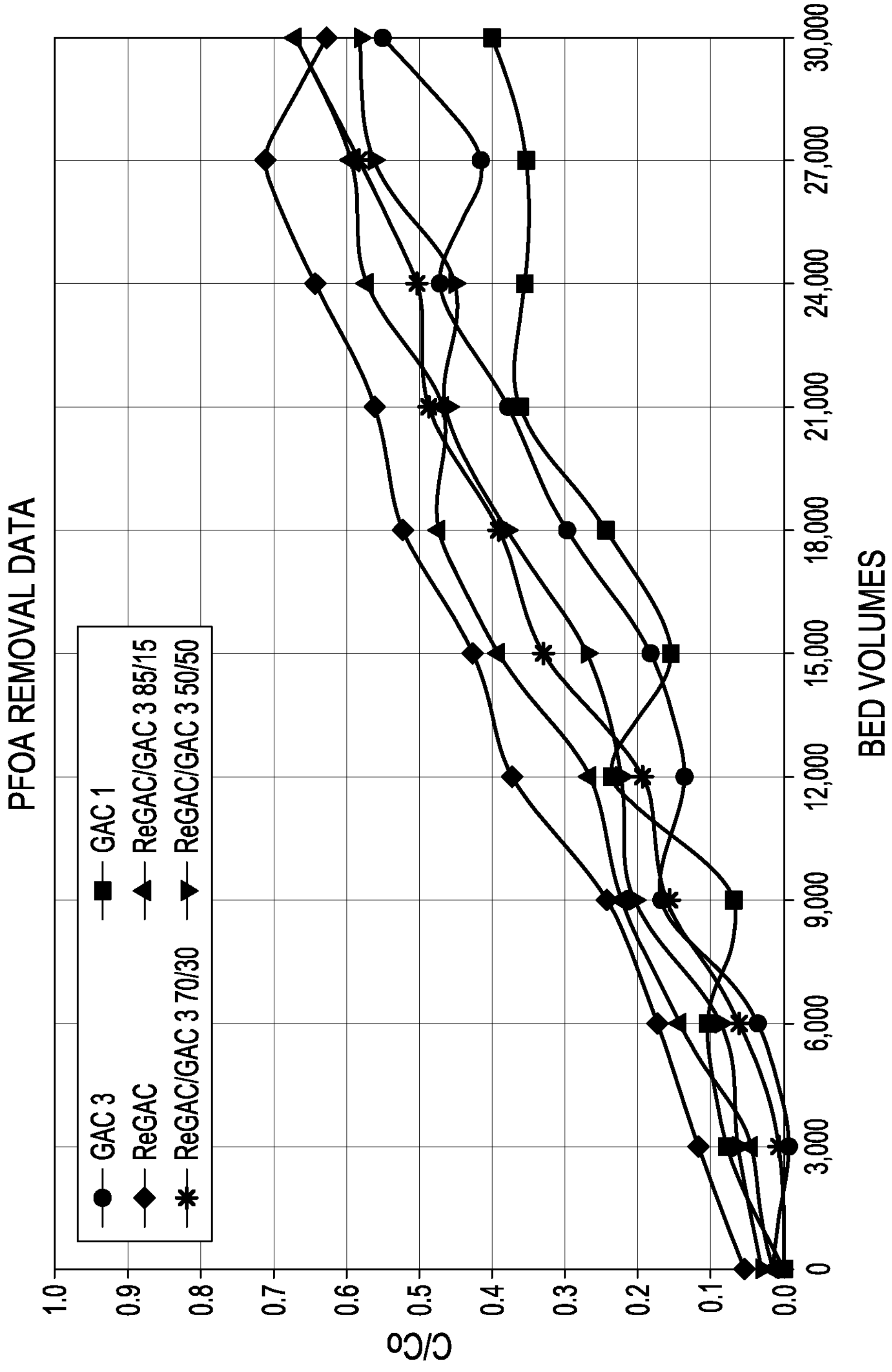
FIG. 28 is a graph of C/Co (as measured concentration of PFOA/starting concentration of the spiked PFOA) versus bed volumes for a rapid small scale column test of various sorbents, in accordance with various aspects.

FIG. 28 is a graph of C/Co (as measured concentration of PFOA/starting concentration of the spiked PFOA) versus bed volumes for a rapid small scale column test of the samples. As shown in FIG. 28, the reactivated GAC did not perform as well as the virgin GACs. The three composites of reactivated GAC/virgin GAC showed improved performance in terms of PFOA removal, with decreasing removal of PFOA at the higher composite ratios of reactivated GAC/virgin GAC. There are economic and environmental advantages to using reactivated GACs to the extent possible. Reactivating spent GACs can result in near 100% destruction of PFAS at a cost of 30-50% less than virgin GACs.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Exemplary Aspects

The following exemplary aspects are provided, the numbering of which is not to be construed as designating levels of importance:

Aspect 1 provides a method of forming an activated carbon composite, the method comprising:

- optionally performing a pre-treatment of a primary carbonaceous material;
- adding an additive composition to the primary carbonaceous material, to form a composite of the primary carbonaceous material and the additive composition; and
- optionally performing a post-treatment of the composite of the primary carbonaceous material and the additive composition, wherein at least one of the pre-treatment and the post-treatment are performed;

to form the activated carbon composite.

Aspect 2 provides the method of Aspect 1, wherein the primary carbonaceous material comprises wood biochar granulate, coal or petroleum char granulate, wood-derived granular activated carbon, coal- or petroleum-derived granular activated carbon, wood-derived powdered activated carbon, coal- or petroleum-derived powdered activated carbon, virgin granulated activated carbon, reactivated powdered activated carbon, reactivated granulated activated carbon, spent activated carbon, spent powdered activated carbon, spent granulated activated carbon, or a combination thereof.

Aspect 3 provides the method of any one of Aspects 1-2, wherein the primary carbonaceous material comprises a granular carbonaceous material comprising a used granular activated carbon, virgin granular activated carbon, unactivated granular carbon, spent granular carbon, wood biochar granulate, coal or petroleum char granulate, or a combination thereof.

Aspect 4 provides the method of any one of Aspects 1-3, wherein the primary carbonaceous material comprises used granular activated carbon.

Aspect 5 provides the method of any one of Aspects 3-4, wherein the activated carbon composite is a granular activated carbon composite.

Aspect 6 provides the method of any one of Aspects 1-2, wherein the primary carbonaceous material comprises a powdered carbon.

Aspect 7 provides the method of Aspect 6, wherein the primary carbonaceous material comprises a used powdered activated carbon, a virgin powdered activated carbon, an unactivated powdered carbon, or a combination thereof.

Aspect 8 provides the method of any one of Aspects 1-7, wherein the primary carbonaceous material comprises a used granular activated carbon or a used powdered activated carbon and the primary carbonaceous material is contaminated with one or more sorbed materials, wherein the activated carbon composite has a concentration of the one or more sorbed materials that is less than 50% of a concentration of the one or more sorbed materials in the primary carbonaceous material.

Aspect 9 provides the method of any one of Aspects 1-8, wherein the primary carbonaceous material comprises a used granular activated carbon or a used powdered activated carbon and the primary carbonaceous material is contaminated with one or more sorbed materials, wherein the activated carbon composite has a concentration of the one or more sorbed materials that is 0.001% to 49% of a concentration of the one or more sorbed materials in the primary carbonaceous material.

Aspect 10 provides the method of any one of Aspects 8-9, wherein the used granular activated carbon or used powdered activated carbon is contaminated with one or more sorbed materials comprising a perfluorinated alkyl compound or a polyfluorinated alkyl compound, wherein the activated carbon composite has a concentration of the perfluorinated alkyl compound or polyfluorinated alkyl compound that is 0.001% to 49% of a concentration of the perfluorinated alkyl compound or polyfluorinated alkyl compound in the primary carbonaceous material.

Aspect 11 provides the method of Aspect 10, wherein the perfluorinated alkyl compound or polyfluorinated alkyl compound is a perfluoroalkyl or polyfluoroalkyl substance (PFAS), perfluoroalkyl substance, a polyfluoroalkyl substance, a perfluoroalkyl acid (PFAA), or a combination thereof.

Aspect 12 provides the method of any one of Aspects 10-11, wherein the perfluorinated alkyl compound or polyfluorinated alkyl compound is perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Aspect 13 provides the method of any one of Aspects 1-12, wherein the primary carbonaceous material has a $d_{50}$ particle size in the range of 0.2 micron to 10 mm.

Aspect 14 provides the method of any one of Aspects 1-13, wherein the primary carbonaceous material has a $d_{50}$ particle size in the range of 0.2 mm to 5 mm or 1 micron to less than 0.2 mm.

Aspect 15 provides the method of any one of Aspects 1-14, wherein the additive composition comprises an additive carbonaceous material.

Aspect 16 provides the method of Aspect 15, wherein the additive carbonaceous material comprises biochar (e.g., wood-derived biochar), a coal or petroleum char, an organic substance, a binder, a powdered carbon (e.g., powdered biochar, powdered coal or petroleum char, used powdered activated carbon, virgin powdered activated carbon, unactivated powdered carbon, or a combination thereof), or a combination thereof.

Aspect 17 provides the method of any one of Aspects 15-16, wherein the additive carbonaceous material is 20 wt % to 100 wt % of the additive composition.

Aspect 18 provides the method of any one of Aspects 15-17, wherein the additive carbonaceous material is 50 wt % to 100 wt % of the additive composition.

Aspect 19 provides the method of any one of Aspects 15-18, wherein the additive carbonaceous material is a powdered carbonaceous material.

Aspect 20 provides the method of Aspect 19, wherein the powdered carbonaceous material is a wet powdered carbonaceous material.

Aspect 21 provides the method of Aspect 19, wherein the powdered carbonaceous material is a dry powdered carbonaceous material.

Aspect 22 provides the method of any one of Aspects 19-21, wherein the powdered carbonaceous material is used powdered activated carbon, virgin powdered activated carbon, unactivated powdered carbon, a powdered biochar, a powdered coal or petroleum char, or a combination thereof.

Aspect 23 provides the method of Aspect 22, wherein the powdered carbonaceous material is virgin powdered activated carbon.

Aspect 24 provides the method of any one of Aspects 19-23, wherein the powdered carbonaceous material has a $d_{50}$ particle size in the range of 0.2 microns to less than 200 microns.

Aspect 25 provides the method of any one of Aspects 19-24, wherein the powdered carbonaceous material has a $d_{50}$ particle size in the range of 15 microns to 100 microns.

Aspect 26 provides the method of any one of Aspects 19-25, wherein the powdered carbonaceous material is 0.001 wt % to 90 wt % of the composite of the primary carbonaceous material and the additive composition.

Aspect 27 provides the method of any one of Aspects 19-26, wherein the powdered carbonaceous material is 0.1 wt % to 40 wt % of the composite of the primary carbonaceous material and the additive composition.

Aspect 28 provides the method of any one of Aspects 19-27, wherein the powdered carbonaceous material is 0.1 wt % to 10 wt % of the composite of the primary carbonaceous material and the additive composition.

Aspect 29 provides the method of any one of Aspects 19-28, wherein the powdered carbonaceous material is 1 wt % to 40 wt % of the composite of the primary carbonaceous material and the additive composition.

Aspect 30 provides the method of any one of Aspects 19-29, wherein the composite of the primary carbonaceous material and the additive composition has a mass ratio of the powdered carbonaceous material to the primary carbonaceous material of 0.00001:1 to 7:1.

Aspect 31 provides the method of any one of Aspects 19-30, wherein the composite of the primary carbonaceous material and the additive composition has a mass ratio of the primary carbonaceous material to the powdered carbonaceous material of 0.01:1 to 0.7:1.

Aspect 32 provides the method of any one of Aspects 19-31, wherein the powdered carbonaceous material is 20 wt % to 100 wt % of the additive composition.

Aspect 33 provides the method of any one of Aspects 19-32, wherein the powdered carbonaceous material is 50 wt % to 100 wt % of the additive composition.

Aspect 34 provides the method of any one of Aspects 19-33, further comprising applying an electrical charge to the powdered carbonaceous material, adding one or more chemicals to alter a chemical charge of the powdered carbonaceous material, or a combination thereof.

Aspect 35 provides the method of any one of Aspects 1-34, wherein the composite of the primary carbonaceous material and the additive composition has a $d_{50}$ particle size in the range of 0.2 microns to 10 mm.

Aspect 36 provides the method of any one of Aspects 1-35, wherein the composite of the primary carbonaceous material and the additive composition has a $d_{50}$ particle size in the range of 0.2 mm to 7 mm.

Aspect 37 provides the method of any one of Aspects 1-36, wherein the activated carbon composite has a $d_{50}$ particle size in the range of 0.2 microns to 10 mm.

Aspect 38 provides the method of any one of Aspects 1-37, wherein the activated carbon composite has a $d_{50}$ particle size in the range of 0.2 mm to 7 mm.

Aspect 39 provides the method of any one of Aspects 1-38, wherein the activated carbon composite has a $d_{50}$ particle size that is larger than a $d_{50}$ particle size of the primary carbonaceous material.

Aspect 40 provides the method of Aspect 39, wherein the activated carbon composite has a $d_{50}$ particle size that is 0.01% to 200% larger than a $d_{50}$ particle size of the primary carbonaceous material.

Aspect 41 provides the method of any one of Aspects 1-40, wherein the activated carbon composite has a $d_{50}$ particle size that is equal to or smaller than a $d_{50}$ particle size of the primary carbonaceous material.

Aspect 42 provides the method of any one of Aspects 1-41, wherein the activated carbon composite has an average mass per volume that is greater than an average mass per volume of the primary carbonaceous material, or an average mass per volume that is equal to or less than an average mass per volume of the primary carbonaceous material (e.g., 0% to 200% less).

Aspect 43 provides the method of any one of Aspects 1-42, wherein the activated carbon composite has an average mass per volume that is 0.01% to 800% greater than an average mass per volume of the primary carbonaceous material.

Aspect 44 provides the method of any one of Aspects 1-43, wherein the activated carbon composite has about the same average number of through-pores per mass as the primary carbonaceous material.

Aspect 45 provides the method of any one of Aspects 1-44, wherein the activated carbon composite has a greater number of through-pores per mass compared to the primary carbonaceous material.

Aspect 46 provides the method of any one of Aspects 1-45, wherein the activated carbon composite has a smaller number of through-pores per mass compared to the primary carbonaceous material.

Aspect 47 provides the method of any one of Aspects 1-46, wherein the activated carbon composite has about the same average pore size as the primary carbonaceous material.

Aspect 48 provides the method of any one of Aspects 1-47, wherein the activated carbon composite has a greater average pore size as compared to the primary carbonaceous material.

Aspect 49 provides the method of any one of Aspects 1-48, wherein the activated carbon composite has a smaller average pore size as compared to the primary carbonaceous material.

Aspect 50 provides the method of any one of Aspects 1-49, wherein the activated carbon composite has about the same pore volume as the primary carbonaceous material.

Aspect 51 provides the method of any one of Aspects 1-50, wherein the activated carbon composite has a greater pore volume as compared to the primary carbonaceous material.

Aspect 52 provides the method of any one of Aspects 1-51, wherein the activated carbon composite has a smaller pore volume as compared to the primary carbonaceous material.

Aspect 53 provides the method of any one of Aspects 1-52, wherein the activated carbon composite has about the same surface area per mass as the primary carbonaceous material.

Aspect 54 provides the method of any one of Aspects 1-53, wherein the activated carbon composite has a lower surface area per mass as compared to the primary carbonaceous material.

Aspect 55 provides the method of any one of Aspects 1-54, wherein the activated carbon composite has a greater surface area per mass as compared to the primary carbonaceous material.

Aspect 56 provides the method of any one of Aspects 1-55, wherein the primary carbonaceous material is 10 wt % to 99.999 wt % of the composite of the primary carbonaceous material and the additive composition.

Aspect 57 provides the method of any one of Aspects 1-56, wherein the primary carbonaceous material is 60 wt % to 99 wt % of the composite of the primary carbonaceous material and the additive composition.

Aspect 58 provides the method of any one of Aspects 1-57, wherein an additive carbonaceous material in the additive composition is 0.001 wt % to 90 wt % of the composite of the primary carbonaceous material and the additive composition.

Aspect 59 provides the method of any one of Aspects 1-58, wherein an additive carbonaceous material in the additive composition is 1 wt % to 40 wt % of the composite of the primary carbonaceous material and the additive composition.

Aspect 60 provides the method of any one of Aspects 1-59, wherein the composite of the primary carbonaceous material and the additive composition has a mass ratio of an additive carbonaceous material in the additive composition to the primary carbonaceous material of 0.00001:1 to 7:1.

Aspect 61 provides the method of any one of Aspects 1-60, wherein the composite of the primary carbonaceous material and the additive composition has a mass ratio of an additive carbonaceous material in the additive composition to the primary carbonaceous material of 0.01:1 to 0.7:1.

Aspect 62 provides the method of any one of Aspects 1-61, wherein the additive composition is 0.001 wt % to 90 wt % of the composite of the primary carbonaceous material and the additive composition.

Aspect 63 provides the method of any one of Aspects 1-62, wherein the additive composition is 1 wt % to 50 wt % of the composite of the primary carbonaceous material and the additive composition.

Aspect 64 provides the method of any one of Aspects 1-63, wherein the additive composition comprises an organic substance, a metal, a metal salt, a metal oxide (e.g., alumina), an acid, an inorganic substance, a binder, a nitrogen-containing compound (e.g., urea, ammonia, or a combination thereof), or a combination thereof.

Aspect 65 provides the method of Aspect 64, wherein the organic substance comprises a sugar, a fat, a protein, a carbohydrate, DNA, cellulose, chlorophyll, an enzyme, a hormone, a vitamin, petroleum, a plant, meat, a fruit, a vegetable, or a combination thereof.

Aspect 66 provides the method of any one of Aspects 64-65, wherein the metal comprises an alkaline earth metal, silver, copper, aluminum, iron, or a combination thereof.

Aspect 67 provides the method of any one of Aspects 64-66, wherein the metal salt comprises a halide salt of an alkaline earth metal, a hydroxide salt of an alkaline earth metal, or a combination thereof.

Aspect 68 provides the method of any one of Aspects 64-67, wherein the metal salt comprises potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof.

Aspect 69 provides the method of any one of Aspects 64-68, wherein the acid comprises phosphoric acid.

Aspect 70 provides the method of any one of Aspects 64-69, wherein the inorganic substance comprises copper oxide, a zeolite, alumina, iron, iron oxide, or a combination thereof.

Aspect 71 provides the method of any one of Aspects 64-70, wherein the additive composition comprises the binder.

Aspect 72 provides the method of Aspect 71, wherein the binder is 0.001 wt % to 80 wt % of the additive composition.

Aspect 73 provides the method of any one of Aspects 71-72, wherein the binder is 0.001 wt % to 50 wt % of the additive composition.

Aspect 74 provides the method of any one of Aspects 71-73, wherein the binder is 0.0001 wt % to 20 wt % of the composite of the primary carbonaceous material and the additive composition.

Aspect 75 provides the method of any one of Aspects 71-74, wherein the binder is 0.1 wt % to 15 wt % of the composite of the primary carbonaceous material and the additive composition.

Aspect 76 provides the method of any one of Aspects 71-75, wherein the binder is 0.0001 wt % to 20 wt % of a total amount of the primary carbonaceous material and powdered carbonaceous material in the composite of the primary carbonaceous material and the additive composition.

Aspect 77 provides the method of any one of Aspects 71-76, wherein the binder is 0.1 wt % to 15 wt % of a total amount of the primary carbonaceous material and powdered carbonaceous material in the composite of the primary carbonaceous material and the additive composition.

Aspect 78 provides the method of any one of Aspects 71-77, wherein the binder comprises a sulfonate, a starch, a highly viscous carbon solution, molasses, cellulose, a cellulose derivative, lignin, or a combination thereof.

Aspect 79 provides the method of any one of Aspects 71-78, wherein in the activated carbon composite, the binder is a char, a pyrolyzed binder, a carbonized binder, or a combination thereof.

Aspect 80 the method of any one of Aspects 1-79, wherein the additive composition comprises alumina, activated alumina, aluminum hydroxide, iron, bauxite, aluminum oxide, a clay (e.g., kaolinite or an aluminosilicate), an acid, a base, or a combination thereof.

Aspect 81 provides the method of any one of Aspects 1-80, wherein the additive composition comprises alumina, activated alumina, aluminum hydroxide, iron, a material including any one or any combination thereof, or a combination thereof.

Aspect 82 provides the method of any one of Aspects 1-81, wherein the pre-treatment is not performed.

Aspect 83 provides the method of any one of Aspects 1-81, wherein the pre-treatment is performed.

Aspect 84 provides the method of Aspect 83, wherein the pre-treatment activates the primary carbonaceous material.

Aspect 85 provides the method of any one of Aspects 83-84, wherein the pre-treatment comprises heating, adding one or more additives, steam treatment, $CO_2$ treatment, oxygen treatment, nitrogen treatment, treatment with a nitrogen-containing compound (e.g., ammonia, urea, or a combination thereof), application of vacuum, application of pressure, soaking, applying an electrical charge to the primary carbonaceous material, adding one or more chemicals to alter a chemical charge of the primary carbonaceous material, drying, shape modification, or a combination thereof.

Aspect 86 provides the method of Aspect 85, wherein the pre-treatment comprises soaking in a liquid comprising the one or more additives.

Aspect 87 provides the method of any one of Aspects 83-86, wherein the pre-treatment comprises heating to a heating temperature.

Aspect 88 provides the method of Aspect 87, wherein the heating temperature is a temperature of 100° C. to 1200° C.

Aspect 89 provides the method of any one of Aspects 87-88, wherein the heating temperature is a temperature of 600° C. to 900° C.

Aspect 90 provides the method of any one of Aspects 87-89, wherein the heating comprises heating in an oxygenated environment.

Aspect 91 provides the method of any one of Aspects 87-90, wherein the heating comprises heating in a substantially non-oxygenated environment.

Aspect 92 provides the method of any one of Aspects 87-91, wherein the heating comprises heating in the presence of $CO_2$, oxygen, steam, nitrogen, or a combination thereof.

Aspect 93 provides the method of any one of Aspects 87-92, wherein the heating comprises heating in the presence of one of more additives added to the primary carbonaceous material.

Aspect 94 provides the method of any one of Aspects 87-93, wherein the heating comprises heating to the heating temperature for a duration of 1 minute to 240 hours.

Aspect 95 provides the method of any one of Aspects 83-94, wherein the pre-treatment comprises adding one or more additives.

Aspect 96 provides the method of Aspect 95, wherein the one or more additives comprise an organic substance, a metal, a metal salt, a metal oxide (e.g., alumina), an acid, an inorganic substance, a binder, or a combination thereof.

Aspect 97 provides the method of any one of Aspects 95-96, wherein the metal comprises an alkaline earth metal, silver, copper, aluminum, iron, or a combination thereof.

Aspect 98 provides the method of any one of Aspects 95-97, wherein the metal salt comprises a halide salt of an alkaline earth metal, a hydroxide salt of an alkaline earth metal, or a combination thereof.

Aspect 99 provides the method of any one of Aspects 95-98, wherein the metal salt comprises potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof.

Aspect 100 provides the method of any one of Aspects 95-99, wherein the acid comprises phosphoric acid.

Aspect 101 provides the method of any one of Aspects 95-100, wherein the inorganic substance comprises copper oxide, a zeolite, alumina, iron, iron oxide, or a combination thereof.

Aspect 102 provides the method of any one of Aspects 95-101, wherein the one or more additives comprise alumina, activated alumina, aluminum hydroxide, iron, bauxite, aluminum oxide, a clay (e.g., kaolinite or an aluminosilicate), an acid, a base, or a combination thereof.

Aspect 103 provides the method of any one of Aspects 85-101, wherein the one or more additives comprise alumina, activated alumina, aluminum hydroxide, iron, a material comprising any one or any combination thereof, or a combination thereof.

Aspect 104 provides the method of any one of Aspects 1-103, further comprising performing shaping of the primary carbonaceous material, of the composite of the primary carbonaceous material and the additive composition, of the granular activated carbon composite, or a combination thereof.

Aspect 105 provides the method of Aspect 104, wherein the shaping comprises grinding, molding, tumbling, extrusion, pelletizing, use of a pin mixer, fluidization, shear forces, impaction, or a combination thereof.

Aspect 106 provides the method of any one of Aspects 104-105, wherein the shaping comprises forming the material being shaped into a cylinder, a sphere, an ovoid, or a polyhedron.

Aspect 107 provides the method of any one of Aspects 1-106, wherein the post-treatment is not performed.

Aspect 108 provides the method of Aspect 107, wherein the composite of the primary carbonaceous material and the additive composition is the activated carbon composite.

Aspect 109 provides the method of any one of Aspects 107-108, further comprising performing shaping of the composite of the primary carbonaceous material and the additive composition, to form a shaped composite of the primary carbonaceous material and the additive composition.

Aspect 110 provides the method of Aspect 109, wherein the shaped composite of the primary carbonaceous material and the additive composition is the activated carbon composite.

Aspect 111 provides the method of any one of Aspects 1-106, wherein the post-treatment is performed.

Aspect 112 provides the method of Aspect 111, wherein the post-treatment activates the primary carbonaceous material, activates any carbonaceous material in the additive composition, or a combination thereof.

Aspect 113 provides the method of any one of Aspects 111-112, wherein the post-treatment comprises heating, adding one or more additives, steam treatment, $CO_2$ treatment, oxygen treatment, nitrogen treatment, treatment with a nitrogen-containing compound (e.g., ammonia, urea, or a combination thereof), application of vacuum, application of pressure, soaking, drying, or a combination thereof.

Aspect 114 provides the method of Aspect 113, wherein the post-treatment comprises soaking in a liquid comprising the one or more additives.

Aspect 115 provides the method of any one of Aspects 111-114, wherein the post-treatment comprises heating to a heating temperature.

Aspect 116 provides the method of Aspect 115, wherein the heating temperature is a temperature of 100° C. to 1200° C.

Aspect 117 provides the method of any one of Aspects 115-116, wherein the heating temperature is a temperature of 600° C. to 900° C.

Aspect 118 provides the method of any one of Aspects 115-117, wherein the heating comprises heating in an oxygenated environment.

Aspect 119 provides the method of any one of Aspects 115-118, wherein the heating comprises heating in a substantially non-oxygenated environment.

Aspect 120 provides the method of any one of Aspects 115-119, wherein the heating comprises heating in the presence of $CO_2$, oxygen, steam, nitrogen, or a combination thereof.

Aspect 121 provides the method of any one of Aspects 115-120, wherein the heating comprises heating in the presence of one of more additives added to the composite of the primary carbonaceous material and the additive composition.

Aspect 122 provides the method of any one of Aspects 115-121, wherein the heating comprises heating to the heating temperature for a duration of 1 minute to 240 hours.

Aspect 123 provides the method of any one of Aspects 111-122, wherein the post-treatment comprises adding one or more additives.

Aspect 124 provides the method of Aspect 123, wherein the one or more additives comprise an organic substance, a metal, a metal salt, a metal oxide (e.g., alumina), an acid, an inorganic substance, a binder, or a combination thereof.

Aspect 125 provides the method of Aspect 124, wherein the metal comprises an alkaline earth metal, silver, copper, aluminum, iron, or a combination thereof.

Aspect 126 provides the method of any one of Aspects 124-125, wherein the metal salt comprises a halide salt of an alkaline earth metal, a hydroxide salt of an alkaline earth metal, or a combination thereof.

Aspect 127 provides the method of any one of Aspects 124-126, wherein the metal salt comprises potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof.

Aspect 128 provides the method of any one of Aspects 124-127, wherein the acid comprises phosphoric acid.

Aspect 129 provides the method of any one of Aspects 124-128, wherein the inorganic substance comprises copper oxide, a zeolite, alumina, iron, iron oxide, or a combination thereof.

Aspect 130 provides the method of any one of Aspects 123-129, wherein the one or more additives comprise alumina, activated alumina, aluminum hydroxide, iron, bauxite, aluminum oxide, a clay (e.g., kaolinite or an aluminosilicate), an acid, a base, or a combination thereof.

Aspect 131 provides the method of any one of Aspects 123-130, wherein the one or more additives comprise alumina, activated alumina, aluminum hydroxide, iron, a material comprising any one or any combination thereof, or a combination thereof.

Aspect 132 provides the method of any one of Aspects 1-131, wherein the activated carbon composite has a shape comprising a sphere, a cylinder, an ovoid, or a polyhedron.

Aspect 133 provides the method of any one of Aspects 1-132, further comprising carbonizing a starting material to form the primary carbonaceous material.

Aspect 134 provides the method of Aspect 133, wherein the starting material comprises bituminous coal, bones, bamboo, coconut husk, peach pits, olive pits, nutshells, palm kernel shells, willow peat, wood, coir, lignite, coal, petroleum pitch, or a combination thereof.

Aspect 135 provides the method of any one of Aspects 133-134, further comprising granulating the starting material prior to performing the carbonizing.

Aspect 136 provides the method of any one of Aspects 133-135, further comprising granulating the starting material after the carbonizing to form the primary carbonaceous material.

Aspect 137 provides the method of any one of Aspects 133-136, wherein the carbonizing comprises heating to a temperature of 100° C. to 1200° C. in a substantially non-oxygenated environment.

Aspect 138 provides the method of any one of Aspects 133-137, wherein the carbonizing comprises heating to a temperature of 600° C. to 900° C. in a substantially non-oxygenated environment.

Aspect 139 provides the method of any one of Aspects 1-138, wherein the activated carbon composite has a ball pan hardness of 70% to 100%.

Aspect 140 provides the method of any one of Aspects 1-139, wherein the activated carbon composite has a ball pan hardness of 85% to 99%.

Aspect 141 provides the method of any one of Aspects 1-140, wherein the activated carbon composite has an iodine number of 300 mg/g to 1,000 mg/g.

Aspect 142 provides the method of any one of Aspects 1-141, wherein the activated carbon composite has an iodine number of 400 mg/g to 800 mg/g.

Aspect 143 provides the method of any one of Aspects 1-142, wherein the activated carbon composite has an ash percentage of 1% to 20%.

Aspect 144 provides the method of any one of Aspects 1-143, wherein the activated carbon composite has an ash percentage of 5% to 15%.

Aspect 145 provides a method of forming an activated carbon composite, the method comprising:

adding an additive composition comprising powdered activated carbon and a binder to a primary carbonaceous material comprising virgin granular activated carbon, to form a composite of the primary carbonaceous material and the additive composition;

shaping the composite of the primary carbonaceous material and the additive composition, to form a shaped composite of the primary carbonaceous material and the additive composition; and performing a post-treatment of the shaped composite of the primary carbonaceous material and the additive composition comprising heating to transform the binder to a char, a pyrolyzed binder, a carbonized binder, or a combination thereof, to form the activated carbon composite.

Aspect 146 provides a method of forming an activated carbon composite, the method comprising:

adding an additive composition comprising powdered activated carbon to a primary carbonaceous material comprising used granular activated carbon, to form a composite of the primary carbonaceous material and the additive composition; and performing a post-treatment of the composite of the primary carbonaceous material and the additive composition comprising heating, to form the activated carbon composite.

Aspect 147 provides a method of forming an activated carbon composite, the method comprising:

adding an additive composition comprising powdered activated carbon and a binder to a primary carbonaceous material comprising used granular activated carbon, to form a composite of the primary carbonaceous material and the additive composition; and performing a post-treatment of the composite of the primary carbonaceous material and the additive composition comprising heating to transform the binder to a char, a pyrolyzed binder, a carbonized binder, or a combination thereof, to form the activated carbon composite.

Aspect 148 provides a method of forming an activated carbon composite, the method comprising:

adding an additive composition comprising powdered activated carbon and a binder to a primary carbonaceous material comprising used granular activated carbon, to form a composite of the primary carbonaceous material and the additive composition;

shaping the composite of the primary carbonaceous material and the additive composition, to form a shaped composite of the primary carbonaceous material and the additive composition; and performing a post-treatment of the shaped composite of the primary carbonaceous material and the additive composition comprising heating to transform the binder to a char, a pyrolyzed binder, a carbonized binder, or a combination thereof, to form the activated carbon composite.

Aspect 149 provides an activated carbon composite formed by the method of any one of Aspects 1-148 or a ground product thereof.

Aspect 150 provides an activated carbon composite, comprising: granular activated carbon; and powdered activated carbon at least one of adhered to, within, and mixed with the granular activated carbon.

Aspect 151 provides the granular activated carbon of Aspect 150, wherein the powdered activated carbon is at least one of adhered to, within, and mixed with the granular activated carbon via one or more binders that are in a form comprising a char, a pyrolyzed binder, a carbonized binder, or a combination thereof.

Aspect 152 provides a method of treating water or gas, the method comprising:

contacting contaminated water or gas comprising one or more contaminants with the activated carbon composite of any one of Aspects 149-151 or a ground product thereof to form treated water or gas having a lower concentration of the one or more contaminants than the contaminated water or gas.

Aspect 153 provides the method of Aspect 152, wherein the one or more contaminants comprise a perfluorinated alkyl compound or a polyfluorinated alkyl compound.

Aspect 154 provides the method of Aspect 153, wherein the perfluorinated alkyl compound or polyfluorinated alkyl compound is a perfluoroalkyl or polyfluoroalkyl substance (PFAS), perfluoroalkyl substance, a polyfluoroalkyl substance, a perfluoroalkyl acid (PFAA), or a combination thereof.

Aspect 155 provides the method of any one of Aspects 153-154, wherein the perfluorinated alkyl compound or polyfluorinated alkyl compound is perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Aspect 156 provides a method of treating water or gas, the method comprising:

contacting contaminated water or gas comprising one or more contaminants with a carbonaceous material and one or more additives to form treated water or gas having a lower concentration of the one or more contaminants than the contaminated water or gas.

Aspect 157 provides the method of Aspect 156, wherein the contaminated water or gas is added to the carbonaceous material and the one or more additives.

Aspect 158 provides the method of Aspect 156, wherein the carbonaceous material and the one or more additives are added to the contaminated water or gas.

Aspect 159 provides the method of any one of Aspects 156-158, wherein the carbonaceous material and the one or more additives are combined with the contaminated water or gas separately from one another.

Aspect 160 provides the method of any one of Aspects 156-158, wherein the carbonaceous material and the one or more additives are combined with the contaminated water or gas together with each other.

Aspect 161 provides the method of any one of Aspects 156-160, wherein the carbonaceous material and the one or more additives together are the activated carbon composite of any one of Aspects 149-151 or a ground product of the activated carbon composite.

Aspect 162 provides the method of Aspect 161, wherein the carbonaceous material and the one or more additives together are the activated carbon composite.

Aspect 163 provides the method of Aspect 161, wherein the carbonaceous material and the one or more additives together are the ground product of the activated carbon composite.

Aspect 164 provides the method of any one of Aspects 161-163, wherein the contacting comprises using the activated carbon composite or the ground product thereof in the contaminated water or gas at a loading level of 0.01 mg/L to 1,000 mg/L.

Aspect 165 provides the method of any one of Aspects 161-164, wherein the contacting comprises using the activated carbon composite or the ground product thereof in the contaminated water or gas at a loading level of 10 mg/L to 100 mg/L.

Aspect 166 provides the method of any one of Aspects 161-165, wherein the contacting comprises using the activated carbon composite or the ground product thereof in the contaminated water or gas at a carbon loading level of 0.01 mg/L to 1,000 mg/L.

Aspect 167 provides the method of any one of Aspects 161-166, wherein the contacting comprises using the activated carbon composite or the ground product thereof in the contaminated water or gas at a carbon loading level of 10 mg/L to 100 mg/L.

Aspect 168 provides the method of any one of Aspects 156-167, further comprising separating the carbonaceous material and the one or more additives from the contaminated water or gas contacted with the same, to form the treated water or gas.

Aspect 169 provides the method of Aspect 168, wherein the separating comprises decantation, filtration, centrifugation, or a combination thereof.

Aspect 170 provides the method of any one of Aspects 168-169, wherein the separating comprises filtration.

Aspect 171 provides the method of any one of Aspects 156-170, wherein the contacting is performed at a temperature of 0.1° C. to 150° C.

Aspect 172 provides the method of any one of Aspects 156-171, wherein the contacting is performed at a temperature of 10° C. to 35° C.

Aspect 173 provides the method of any one of Aspects 156-172, wherein the contacting is performed at a pressure of 10 kPa to 1000 kPa.

Aspect 174 provides the method of any one of Aspects 156-173, wherein the contacting is performed at a pressure of 95 kPa to 105 kPa.

Aspect 175 provides the method of any one of Aspects 156-174, wherein the contacting is performed for a duration of 1 second to 7 days.

Aspect 176 provides the method of any one of Aspects 156-175, wherein the contacting is performed for a duration of 10 minutes to 24 hours.

Aspect 177 provides the method of any one of Aspects 156-176, wherein the contacting is performed as a batch process.

Aspect 178 provides the method of any one of Aspects 156-176, wherein the contacting is performed as a continuous process.

Aspect 179 provides the method of any one of Aspects 156-178, wherein the carbonaceous material comprises a granular activated carbon, a biochar, a coal or petroleum char, a powdered carbon (e.g., used powdered activated carbon, virgin powdered activated carbon, unactivated powdered carbon, a powdered biochar, a powdered coal or petroleum char, or a combination thereof), or a combination thereof.

Aspect 180 provides the method of any one of Aspects 156-179, wherein the carbonaceous material comprises wood biochar, coal or petroleum char, wood-derived granular activated carbon, coal- or petroleum-derived granular activated carbon, wood-derived powdered activated carbon, coal- or petroleum-derived powdered activated carbon, virgin granulated activated carbon, reactivated powdered activated carbon, reactivated granulated activated carbon, a spent granular activated carbon, a spent powdered activated carbon, or a combination thereof.

Aspect 181 provides the method of any one of Aspects 156-180, wherein the carbonaceous material has a $d_{50}$ particle size of 0.2 microns to 10 mm.

Aspect 182 provides the method of any one of Aspects 156-181, wherein the carbonaceous material has a $d_{50}$ particle size of 1 micron to 500 microns.

Aspect 183 provides the method of any one of Aspects 156-182, wherein the one or more additives comprise an organic substance, a binder, a powdered carbon (e.g., used powdered activated carbon, virgin powdered activated carbon, unactivated powdered carbon, powdered biochar, powdered coal or petroleum char, or a combination thereof), a metal, a metal salt, a metal oxide (e.g., alumina), an acid, an inorganic substance, a nitrogen-containing compound (e.g., urea, ammonia, or a combination thereof), or a combination thereof.

Aspect 184 provides the method of Aspect 183, wherein the organic substance comprises a sugar, a fat, a protein, a carbohydrate, DNA, cellulose, chlorophyll, an enzyme, a hormone, a vitamin, petroleum, a plant, meat, a fruit, a vegetable, or a combination thereof.

Aspect 185 provides the method of any one of Aspects 183-184, wherein the metal comprises an alkaline earth metal, silver, copper, aluminum, iron, or a combination thereof.

Aspect 186 provides the method of any one of Aspects 183-185, wherein the metal salt comprises a halide salt of an alkaline earth metal, a hydroxide salt of an alkaline earth metal, or a combination thereof.

Aspect 187 provides the method of any one of Aspects 183-186, wherein the metal salt comprises potassium hydroxide, sodium hydroxide, potassium carbonate, calcium chloride, sodium chloride, potassium chloride, sodium bromide, calcium bromide, potassium bromide, potassium permanganate, aluminum hydroxide, or a combination thereof.

Aspect 188 provides the method of any one of Aspects 183-187, wherein the acid comprises phosphoric acid.

Aspect 189 provides the method of any one of Aspects 183-188, wherein the inorganic substance comprises copper oxide, a zeolite, alumina, iron, iron oxide, or a combination thereof.

Aspect 190 provides the method of any one of Aspects 183-189, wherein the binder comprises a sulfonate, a starch, a highly viscous carbon solution, molasses, cellulose, a cellulose derivative, lignin, a char, a pyrolyzed binder, a carbonized binder, or a combination thereof.

Aspect 191 provides the method of any one of Aspects 156-190, wherein the one or more additives comprise alumina, activated alumina, aluminum hydroxide, iron, bauxite, aluminum oxide, a clay (e.g., kaolinite or an aluminosilicate), an acid, a base, or a combination thereof.

Aspect 192 provides the method of any one of Aspects 156-191, wherein the one or more additives comprise alumina, activated alumina, aluminum hydroxide, iron, a material comprising any one or any combination thereof, or a combination thereof.

Aspect 193 provides the method of any one of Aspects 156-192, wherein the one or more additives have a $d_{50}$ particle size of 0.2 microns to 10 mm.

Aspect 194 provides the method of any one of Aspects 156-193, wherein the one or more additives have a $d_{50}$ particle size of 1 micron to 500 microns.

Aspect 195 provides the method of any one of Aspects 156-194, wherein during the contacting a weight ratio of the carbonaceous material to the one or more additives is 1:100 to 100:1.

Aspect 196 provides the method of any one of Aspects 156-195, wherein during the contacting a weight ratio of the carbonaceous material to the one or more additives is 1:10 to 10:1.

Aspect 197 provides the method of any one of Aspects 156-196, wherein the contacting comprises using the combination of the carbonaceous material and the one or more additives in the contaminated water or gas at a loading level of 0.01 mg/L to 1,000 mg/L.

Aspect 198 provides the method of any one of Aspects 156-197, wherein the contacting comprises using the combination of the carbonaceous material and the one or more additives in the contaminated water or gas at a loading level of 10 mg/L to 100 mg/L.

Aspect 199 provides the method of any one of Aspects 156-198, wherein the contacting comprises using the combination of the carbonaceous material and the one or more additives in the contaminated water or gas at a carbon loading level of 0.01 mg/L to 1,000 mg/L.

Aspect 200 provides the method of any one of Aspects 156-199, wherein the contacting comprises using the combination of the carbonaceous material and the one or more additives in the contaminated water or gas at a carbon loading level of 10 mg/L to 100 mg/L.

Aspect 201 provides the method of any one of Aspects 156-200, wherein the one or more contaminants comprise an organic contaminant, fuel oil, an organic solvent, a polychlorinated biphenyl (PCB), a dioxin, mercury, a metal, an industrial chemical, a radioactive material, a perfluoroalkyl or polyfluoroalkyl substance (PFAS), or a combination thereof.

Aspect 202 provides the method of any one of Aspects 156-201, wherein the one or more contaminants comprise a perfluoroalkyl or polyfluoroalkyl substance (PFAS), perfluoroalkyl substance, a polyfluoroalkyl substance, a perfluoroalkyl acid (PFAA), or a combination thereof.

Aspect 203 provides the method of any one of Aspects 156-202, wherein the one or more contaminants comprise perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Aspect 204 provides the method of any one of Aspects 156-203, wherein the contaminated water or gas has a concentration of the one or more contaminants of 1 part per trillion (ppt) or higher to 100 parts per million (ppm).

Aspect 205 provides the method of any one of Aspects 156-204, wherein the contaminated water or gas has a concentration of the one or more contaminants of 20 ppt to 100 ppm.

Aspect 206 provides the method of any one of Aspects 156-205, wherein the treated water or gas has a concentration of the one or more contaminants of 0.001 ppt to 100 ppt.

Aspect 207 provides the method of any one of Aspects 156-206, wherein the treated water or gas has a concentration of the one or more contaminants of 0.001 ppt to 15 ppt.

Aspect 208 provides the method of any one of Aspects 156-207, wherein the contacting removes 20% to 100% of the one or more contaminants from the contaminated water or gas.

Aspect 209 provides the method of any one of Aspects 156-208, wherein the contacting removes 60% to 99.999% of the one or more contaminants from the contaminated water or gas.

Aspect 210 provides a method of treating water, the method comprising:

contacting contaminated water comprising one or more contaminants comprising a perfluoroalkyl or polyfluoroalkyl substance (PFAS) with a carbonaceous material and one or more additives comprising alumina, activated alumina, aluminum hydroxide, or a combination thereof, to form treated water having a lower concentration of the one or more contaminants than the contaminated water.

Aspect 211 provides the method or activated carbon composite of any one or any combination of Aspects 1-210 optionally configured such that all elements or options recited are available to use or select from.

What is claimed is:

1. A method of forming an activated carbon composite, the method comprising:

obtaining or providing a primary carbonaceous material comprising used granular activated carbon contaminated with a perfluoroalkyl or polyfluoroalkyl substance (PFAS);

optionally performing a pre-treatment of the primary carbonaceous material;

adding an additive composition to the primary carbonaceous material, to form a composite of the primary carbonaceous material and the additive composition, wherein the additive composition comprises activated carbon, alumina, activated alumina, aluminum hydroxide, iron, a binder, or a combination thereof, wherein the additive composition is 0.001 wt % to 90 wt % of the composite of the primary carbonaceous material and the additive composition; and optionally performing a post-treatment of the composite of the primary carbonaceous material and the additive composition;

wherein at least one of the pre-treatment and the post-treatment is performed and comprises heating;

to form the activated carbon composite.

2. The method of claim 1, wherein the additive composition further comprises an organic substance, a metal, a metal salt, an acid, an inorganic substance, a nitrogen-containing compound, or a combination thereof.

3. The method of claim 1, wherein the additive composition comprises the activated carbon, wherein the activated carbon is used or spent powdered activated carbon, virgin powdered activated carbon, or a combination thereof, having a $d_{50}$ particle size in the range of 0.2 microns to less than 200 microns.

4. The method of claim 1, wherein the additive composition is 1 wt % to 50 wt % of the composite of the primary carbonaceous material and the additive composition.

5. The method of claim 1, wherein the pre-treatment is performed, wherein the pre-treatment comprises heating, adding one or more additives, steam treatment, $CO_2$ treatment, oxygen treatment, nitrogen treatment, treatment with a nitrogen-containing compound, application of vacuum, application of pressure, soaking, applying an electrical charge to the primary carbonaceous material, adding one or more chemicals to alter a chemical charge of the primary carbonaceous material, drying, shape modification, or a combination thereof.

6. The method of claim 1, further comprising performing shaping of the primary carbonaceous material, of the composite of the primary carbonaceous material and the additive composition, of the activated carbon composite, or a combination thereof, wherein the shaping comprises grinding, molding, tumbling, extrusion, pelletizing, use of a pin mixer, fluidization, shear forces, impaction, or a combination thereof.

7. The method of claim 6, wherein the shaping comprises shaping into a cylinder, a sphere, an ovoid, or a polyhedron.

8. The method of claim 1, wherein the post-treatment is performed, wherein the post-treatment comprises heating, adding one or more additives, steam treatment, $CO_2$ treatment, oxygen treatment, nitrogen treatment, treatment with a nitrogen-containing compound, application of vacuum, application of pressure, soaking, drying, or a combination thereof.

9. The method of claim 1, wherein the additive composition comprises the binder, wherein the binder is chosen from one or more of a sulfonate, a starch, a highly viscous carbon solution, molasses, cellulose, a cellulose derivative, lignin, or a combination thereof, and wherein the post-treatment transforms the binder to a char, a pyrolyzed binder, a carbonized binder, or a combination thereof.

10. The method of claim 8, wherein the post-treatment comprises heating to a temperature of 500° C. to 1,000° C. in the presence of $CO_2$, oxygen, steam, nitrogen, or a combination thereof.

11. The method of claim 1, wherein the pre-treatment or post-treatment comprises adding one or more additives selected from potassium hydroxide, sodium hydroxide, phosphoric acid, alumina, activated alumina, aluminum hydroxide, iron, or a combination thereof.

12. A method of forming an activated carbon composite, the method comprising:

adding an additive composition comprising powdered activated carbon and a binder to a primary carbonaceous material comprising virgin or used granular activated carbon, to form a composite of the primary carbonaceous material and the additive composition, wherein the additive composition is 0.001 wt % to 90 wt % of the composite of the primary carbonaceous material and the additive composition;

shaping the composite of the primary carbonaceous material and the additive composition, to form a shaped composite of the primary carbonaceous material and the additive composition; and performing a post-treatment of the shaped composite of the primary carbonaceous material and the additive composition comprising heating to transform the binder to a char, a pyrolyzed binder, a carbonized binder, or a combination thereof, to form the activated carbon composite.

13. An activated carbon composite formed by the method of claim 1 or a ground product thereof.

14. A method of treating water or gas, the method comprising:

contacting contaminated water or gas comprising one or more contaminants with the activated carbon composite of claim 1 or a ground product thereof to form treated water or gas having a lower concentration of the one or more contaminants than the contaminated water or gas.

15. The method of claim 14, further comprising separating the activated carbon composite or the ground product thereof from the contaminated water or gas contacted with the same, to form the treated water or gas.

16. The method of claim 14, wherein the one or more contaminants comprise a perfluoroalkyl or polyfluoroalkyl substance (PFAS), perfluoroalkyl substance, a polyfluoroalkyl substance, a perfluoroalkyl acid (PFAA), or a combination thereof.

17. The method of claim 14, wherein the contacting removes 20% to 100% of the one or more contaminants from the contaminated water or gas.

18. A method of forming an activated carbon composite, the method comprising:

performing a pre-treatment of a primary carbonaceous material comprising heating;

wherein the primary carbonaceous material comprises used activated carbon contaminated with a perfluoroalkyl or polyfluoroalkyl substance (PFAS), and wherein the primary carbonaceous material comprises a granular activated carbon; and adding an additive composition to the primary carbonaceous material, to form a composite of the primary carbonaceous material and the additive composition, wherein the additive composition comprises activated carbon, alumina, activated alumina, aluminum hydroxide, iron, a binder, or a combination thereof, wherein the additive composition is 0.001 wt % to 90 wt % of the composite of the primary carbonaceous material and the additive composition;

to form the activated carbon composite.

* * * * *